US011985294B2

(12) United States Patent
Miyata et al.

(10) Patent No.: US 11,985,294 B2
(45) Date of Patent: May 14, 2024

(54) INFORMATION PROCESSING APPARATUS, INFORMATION PROCESSING METHOD, AND PROGRAM

(71) Applicant: FUJIFILM CORPORATION, Tokyo (JP)

(72) Inventors: Masahiko Miyata, Saitama (JP); Takashi Aoki, Saitama (JP); Kazunori Tamura, Saitama (JP); Fuminori Irie, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 199 days.

(21) Appl. No.: 17/558,539

(22) Filed: Dec. 21, 2021

(65) Prior Publication Data
US 2022/0116581 A1 Apr. 14, 2022

Related U.S. Application Data

(63) Continuation of application No. PCT/JP2020/024638, filed on Jun. 23, 2020.

(30) Foreign Application Priority Data

Jun. 28, 2019 (JP) ................................. 2019-122034

(51) Int. Cl.
*H04N 13/279* (2018.01)
*G06T 7/73* (2017.01)
*H04N 13/282* (2018.01)

(52) U.S. Cl.
CPC ............. *H04N 13/279* (2018.05); *G06T 7/73* (2017.01); *H04N 13/282* (2018.05)

(58) Field of Classification Search
None
See application file for complete search history.

(56) References Cited

U.S. PATENT DOCUMENTS 10,529,143 B2 * 1/2020 Bell ...................... H04N 13/156
11,409,412 B1 * 8/2022 Ho ........................ G06F 3/0485
(Continued)

FOREIGN PATENT DOCUMENTS

JP H10-285611 A 10/1998
JP 2005-321870 A 11/2005
(Continued)

OTHER PUBLICATIONS

Ming-Der Yang, Chih-Fan Chao, Kai-Siang Huang, Liang-You Lu, Yi-Ping Chen, Image-based 3D scene reconstruction and exploration in augmented reality, Automation in Construction, vol. 33, (Year: 2013).*
(Continued)

*Primary Examiner* — Stefan Gadomski
(74) *Attorney, Agent, or Firm* — SOLARIS Intellectual Property Group, PLLC

(57) ABSTRACT

An information processing apparatus includes a detection unit that detects a three-dimensional position and a posture of an object in an instruction three-dimensional region having an enlarged or reduced relationship with an observation three-dimensional region in which a virtual viewpoint and a virtual visual line are defined, a derivation unit that derives the viewpoint and the visual line corresponding to detection results of the detection unit depending on positional relationship information indicating a relative positional relationship between the observation three-dimensional region and the instruction three-dimensional region, and an acquisition unit that acquires a virtual viewpoint image showing a subject in a case in which the subject is observed with the viewpoint and the visual line derived by the derivation unit, the virtual viewpoint image being based on a plurality of images obtained by imaging an imaging (Continued)

region included in the observation three-dimensional region by a plurality of imaging apparatuses.

21 Claims, 36 Drawing Sheets

(56) References Cited

U.S. PATENT DOCUMENTS

| | | |
|---|---|---|
| 2005/0248529 A1 | 11/2005 | Endoh |
| 2013/0027393 A1 | 1/2013 | Fujiwara et al. |
| 2015/0177968 A1* | 6/2015 | Kornmann ............. G09G 5/377 |
| | | 715/790 |
| 2016/0193983 A1 | 7/2016 | Sawada |
| 2018/0288391 A1* | 10/2018 | Lee .................. G06F 3/011 |
| 2019/0083885 A1* | 3/2019 | Yee .................. G06F 1/1694 |
| 2019/0279418 A1 | 9/2019 | Sakakima |
| 2020/0012421 A1 | 1/2020 | Kato |
| 2020/0105174 A1 | 4/2020 | Okutani |
| 2020/0335020 A1 | 10/2020 | Okutani |
| 2021/0053529 A1 | 2/2021 | Sawada |

FOREIGN PATENT DOCUMENTS

| | | |
|---|---|---|
| JP | 2013-29958 A | 2/2013 |
| JP | 2013-182419 A | 9/2013 |
| JP | 2015-76062 A | 4/2015 |
| JP | 2015-225529 A | 12/2015 |
| JP | 2017-191492 A | 10/2017 |
| JP | 2018-92580 A | 6/2018 |
| JP | 6419278 B1 | 11/2018 |
| JP | 6427258 B1 | 11/2018 |
| WO | 2018/227230 A1 | 12/2018 |

OTHER PUBLICATIONS

T. Koyama, I. Kitahara and Y. Ohta, "Live mixed-reality 3D video in soccer stadium," The Second IEEE and ACM International Symposium on Mixed and Augmented Reality, 2003. Proceedings., Tokyo, Japan, 2003, pp. 178-186 (Year: 2003).*

Ohta, Y., Kitahara, I., Kameda, Y. et al. Live 3D Video in Soccer Stadium. Int J Comput Vis 75, 173-187 (2007). (Year: 2007).*

Stefanie Zollmann, Tobias Langlotz, Moritz Loos, Wei Hong Lo, and Lewis Baker. 2019. ARSpectator: Exploring Augmented Reality for Sport Events. In SIGGRAPH Asia 2019 Technical Briefs (SA '19). Association for Computing Machinery, New York, NY, USA, 75-78. (Year: 2019).*

English language translation of the following: Office action dated Feb. 21, 2023 from the JPO in a Japanese patent application No. 2021-527649 corresponding to the instant patent application.

International Search Report issued in International Application No. PCT/JP2020/024638 dated Sep. 24, 2020.

Written Opinion of the ISA issued in International Application No. PCT/JP2020/024638 dated Sep. 24, 2020.

* cited by examiner

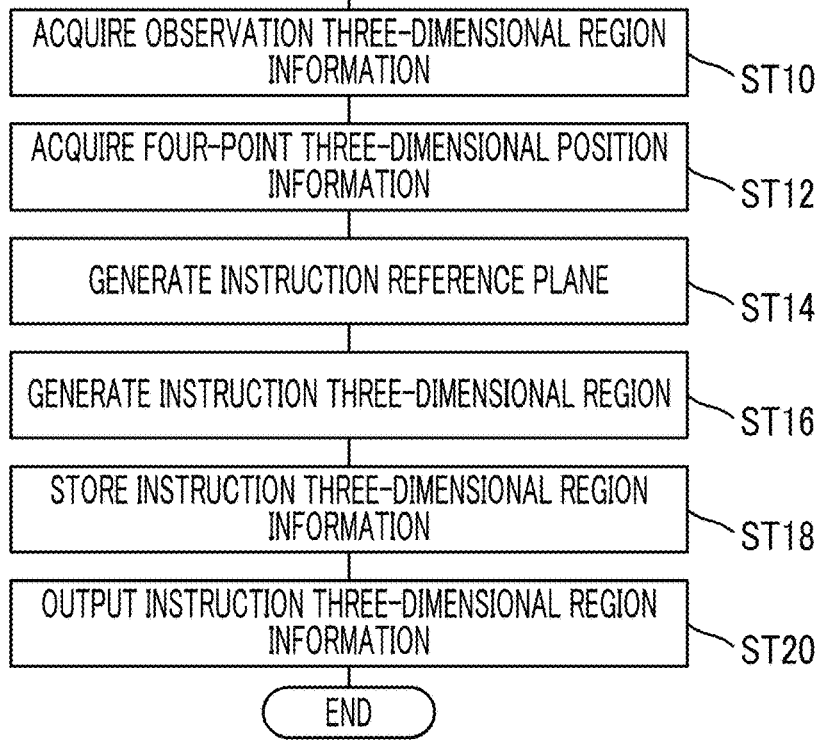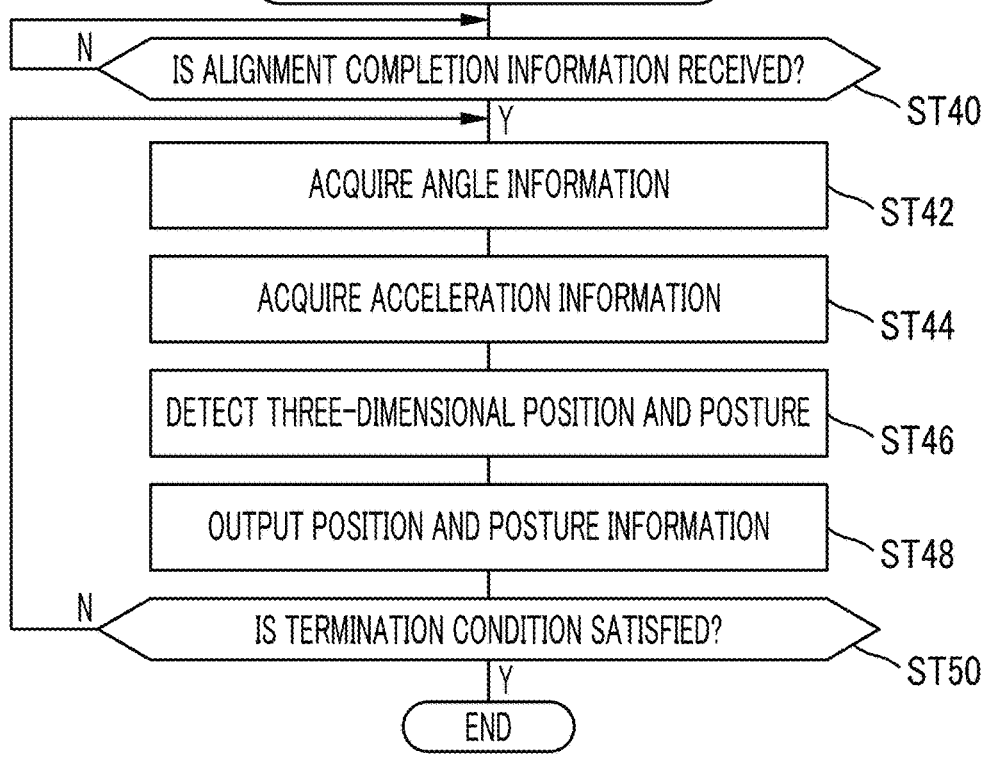

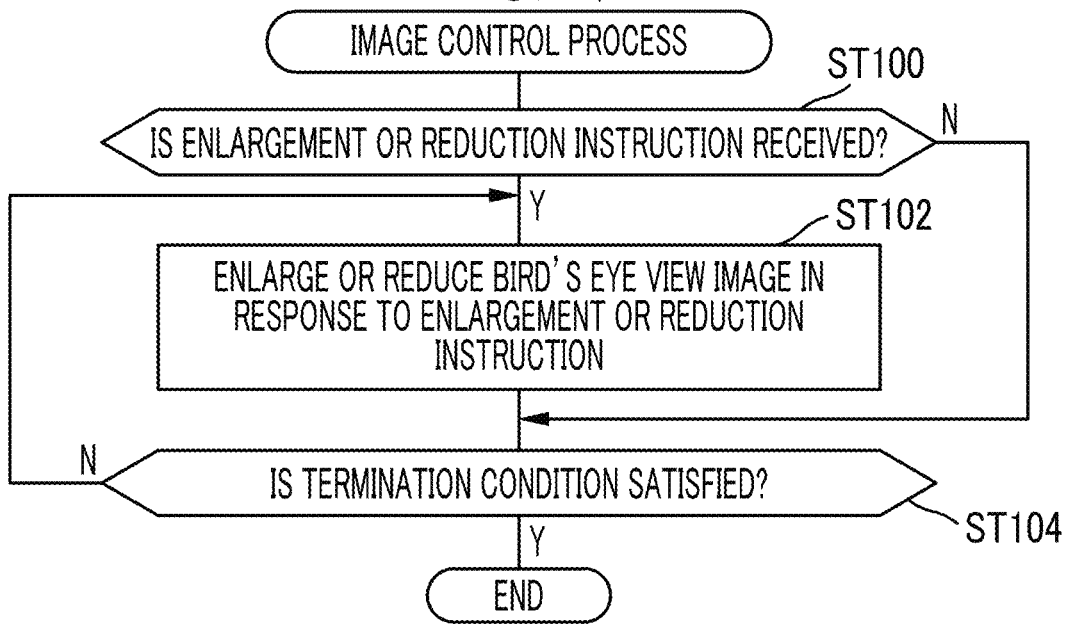
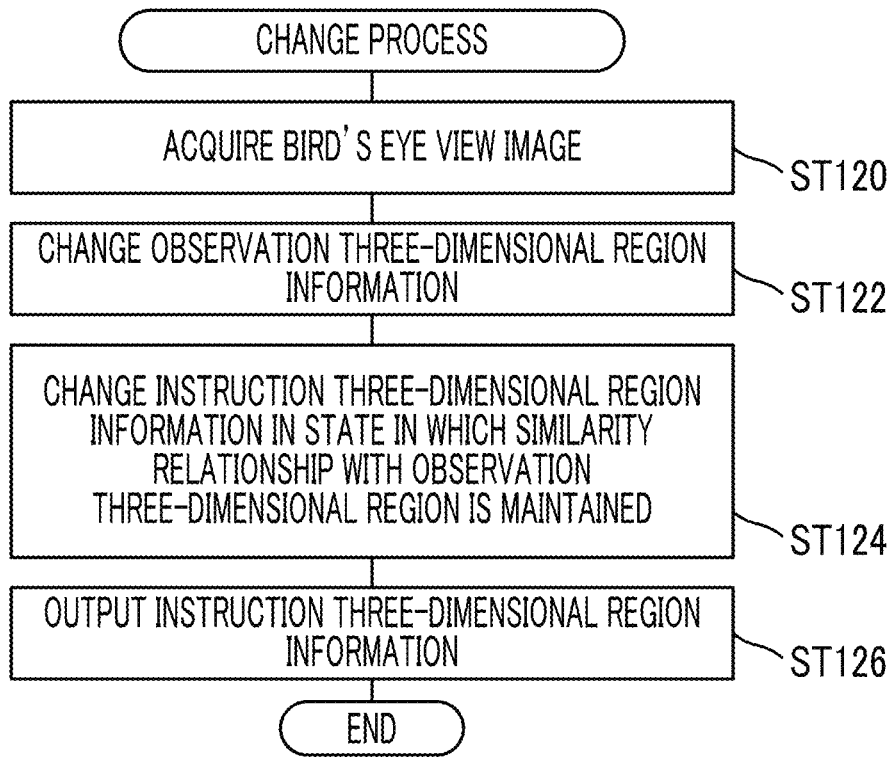

INFORMATION PROCESSING APPARATUS, INFORMATION PROCESSING METHOD, AND PROGRAM

CROSS-REFERENCE TO RELATED APPLICATIONS

This application is a continuation application of International Application No. PCT/JP2020/024638, filed Jun. 23, 2020, the disclosure of which is incorporated herein by reference in its entirety. Further, this application claims priority from Japanese Patent Application No. 2019-122034, filed Jun. 28, 2019, the disclosure of which is incorporated by reference herein in its entirety.

BACKGROUND

1. Technical Field

The technology of the present disclosure relates to an information processing apparatus, an information processing method, and a program.

2. Related Art

JP2015-225529A discloses an information processing apparatus including a specifying unit that specifies a position and a direction of a terminal, a decision unit that decides a position and a direction of a virtual camera based on the position and the direction of the terminal, a generation unit that generates a free viewpoint image to be transmitted to the terminal based on the position and the direction of the virtual camera, a transmission unit that transmits the free viewpoint video generated by the generation unit to the terminal, and a reception unit that receives a setting change instruction for the virtual camera, in which the generation unit generates the free viewpoint video in response to the change instruction in a case in which the change instruction is received.

JP6427258B discloses a display control device including an acquisition unit that acquires a plurality of virtual viewpoint images depending on positions and postures of a plurality of virtual viewpoints, and a display control unit that displays the plurality of virtual viewpoint images acquired by the acquisition unit on an operation screen for performing an operation relating to the position and the posture of the virtual viewpoint, in which at least one of the plurality of virtual viewpoint images displayed on the operation screen by the display control unit is an image generated based on a plurality of captured images obtained by a plurality of cameras imaging a region to be imaged, and the virtual viewpoint images depending on the virtual viewpoint selected as an operation target of the position and the posture among the plurality of virtual viewpoints is transmitted to another device.

JP2015-076062A discloses an image display apparatus that displays an image, the apparatus comprising an acquisition unit that acquires a plurality of images of a subject captured by a plurality of cameras, a generation unit that composes the plurality of images to generate a composite image of the subject viewed from a virtual viewpoint, a display control unit that displays the composite image on a screen, and a detection unit that detects a user operation for changing a position of the virtual viewpoint of the composite image displayed on the screen, in which the generation unit changes the position of the virtual viewpoint of the composite image based on the user operation.

JP2018-092580A discloses an image generation device that generates a virtual viewpoint image, the image generation device acquiring information regarding installation of a camera group that captures images used for generating the virtual viewpoint image and virtual viewpoint information regarding a virtual viewpoint, deciding an image generation method used for generating the virtual viewpoint image based on the information regarding the installation of the camera group and the virtual viewpoint information, and generating the virtual viewpoint image corresponding to the virtual viewpoint by using the decided image generation method.

SUMMARY

One embodiment according to the technology of the present disclosure provides an information processing apparatus, an information processing method, and a program which can easily acquire a virtual viewpoint image showing a subject in a case in which the subject is observed from a position different from an actual observation position as compared to a case in which the virtual viewpoint image showing the subject in a case in which the subject is observed from the actual observation position is acquired.

A first aspect of the technology of the present disclosure relates to an information processing apparatus including a detection unit that detects a three-dimensional position and a posture of an object in an instruction three-dimensional region having an enlarged or reduced relationship with an observation three-dimensional region in which a virtual viewpoint and a virtual visual line are defined, a derivation unit that derives the viewpoint and the visual line corresponding to detection results of the detection unit depending on positional relationship information indicating a relative positional relationship between the observation three-dimensional region and the instruction three-dimensional region, and an acquisition unit that acquires a virtual viewpoint image showing a subject in a case in which the subject is observed with the viewpoint and the visual line derived by the derivation unit, the virtual viewpoint image being based on a plurality of images obtained by imaging an imaging region included in the observation three-dimensional region by a plurality of imaging apparatuses.

A second aspect of the technology of the present disclosure relates to the information processing apparatus according to the first aspect, in which the relative positional relationship is a relationship between a position of the observation three-dimensional region with respect to a reference point and a position of the instruction three-dimensional region with respect to the reference point.

A third aspect of the technology of the present disclosure relates to the information processing apparatus according to the second aspect, in which the positional relationship information is information in which a coordinate indicating a position in the observation three-dimensional region with the reference point as an origin and a coordinate indicating a position in the instruction three-dimensional region with the reference point as an origin are associated with each other.

A fourth aspect of the technology of the present disclosure relates to the information processing apparatus according to the second aspect, in which the positional relationship information is information including a degree of difference between a distance between a position in the observation three-dimensional region and the reference point and a distance between a position in the instruction three-dimensional region and the reference point.

A fifth aspect of the technology of the present disclosure relates to the information processing apparatus according to the second aspect, in which the reference point is classified into an observation reference point applied to the observation three-dimensional region and an instruction reference point applied to the instruction three-dimensional region, and the instruction reference point is located at a position different from the observation reference point and has a correspondence with the observation reference point.

A sixth aspect of the technology of the present disclosure relates to the information processing apparatus according to the fifth aspect, in which the instruction reference point is decided by detecting the three-dimensional position by the detection unit.

A seventh aspect of the technology of the present disclosure relates to the information processing apparatus according to any one of the first aspect to the sixth aspect, in which the detection unit detects at least three points of the three-dimensional positions, and the information processing apparatus further includes a generation unit that generates the instruction three-dimensional region based on an instruction reference plane specified by using the detected at least three points of the three-dimensional positions by the detection unit.

An eighth aspect of the technology of the present disclosure relates to the information processing apparatus according to any one of the first aspect to the sixth aspect, further including a generation unit that generates the instruction three-dimensional region based on an instruction reference plane specified by using an image obtained by imaging a reference subject.

A ninth aspect of the technology of the present disclosure relates to the information processing apparatus according to any one of the first aspect to the sixth aspect, further including a generation unit that generates, in a case in which a display surface of a first observation three-dimensional region image in a state in which the first observation three-dimensional region image is displayed by a first display apparatus is defined as an instruction reference plane, the first observation three-dimensional region image being obtained by imaging the observation three-dimensional region by a first imaging apparatus or obtained by imaging the observation three-dimensional region by a first virtual imaging apparatus, the instruction three-dimensional region based on the instruction reference plane.

A tenth aspect of the technology of the present disclosure relates to the information processing apparatus according to the ninth aspect, in which the first observation three-dimensional region image is an image showing the observation three-dimensional region in a bird's-eye view.

An eleventh aspect of the technology of the present disclosure relates to the information processing apparatus according to the ninth aspect or the tenth aspect, further including an image control unit that enlarges or reduces the first observation three-dimensional region image in response to a given instruction.

A twelfth aspect of the technology of the present disclosure relates to the information processing apparatus according to any one of the seventh aspect to the eleventh aspect, in which the instruction reference plane is a plane for defining one outer plane of the instruction three-dimensional region, one outer plane of the instruction three-dimensional region, or an inner plane of the instruction three-dimensional region.

A thirteenth aspect of the technology of the present disclosure relates to the information processing apparatus according to any one of the first aspect to the twelfth aspect, the detection unit detects the posture by measuring a pitch angle, a yaw angle, and a roll angle of the object, and the acquisition unit acquires the virtual viewpoint image in a direction corresponding to the posture detected by measuring the roll angle by the detection unit.

A fourteenth aspect of the technology of the present disclosure relates to the information processing apparatus according to any one of the first aspect to the thirteenth aspect, in which the observation three-dimensional region is a three-dimensional region defined based on a second observation three-dimensional region image, which is obtained by imaging a specific reference plane by a second imaging apparatus or obtained by imaging the specific reference plane by a second virtual imaging apparatus, and has a similarity relationship with the instruction three-dimensional region, the information processing apparatus further includes a reception unit that receives a size change instruction for changing a size of the specific reference plane and a changing unit that changes the size of the observation three-dimensional region by changing the size of the specific reference plane in response to the size change instruction received by the reception unit, and the similarity relationship is maintained regardless of a change in the size of the observation three-dimensional region.

A fifteenth aspect of the technology of the present disclosure relates to the information processing apparatus according to any one of the first aspect to the thirteenth aspect, further including a reception unit that receives an image size change instruction for enlarging or reducing a specific reference plane image showing a specific reference plane in a state in which an image including the specific reference plane image is displayed by a second display device, in which the positional relationship information is information including information indicating a relative positional relationship between a three-dimensional region in real space corresponding to the specific reference plane image enlarged or reduced in response to the image size change instruction received by the reception unit, and the instruction three-dimensional region.

A sixteenth aspect of the technology of the present disclosure relates to the information processing apparatus according to the fourteenth aspect, in which the changing unit changes the size of the observation three-dimensional region by enlarging or reducing the second observation three-dimensional region image in response to the size change instruction.

A seventeenth aspect of the technology of the present disclosure relates to the information processing apparatus according to any one of the fourteenth aspect to the sixteenth aspect, in which the reception unit further receives an imaging direction change instruction for changing an imaging direction of the second imaging apparatus or the second virtual imaging apparatus, and the changing unit changes the imaging direction in response to the imaging direction change instruction received by the reception unit.

An eighteenth aspect of the technology of the present disclosure relates to the information processing apparatus according to any one of the first aspect to the seventeenth aspect, further including an output unit that outputs the virtual viewpoint image acquired by the acquisition unit.

A nineteenth aspect of the technology of the present disclosure relates to an information processing method including detecting a three-dimensional position and a posture of an object in an instruction three-dimensional region having an enlarged or reduced relationship with an observation three-dimensional region in which a virtual viewpoint and a virtual visual line are defined, deriving the viewpoint and the visual line corresponding to detection results depending on positional relationship information indicating a relative positional relationship between the observation three-dimensional region and the instruction three-dimensional region, and acquiring a virtual viewpoint image showing a subject in a case in which the subject is observed with the derived viewpoint and the derived visual line, the virtual viewpoint image being based on a plurality of images obtained by imaging an imaging region included in the observation three-dimensional region by a plurality of imaging apparatuses.

A twentieth aspect of the technology of the present disclosure relates to a program causing a computer to execute a process including detecting a three-dimensional position and a posture of an object in an instruction three-dimensional region having an enlarged or reduced relationship with an observation three-dimensional region in which a virtual viewpoint and a virtual visual line are defined, deriving the viewpoint and the visual line corresponding to detection results depending on positional relationship information indicating a relative positional relationship between the observation three-dimensional region and the instruction three-dimensional region, and acquiring a virtual viewpoint image showing a subject in a case in which the subject is observed with the derived viewpoint and the derived visual line, the virtual viewpoint image being based on a plurality of images obtained by imaging an imaging region included in the observation three-dimensional region by a plurality of imaging apparatuses.

BRIEF DESCRIPTION OF THE DRAWINGS

Exemplary embodiments of the technology of the disclosure will be described in detail based on the following figures, wherein:

FIG. 25 is a flowchart showing an example of a flow of a generation process executed by the smartphone according to the embodiment;

FIG. 26 is a flowchart showing an example of a flow of a detection process executed by the smartphone according to the embodiment;

FIG. 29 is a flowchart showing an example of a flow of an image control process executed by the image generation device according to the embodiment;

FIG. 30 is a flowchart showing an example of a flow of a change process executed by the image generation device according to the embodiment;

DETAILED DESCRIPTION

An example of an embodiment according to the technology of the present disclosure will be described with reference to the accompanying drawings.

First, the terms used in the following description will be described.

CPU refers to an abbreviation of "central processing unit". RAM refers to an abbreviation of "random access memory". DRAM refers to an abbreviation of "dynamic random access memory". SRAM refers to an abbreviation of "static random access memory". ROM refers to an abbreviation of "read only memory". SSD refers to an abbreviation of "solid state drive". HDD refers to an abbreviation of "hard disk drive". EEPROM refers to an abbreviation of "electrically erasable and programmable read only memory". I/F refers to an abbreviation of "interface". IC refers to an abbreviation of "integrated circuit". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". CMOS refers to an abbreviation of "complementary metal oxide semiconductor". CCD refers to an abbreviation of "charge coupled device". EL refers to an abbreviation of "electro-luminescence". GPU refers to an abbreviation of "graphics processing unit". LAN refers to an abbreviation of "local area network". 3D refers to an abbreviation of "3 dimension". USB refers to an abbreviation of "universal serial bus". In addition, in the description of the present specification, the meaning of "plane" includes the meaning of a perfect plane as well as the meaning of a substantially plane including errors allowed in design and manufacturing.

Figure 1:
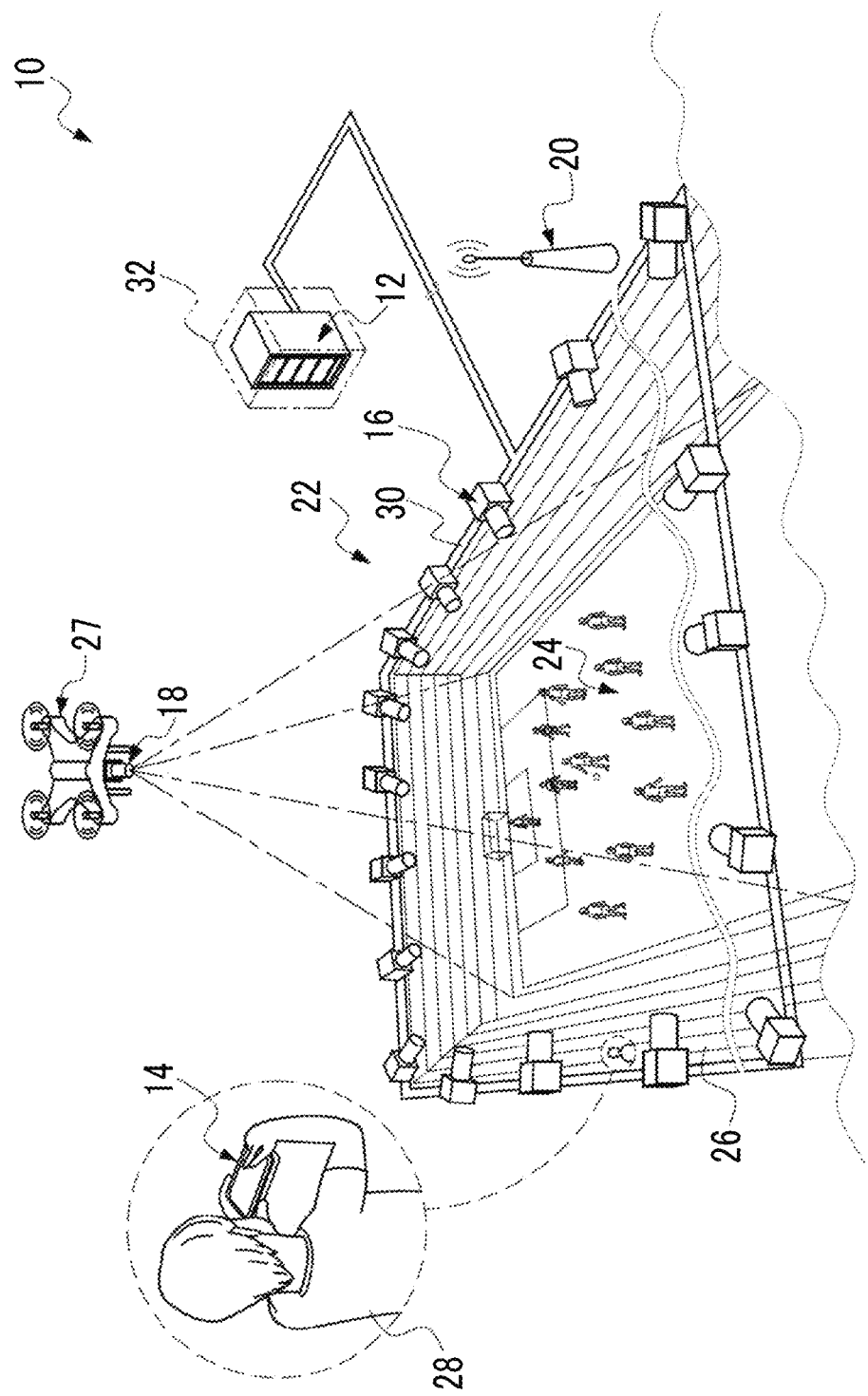
FIG. 1 is a schematic perspective diagram showing an example of an external configuration of an information processing system according to an embodiment.

For example, as shown in FIG. 1, an information processing system 10 comprises an image generation device 12, a smartphone 14, a plurality of imaging apparatuses 16, an imaging apparatus 18, and a wireless communication base station (hereinafter, simply referred to as "base station") 20. Here, the information processing system 10 is an example of an "information processing apparatus" according to the technology of the present disclosure, the smartphone 14 is an example of an "object" according to the technology of the present disclosure, and the imaging apparatus 18 is an example of a "first imaging apparatus" and a "second imaging apparatus" according to the technology of the present disclosure.

The imaging apparatuses 16 and 18 are devices for imaging having a CMOS image sensor, and each have an optical zoom function and a digital zoom function. Note that another type of image sensor, such as a CCD image sensor, may be adopted instead of the CMOS image sensor.

The plurality of imaging apparatuses 16 are installed in a soccer stadium 22. Each of the plurality of imaging apparatuses 16 is disposed so as to surround a soccer field 24, and images a region including the soccer field 24 as an imaging region. Here, an aspect example is described in which each of the plurality of imaging apparatuses 16 is disposed so as to surround the soccer field 24. However, the technology of the present disclosure is not limited to this, and the disposition of the plurality of imaging apparatuses 16 is decided depending on a virtual viewpoint image to be generated. The plurality of imaging apparatuses 16 may be disposed so as to surround the whole soccer field 24, or the plurality of imaging apparatuses 16 may be disposed so as to surround a specific part thereof. The imaging apparatus 18 is installed in an unmanned type aerial vehicle (for example, a drone), and images the region including the soccer field 24 as the imaging region in a bird's-eye view from the sky. The imaging region of the region including the soccer field 24 in a bird's-eye view from the sky refers to an imaging face on the soccer field 24 by the imaging apparatus 18. Here, the imaging face on the soccer field 24 by the imaging apparatus 18 is an example of a "specific reference plane" according to the technology of the present disclosure.

The image generation device 12 is installed in a server room 32. The plurality of imaging apparatuses 16 and the image generation device 12 are connected to each other via a LAN cable 30, and the image generation device 12 controls the plurality of imaging apparatuses 16 and acquires an image obtained by being imaged by each of the plurality of imaging apparatuses 16. Note that although the connection using a wired communication method by the LAN cable 30 is described as an example here, the technology of the present disclosure is not limited to this, and the connection using a wireless communication method may be used.

In the soccer stadium 22, spectator seats 26 are provided so as to surround the soccer field 24, and a spectator 28 sits in the spectator seat 25. The spectator 28 owns the smartphone 14.

The base station 20 transmits and receives various pieces of information to and from the image generation device 12, the smartphone 14, and the unmanned aerial vehicle 27 via radio waves. That is, the image generation device 12 is connected to the smartphone 14 and the unmanned aerial vehicle 27 via the base station 20 in the wirelessly communicable manner. The image generation device 12 controls the unmanned aerial vehicle 27 by wirelessly communicating with the unmanned aerial vehicle 27 via the base station 20, and acquires the image obtained by being imaged by the imaging apparatus 18 from the unmanned aerial vehicle 27.

The image generation device 12 is a device corresponding to a server, and the smartphone 14 is a device corresponding to a client terminal with respect to the image generation device 12. By the image generation device 12 and the smartphone 14 wirelessly communicating with each other via the base station 20, the smartphone 14 requests the image generation device 12 to provide various services, and the image generation device 12 provides the services to the smartphone 14 in response to the request from the smartphone 14.

Figure 2:
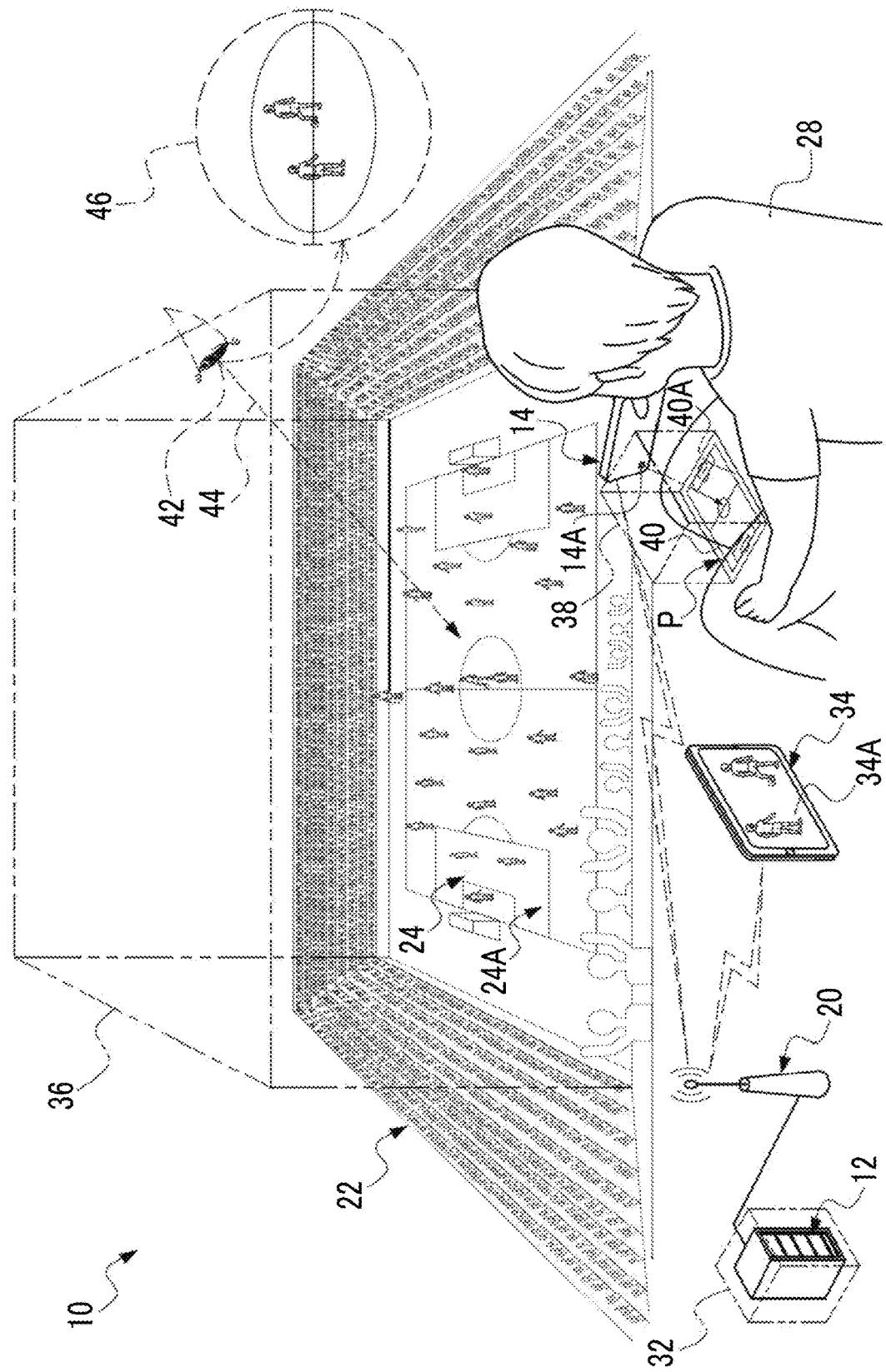
FIG. 2 is a conceptual diagram showing an example of a relationship between an observation three-dimensional region space and an instruction three-dimensional region space generated by the information processing system according to the embodiment.

For example, as shown in FIG. 2, the information processing system 10 comprises a tablet terminal 34. The tablet terminal 34 is used by the spectator 28. Similar to the smartphone 14, the tablet terminal 34 is also a device corresponding to the client terminal with respect to the image generation device 12. The tablet terminal 34 is connected to the image generation device 12 via the base station 20 in the wirelessly communicable manner. By the image generation device 12 and the tablet terminal 34 wirelessly communicating with each other via the base station 20, the tablet terminal 34 requests the image generation device 12 to provide various services, and the image generation device 12 provides the services to the tablet terminal 34 in response to the request from the tablet terminal 34.

The information processing system 10 generates an observation three-dimensional region 36 and an instruction three-dimensional region 38. Both the observation three-dimensional region 36 and the instruction three-dimensional region 38 are invisible three-dimensional regions. Therefore, the observation three-dimensional region 36 and the instruction three-dimensional region 38 are not visually perceived in a real space. In the example shown in FIG. 2, both the observation three-dimensional region 36 and the instruction three-dimensional region 38 are formed in a rectangular parallelepiped shape.

The observation three-dimensional region 36 is a three-dimensional region for defining a virtual viewpoint 42 and a visual line 44. The viewpoint 42 and the visual line 44 are the viewpoint and the visual line of the spectator 28 in a case in which the spectator 28 observes the soccer field 24 in the observation three-dimensional region 36.

In the example shown in FIG. 2, the observation three-dimensional region 36 has a plane corresponding to the soccer field 24 as one outer plane 24A (hereinafter, referred to as "soccer field corresponding plane 24A"), and is generated based on the soccer field corresponding plane 24A. The soccer field corresponding plane 24A is a plane corresponding to the imaging face on the soccer field 24 by the imaging apparatus 18, and is defined as a bottom plane of the observation three-dimensional region 36. A height of the observation three-dimensional region 36 is determined within a predetermined range (several tens of meters in the example shown in FIG. 2). The height of the observation three-dimensional region 36 is determined depending on, for example, an area of the bottom plane of the observation three-dimensional region 36 (in the example shown in FIG. 2, an area of the soccer field corresponding plane 24A). Note that the height of the observation three-dimensional region 36 may be a fixed value or may be a variable value that is changed within the predetermined range described above in response to an instruction given by the spectator 28 and the like. Here, the "predetermined range" is a range that is allowed as a height at which the viewpoint 42 and the visual line 44 can be set, and is uniquely determined depending on, for example, an installation position, the imaging range, and an imaging direction of each of the imaging apparatus 18 and the plurality of imaging apparatuses 16.

The instruction three-dimensional region 38 is a rectangular parallelepiped three-dimensional region, and is generated based on an instruction reference plane 40A. The instruction three-dimensional region 38 has a reduced relationship with the observation three-dimensional region 36. That is, the instruction three-dimensional region 38 is a three-dimensional region in which the observation three-dimensional region 36 is reduced by a predetermined magnification. Here, the "predetermined magnification" refers to, for example, "1/300". Here, "1/300" is described as an example of the predetermined magnification, but the technology of the present disclosure is not limited to this, and another scale magnification may be used.

The instruction reference plane 40A is one outer plane of the instruction three-dimensional region 38. In the example shown in FIG. 2, the instruction reference plane 40A forms a bottom plane of the instruction three-dimensional region 38. The instruction reference plane 40A is a plane specified by using a reference subject image 41 (see FIG. 11), which is an image obtained by imaging a reference subject 40. In the example shown in FIG. 2, the reference subject 40 is a recording medium P itself, and the recording medium P is paper in which an image showing the soccer field 24 (hereinafter, also simply referred to as "soccer field image") is formed on the surface of the recording medium P without a margin. An area of the soccer field image is an area in which the soccer field corresponding plane 24A is reduced by a predetermined magnification, and the soccer field image is an image having a similarity relationship with the soccer field corresponding plane 24A.

Here, the paper in which the soccer field image is formed on the surface without a margin is described as an example of the recording medium P, but the technology of the present disclosure is not limited to this, and the recording medium P may be paper in which the soccer field image is formed on the surface with the margin. In addition, the recording medium P is not limited to paper, and need only be any recording medium on which an image can be formed, such as a transparent or translucent sheet.

The spectator 28 determines the position of the viewpoint 42 and the direction of the visual line 44 by positioning a specific portion of the smartphone 14 (in the example shown in FIG. 2, a subject side lens 14A of the imaging apparatus 84 (see FIG. 4)) within the instruction three-dimensional region 38. In the example shown in FIG. 2, the position of the subject side lens 14A of the imaging apparatus 84 (see FIG. 4) mounted on the smartphone 14 has a correspondence with the position of the viewpoint 42, and an optical axis direction of the subject side lens 14A, in other words, the imaging direction of the imaging apparatus 84 has a correspondence with the direction of the visual line 44. The imaging direction of the imaging apparatus 84 is specified from the posture of the smartphone 14.

The image generation device 12 generates a virtual viewpoint image 46. The virtual viewpoint image 46 is a virtual viewpoint image based on a plurality of images obtained by imaging the imaging region included in the observation three-dimensional region 36 by the plurality of imaging apparatuses 16 (see FIG. 1). The imaging with respect to the imaging region refers to imaging at an angle of view including the imaging region, for example. Examples of the virtual viewpoint image 46 include a moving image using a 3D polygon. The image generation device 12 generates the moving image using the 3D polygon by composing the plurality of images obtained by imaging the imaging region included in the observation three-dimensional region 36 by the plurality of imaging apparatuses 16. The image generation device 12 generates the virtual viewpoint image corresponding to a case in which the imaging region is observed from any position and any direction based on the moving image using the generated 3D polygon. In one embodiment according to the technology of the present disclosure, the image generation device 12 generates the virtual viewpoint image 46 showing the subject in a case in which the subject is observed from the viewpoint 42 and the visual line 44. Stated another way, the virtual viewpoint image 46 refers to an image corresponding to an image obtained by imaging by a virtual imaging apparatus (hereinafter, also referred to as "virtual imaging apparatus") installed at the position of the viewpoint 42 with the direction of the visual line 44 as the imaging direction.

The image generation device 12 transmits the virtual viewpoint image 46 to the smartphone 14 and the tablet terminal 34 via the base station 20. The smartphone 14 and the tablet terminal 34 receive the virtual viewpoint image 46 transmitted from the image generation device 12. As shown in FIG. 2, for example, the tablet terminal 34 comprises a display 34A. Examples of the display 34A include a liquid crystal display. Note that another type of display, such as an organic EL display, may be adopted as the display 34A without being limited to the liquid crystal display. In the example shown in FIG. 2, the virtual viewpoint image 46 is displayed on the display 34A.

Figure 3:
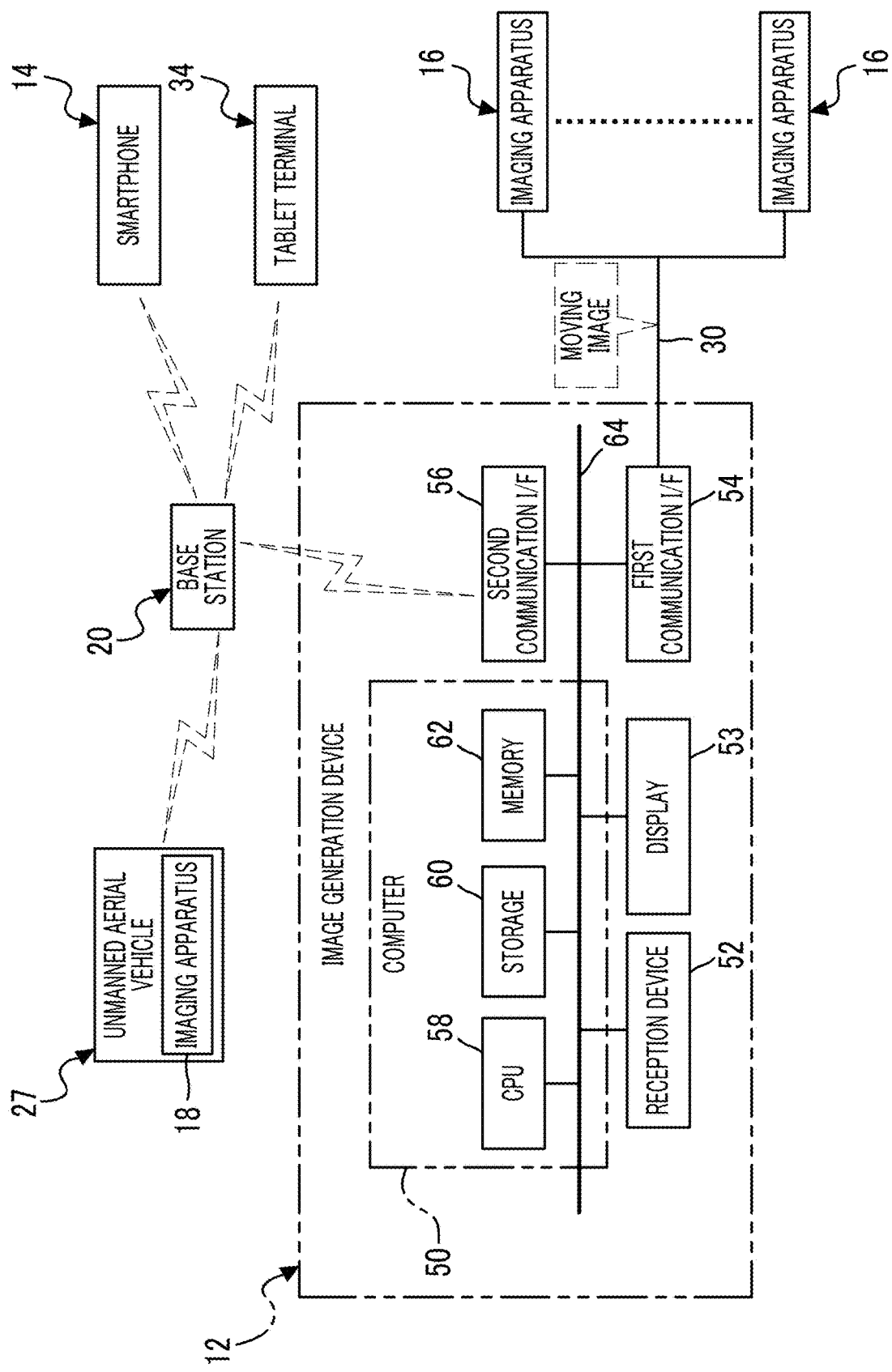
FIG. 3 is a block diagram showing an example of a hardware configuration of an electric system of an image generation device according to the embodiment and an example of a relationship between the image generation device and peripheral devices thereof.

For example, as shown in FIG. 3, the image generation device 12 comprises a computer 50, a reception device 52, a display 53, a first communication I/F 54, and a second communication I/F 56. The computer 50 comprises a CPU 58, a storage 60, and a memory 62, and the CPU 58, the storage 60, and the memory 62 are connected to each other via a bus line 64. In the example shown in FIG. 3, for convenience of illustration, one bus line is shown as the bus line 64, but a data bus, an address bus, a control bus, and the like are included in the bus line 64.

The CPU 58 controls the whole image generation device 12. Various parameters and various programs are stored in the storage 60. The storage 60 is a non-volatile storage device. Here, an EEPROM is adopted as an example of the storage 60, but the technology of the present disclosure is not limited to this, and a mask ROM, an HDD, an SSD, or the like may be used. The memory 62 is a volatile storage device. Various pieces of information are transitorily stored in the memory 62. The memory 62 is used as a work memory by the CPU 58. Here, a DRAM is adopted as an example of the memory 62, but the technology of the present disclosure is not limited to this, and another type of volatile storage device, such as an SRAM, may be used.

The reception device 52 receives the instruction from a user or the like of the image generation device 12. Examples of the reception device 52 include a touch panel, a hard key, and a mouse. The reception device 52 is connected to the bus line 64, and the CPU 58 acquires the instruction received by the reception device 52.

The display 53 is connected to the bus line 64 and displays various pieces of information under the control of the CPU 58. Examples of the display 53 include a liquid crystal display. Note that another type of display, such as an organic EL display, may be adopted as the display 53 without being limited to the liquid crystal display.

The first communication I/F 54 is connected to the LAN cable 30. The first communication I/F 54 is realized by a device having an FPGA, for example. The first communication I/F 54 is connected to the bus line 64 and controls the exchange of various pieces of information between the CPU 58 and the plurality of imaging apparatuses 16. For example, the first communication I/F 54 controls the plurality of imaging apparatuses 16 in response to the request of the CPU 58. In addition, the first communication I/F 54 acquires the image obtained by being imaged by each of the plurality of imaging apparatuses 16, and outputs the acquired image to the CPU 58. In the example shown in FIG. 3, the moving image is shown as the image obtained by being imaged by the imaging apparatus 16, and the first communication I/F 54 outputs the moving image acquired from the imaging apparatus 16 to the CPU 58.

Note that, in the example shown in FIG. 3, the moving image is shown as the image obtained by being imaged by the imaging apparatus 16, but the technology of the present disclosure is not limited to this, and the image obtained by being imaged by the imaging apparatus 16 may be a still image and need only be an image capable of used for the generation of the virtual viewpoint image 46 (see FIG. 2).

The second communication I/F 56 is connected to the base station 20 in the wirelessly communicable manner. The second communication I/F 56 is realized by a device having an FPGA, for example. The second communication I/F 56 is connected to the bus line 64. The second communication I/F 56 controls the exchange of various pieces of information between the CPU 58 and the unmanned aerial vehicle 27 by the wireless communication method via the base station 20. In addition, the second communication I/F 56 controls the exchange of various pieces of information between the CPU 58 and the smartphone 14 by the wireless communication method via the base station 20. Further, the second communication I/F 56 controls the exchange of various pieces of information between the CPU 58 and the tablet terminal 34 by the wireless communication method via the base station 20.

Figure 4:
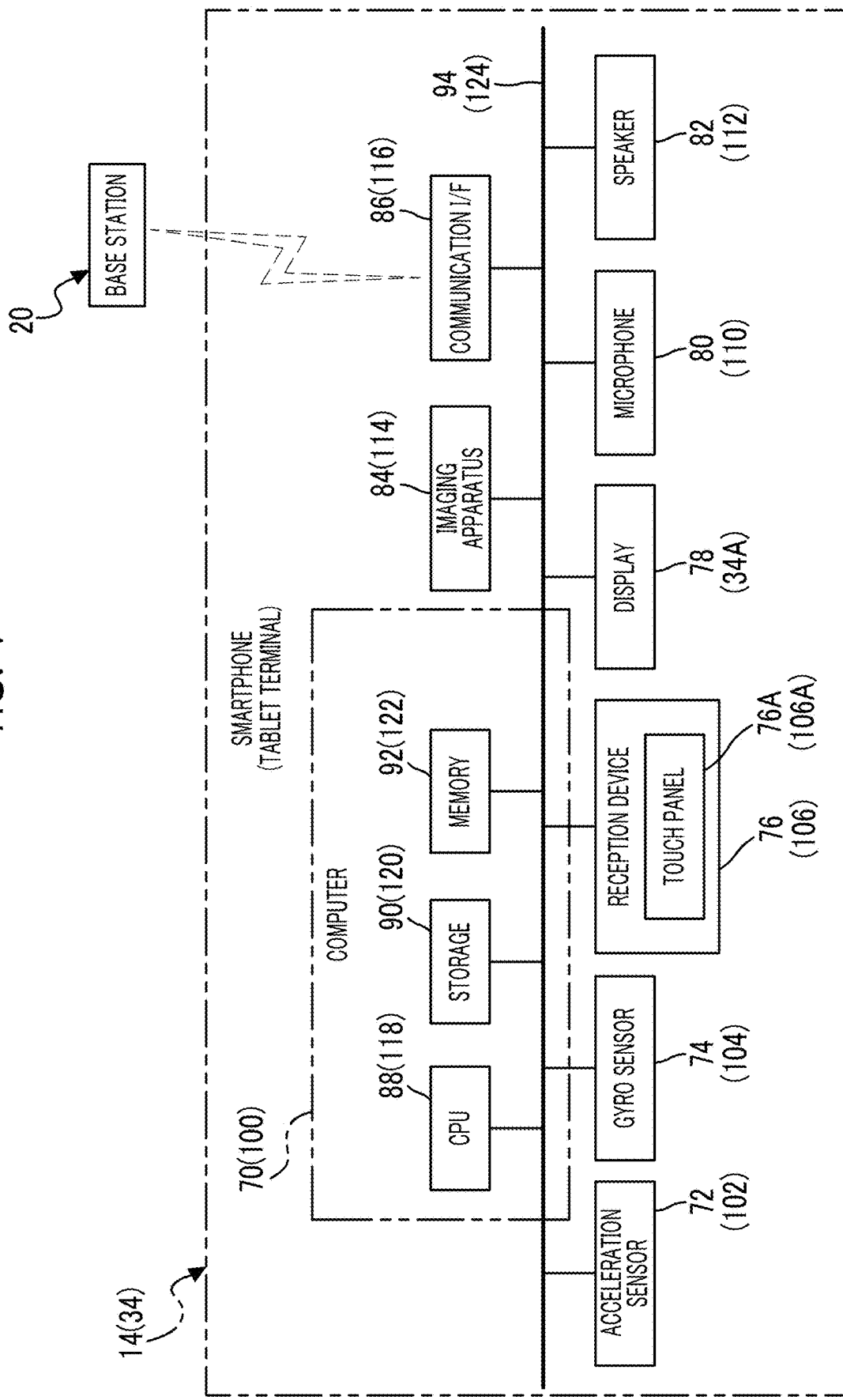
FIG. 4 is a block diagram showing an example of a hardware configuration of an electric system of each of a smartphone and a tablet terminal according to the embodiment.

For example, as shown in FIG. 4, the smartphone 14 comprises a computer 70, an acceleration sensor 72, a gyro sensor 74, a reception device 76, a display 78, a microphone 80, a speaker 82, an imaging apparatus 84, and a communication I/F 86. The computer 70 comprises a CPU 88, a storage 90, and a memory 92, and the CPU 88, the storage 90, and the memory 92 are connected to each other via a bus line 94. In the example shown in FIG. 4, for convenience of illustration, one bus line is shown as the bus line 94, but a data bus, an address bus, a control bus, and the like are included in the bus line 94.

The CPU 88 controls the whole smartphone 14. Various parameters and various programs are stored in the storage 90. The storage 90 is a non-volatile storage device. Here, an EEPROM is adopted as an example of the storage 90, but the technology of the present disclosure is not limited to this, and a mask ROM, an HDD, an SSD, or the like may be used. The memory 92 is a volatile storage device. Various pieces of information are transitorily stored in the memory 92, and the memory 92 is used as a work memory by the CPU 88. Here, a DRAM is adopted as an example of the memory 92, but the technology of the present disclosure is not limited to this, and another type of volatile storage device, such as an SRAM, may be used.

The acceleration sensor 72 measures acceleration of the smartphone 14 (hereinafter, also simply referred to as "acceleration"). The acceleration sensor 72 is connected to the bus line 94, and acceleration information indicating the acceleration measured by the acceleration sensor 72 is acquired by the CPU 88 via the bus line 94.

The gyro sensor 74 measures an angle around a yaw axis of the smartphone 14 (hereinafter, also referred to as "yaw angle"), an angle around a roll axis of the smartphone 14 (hereinafter, also referred to as "roll angle"), and an angle around a pitch axis of the smartphone 14 (hereinafter, also referred to as "pitch angle"). The gyro sensor 74 is connected to the bus line 94, and angle information indicating the yaw angle, the roll angle, and the pitch angle measured by the gyro sensor 74 is acquired by the CPU 88 via the bus line 94. Note that the acceleration sensor 72 and the gyro sensor 74 may be installed as an integrated multi-axes (for example, 6 axes) sensor.

The reception device 76 is an example of a "reception unit (reception device)" according to the technology of the present disclosure, and receives the instruction from the user or the like of the smartphone 14 (here, for example, the spectator 28). Examples of the reception device 76 include a touch panel 76A, and a hard key. The reception device 76 is connected to the bus line 94, and the CPU 88 acquires the instruction received by the reception device 76.

The display 78 is connected to the bus line 94 and displays various pieces of information under the control of the CPU 88. Examples of the display 78 include a liquid crystal display. Note that another type of display, such as an organic EL display, may be adopted as the display 78 without being limited to the liquid crystal display.

The smartphone 14 comprises a touch panel display, and the touch panel display is realized by the touch panel 76A and the display 78. That is, the touch panel display is formed by superimposing the touch panel 76A on a display region of the display 78.

The microphone 80 converts a collected sound into an electric signal. The microphone 80 is connected to the bus line 94. The CPU 88 acquires the electric signal obtained by converting the sound collected by the microphone 80 via the bus line 94.

The speaker 82 converts the electric signal into the sound. The speaker 82 is connected to the bus line 94. The speaker 82 receives the electric signal output from the CPU 88 via the bus line 94, converts the received electric signal into the sound, and outputs the sound obtained by converting the electric signal to the outside of the smartphone 14.

The imaging apparatus 84 acquires an image showing a subject by imaging the subject. The imaging apparatus 84 is connected to the bus line 94. The image obtained by imaging the subject by the imaging apparatus 84 is acquired by the CPU 88 via the bus line 94.

The communication I/F 86 is connected to the base station 20 in the wirelessly communicable manner. The communication I/F 86 is realized by a device having an FPGA, for example. The communication I/F 86 is connected to the bus line 94. The communication I/F 86 controls the exchange of various pieces of information between the CPU 88 and an external device by the wireless communication method via the base station 20. Here, examples of the "external device" include the image generation device 12, the unmanned aerial vehicle 27, and the tablet terminal 34.

In addition, basically, the tablet terminal 34 has the same configuration as the smartphone 14. That is, the tablet terminal 34 comprises a computer 100, an acceleration sensor 102, a gyro sensor 104, a reception device 106, a touch panel 106A, a display 34A, a microphone 110, a speaker 112, an imaging apparatus 114, a communication I/F 116, a CPU 118, a storage 120, a memory 122, and a bus line 124.

The computer 100 corresponds to the computer 70. The acceleration sensor 102 corresponds to the acceleration sensor 72. The gyro sensor 104 corresponds to the gyro sensor 74. The reception device 106 corresponds to the reception device 76. The touch panel 106A corresponds to the touch panel 76A. The display 34A corresponds to the display 78. The microphone 110 corresponds to the microphone 80. The speaker 112 corresponds to the speaker 82. The imaging apparatus 114 corresponds to the imaging apparatus 84. The communication I/F 116 corresponds to the communication I/F 86. The CPU 118 corresponds to the CPU 88. The storage 120 corresponds to the storage 90. The memory 122 corresponds to the memory 92. The bus line 124 corresponds to the bus line 94. Similar to the bus lines 64 and 94, the bus line 124 also includes a data bus, an address bus, a control bus, and the like. The tablet terminal 34 is different from the smartphone 14 in that a size of the touch panel 106A is larger than a size of the touch panel 76A and a size of the display 34A is larger than a size of the display 78.

Figure 5:
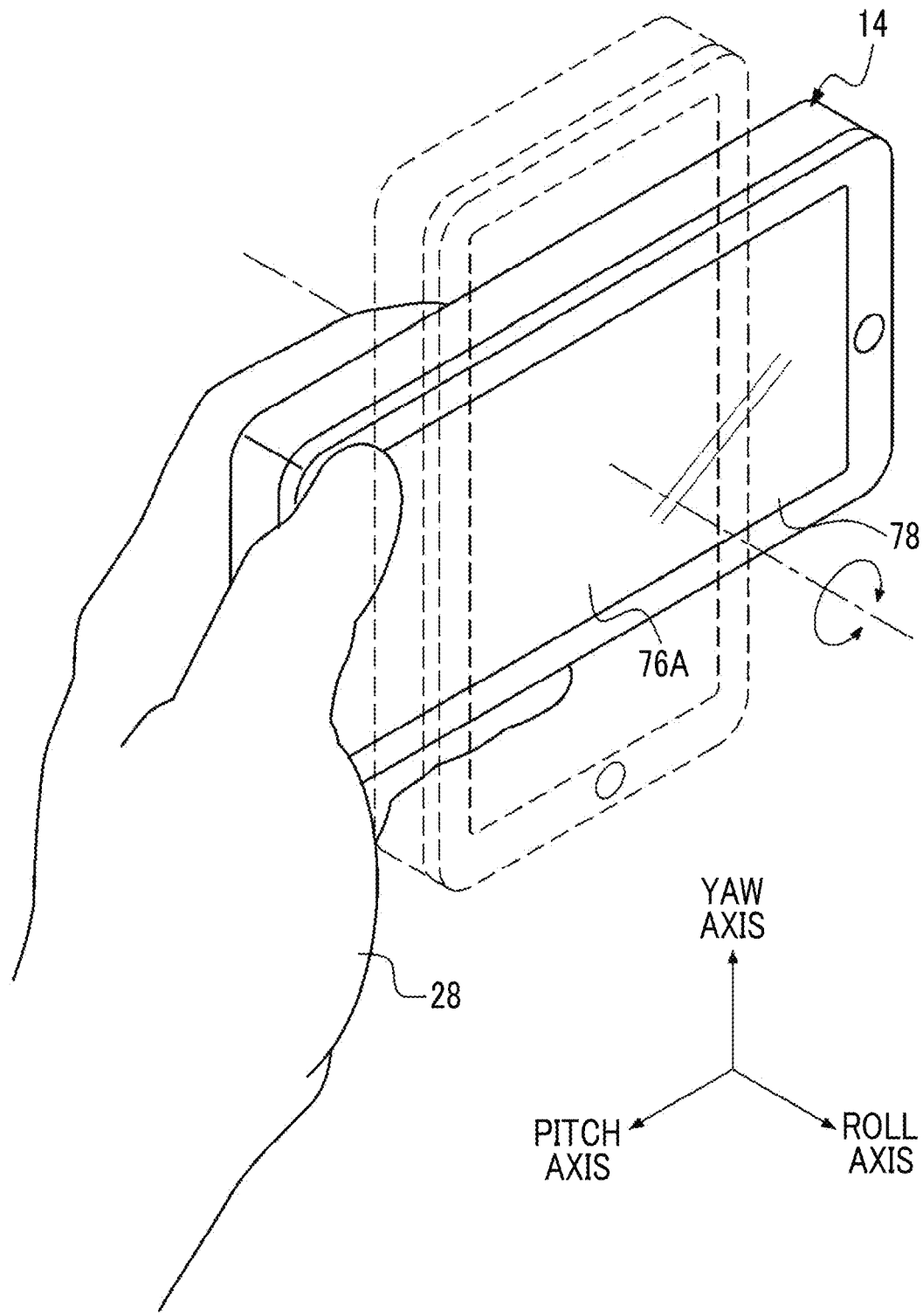
FIG. 5 is a conceptual diagram showing an example of an aspect in which the smartphone according to the embodiment is rotated around a roll axis.
Figure 6:
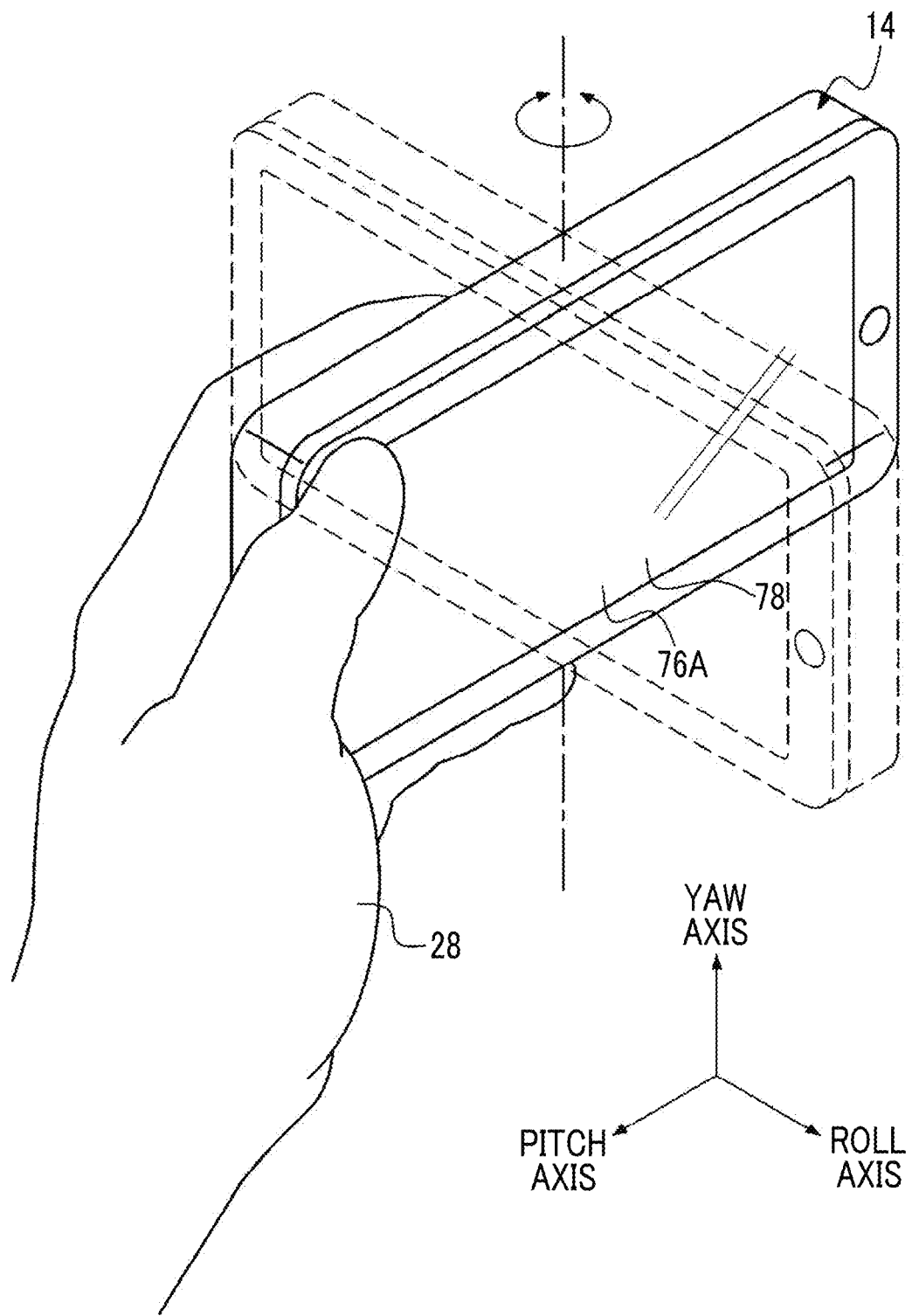
FIG. 6 is a conceptual diagram showing an example of an aspect in which the smartphone according to the embodiment is rotated around a yaw axis.
Figure 7:
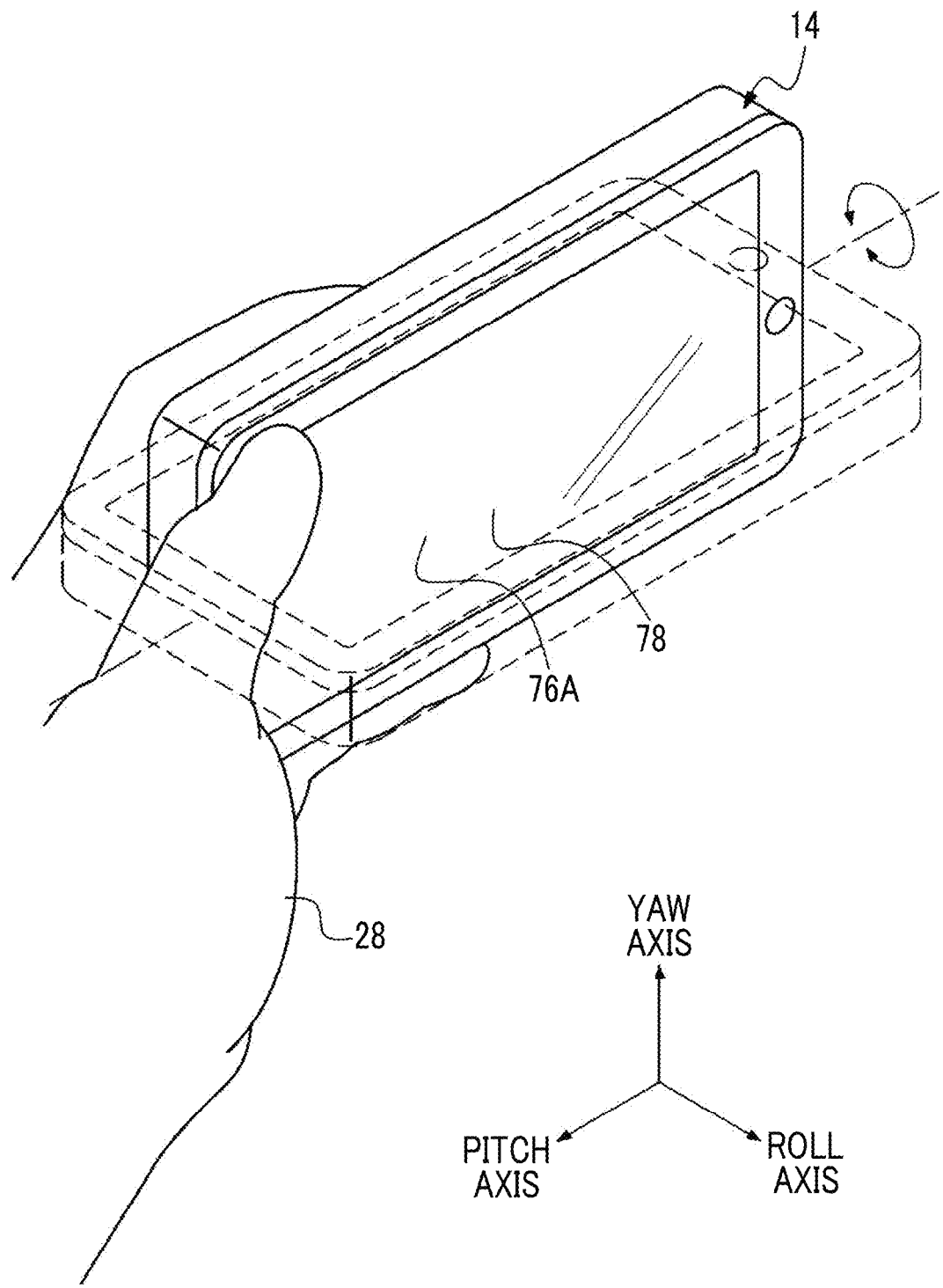
FIG. 7 is a conceptual diagram showing an example of an aspect in which the smartphone according to the embodiment is rotated around a pitch axis.

For example, as shown in FIG. 5, the roll axis is an axis that passes through a center of the display 78 of the smartphone 14. A rotation angle of the smartphone 14 around the roll axis is measured by the gyro sensor 74 as the roll angle. In addition, as shown in FIG. 6, for example, the yaw axis is an axis that passes through a center of a lateral peripheral surface of the smartphone 14 in a longitudinal direction of the lateral peripheral surfaces. A rotation angle of the smartphone 14 around the yaw axis is measured by the gyro sensor 74 as the yaw angle. Further, as shown in FIG.

7, for example, the pitch axis is an axis that passes through a center of the lateral peripheral surface of the smartphone 14 in a lateral direction of the lateral peripheral surfaces. The rotation angle of the smartphone 14 around the pitch axis is measured by the gyro sensor 74 as the pitch angle.

Figure 8:
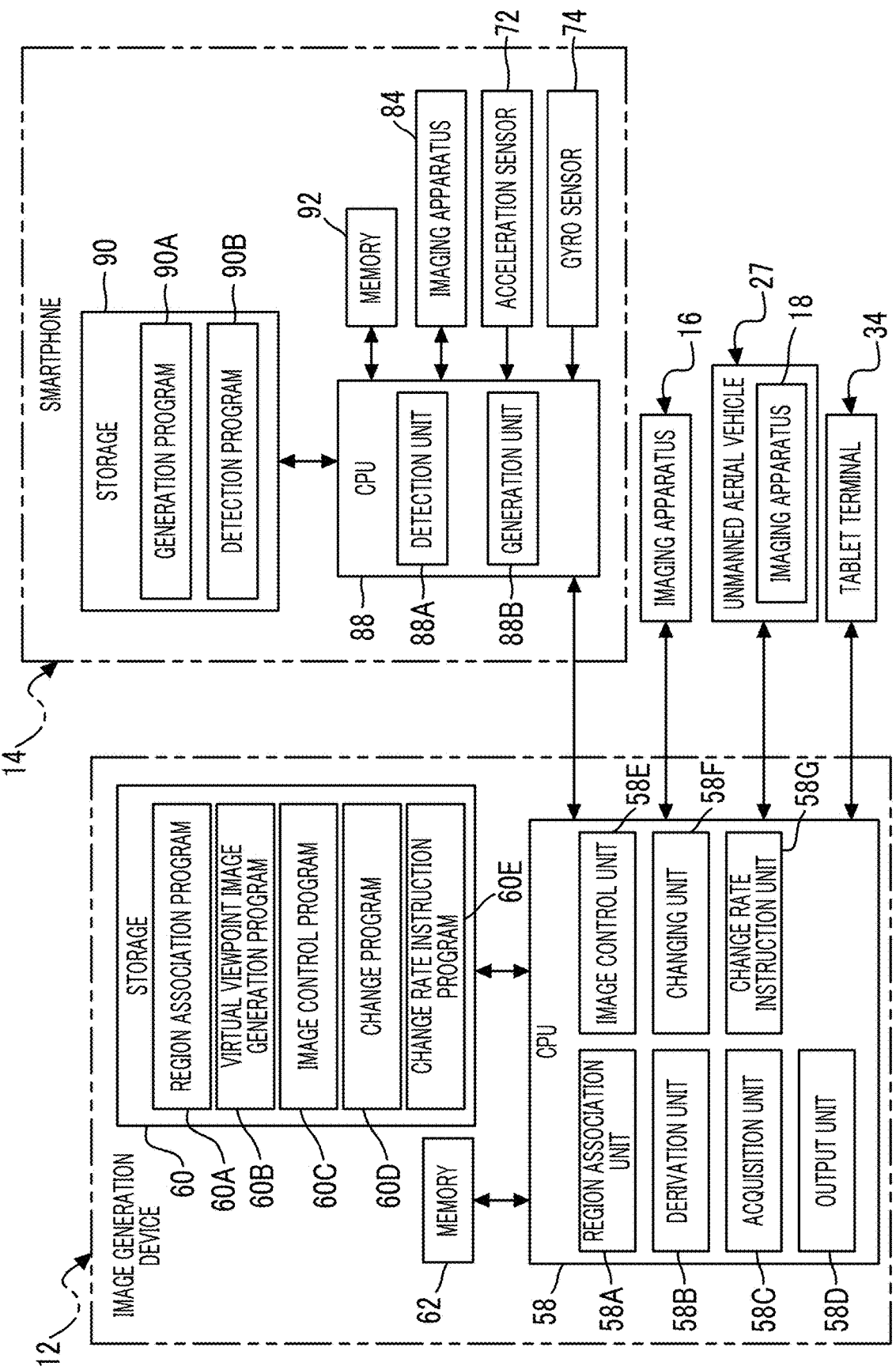
FIG. 8 is a block diagram showing an example of a main function of the image generation device and the smartphone according to the embodiment.

For example, as shown in FIG. 8, in the smartphone 14, the storage 90 stores a generation program 90A and a detection program 90B. Note that, in the following, in a case in which a distinction is not necessary, the generation program 90A and the detection program 90B are referred to as a "smartphone side program" without reference numeral.

The CPU 88 is an example of a "processor" according to the technology of the present disclosure, and the memory 92 is an example of a "memory" according to the technology of the present disclosure. The CPU 88 reads out the smartphone side program from the storage 90, and expands the readout smartphone side program in the memory 92. The CPU 88 exchanges various pieces of information with the image generation device 12 according to the smartphone side program expanded in the memory 92.

The CPU 88 reads out the generation program 90A from the storage 90, and expands the readout generation program 90A in the memory 92. The CPU 88 is operated as a generation unit 88B according to the generation program 90A expanded in the memory 92. The CPU 88 is operated as the generation unit 88B to execute a generation process (see FIG. 25), which will be described below. In addition, the CPU 88 reads out the detection program 90B from the storage 90 and expands the readout detection program 90B in the memory 92. The CPU 88 is operated as a detection unit 88A according to the detection program 90B expanded in the memory 92. The CPU 88 is operated as the detection unit 88A to execute a detection process (see FIG. 26), which will be described below.

For example, as shown in FIG. 8, in the image generation device 12, a region association program 60A, a virtual viewpoint image generation program 60B, an image control program 60C, a change program 60D, and a change rate instruction program 60E are stored in the storage 60. Note that, in the following, in a case in which a distinction is not necessary, the region association program 60A, the virtual viewpoint image generation program 60B, the image control program 60C, the change program 60D, and the change rate instruction program 60E are referred to as an "image generation device side program" without reference numeral.

The CPU 58 is an example of a "processor" according to the technology of the present disclosure, and the memory 62 is an example of a "memory" according to the technology of the present disclosure. The CPU 58 reads out the image generation device side program from the storage 60, and expands the readout image generation device side program in the memory 62. The CPU 58 exchanges various pieces of information with the smartphone 14, the imaging apparatus 16, the unmanned aerial vehicle 27, and the tablet terminal 34 according to the image generation device side program expanded in the memory 62.

The CPU 58 reads out the region association program 60A from the storage 60, and expands the readout region association program 60A in the memory 62. The CPU 58 is operated as a region association unit 58A according to the region association program 60A expanded in the memory 62. The CPU 58 is operated as the region association unit 58A to execute a region association process (see FIG. 27), which will be described below.

The CPU 58 reads out the virtual viewpoint image generation program 60B from the storage 60, and expands the readout virtual viewpoint image generation program 60B in the memory 62. The CPU 58 is operated as a derivation unit 58B, an acquisition unit 58C, and an output unit 58D according to the virtual viewpoint image generation program 60B expanded in the memory 62. The CPU 58 is operated as the derivation unit 58B, the acquisition unit 58C, and the output unit 58D to execute a virtual viewpoint image generation process (see FIG. 28), which will be described below.

The CPU 58 reads out the image control program 60C from the storage 60, and expands the readout image control program 60C in the memory 62. The CPU 58 is operated as an image control unit 58E according to the image control program 60C expanded in the memory 62. The CPU 58 is operated as the image control unit 58E to execute an image control process (see FIG. 29), which will be described below.

The CPU 58 reads out the change program 60D from the storage 60, and expands the readout change program 60D in the memory 62. The CPU 58 is operated as a changing unit 58F according to the change program 60D expanded in the memory 62. The CPU 58 is operated as the changing unit 58F to execute a change process (see FIG. 30), which will be described below.

The CPU 58 reads out the change rate instruction program 60E from the storage 60, and expands the readout change rate instruction program 60E in the memory 62. The CPU 58 is operated as a change rate instruction unit 58G according to the change rate instruction program 60E expanded in the memory 62. The CPU 58 is operated as the change rate instruction unit 58G to execute a change rate instruction process (see FIG. 31), which will be described below.

Figure 9:
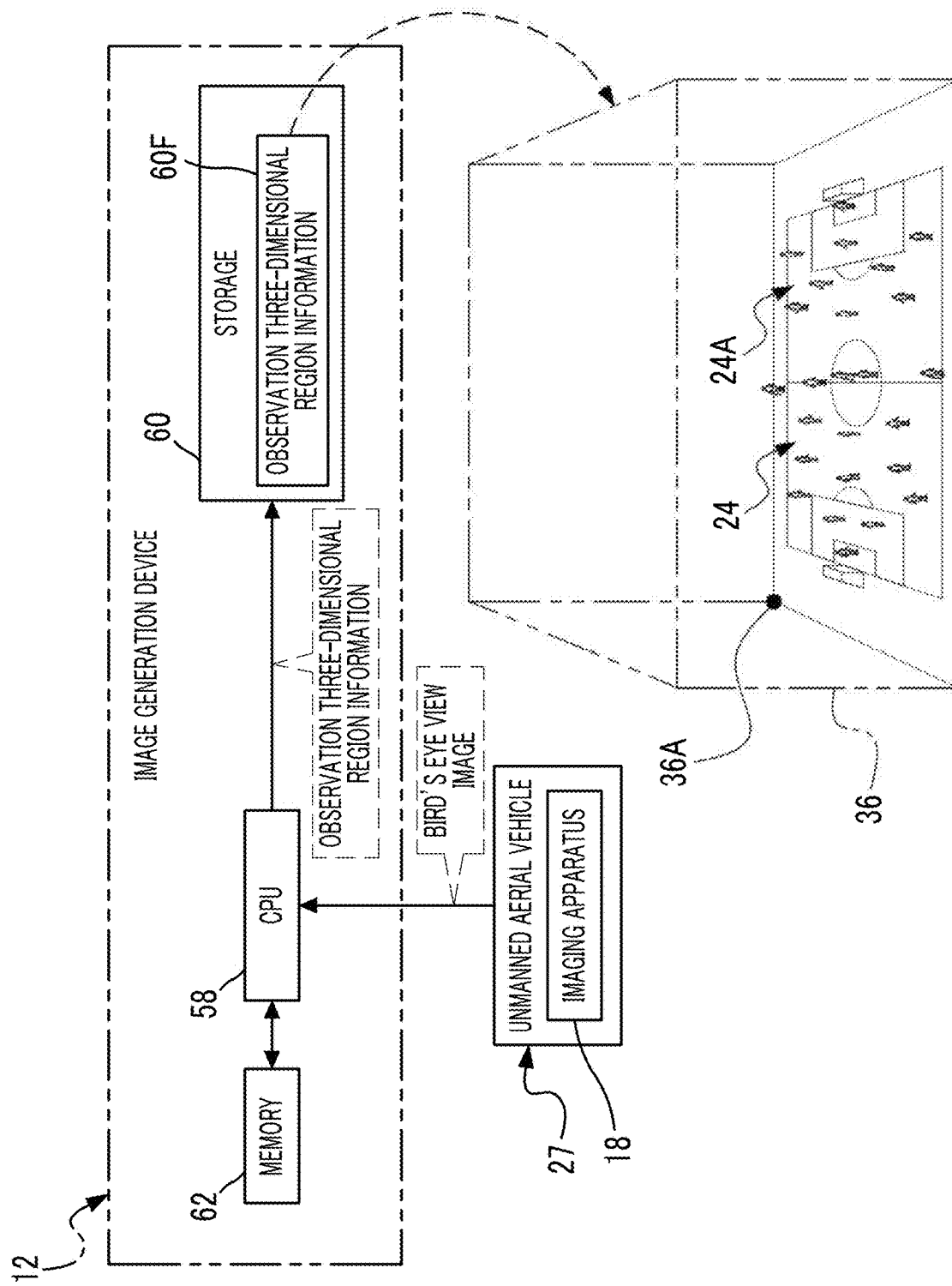
FIG. 9 is a conceptual diagram provided for describing an example of a generation method of an observation three-dimensional region by the image generation device according to the embodiment.

In the image generation device 12, the storage 60 stores observation three-dimensional region information 60F. The observation three-dimensional region information 60F is information indicating the observation three-dimensional region 36. In an example shown in FIG. 9, the soccer field corresponding plane 24A has an observation reference point 36A. The soccer field corresponding plane 24A is a plane formed in a rectangular shape. The observation reference point 36A is one corner of four corners defining the soccer field corresponding plane 24A, and is a reference point applied to the observation three-dimensional region 36. The observation three-dimensional region information 60F refers to, for example, a three-dimensional coordinate (hereinafter, also referred to as "observation three-dimensional region coordinate") indicating a position in the observation three-dimensional region 36 with the observation reference point 36A as an origin.

The observation three-dimensional region information 60F is information defined based on a bird's-eye view image showing the soccer field 24 in a bird's-eye view from the sky. Here, the "bird's-eye view image" is an example of a "first observation three-dimensional region image" and a "second observation three-dimensional region image" according to the technology of the present disclosure. The bird's-eye view image is obtained by imaging the image of the soccer field 24 by the imaging apparatus 18 in a state in which the unmanned aerial vehicle 27 has a bird's-eye view on the soccer field 24 from the sky. The CPU 58 acquires the bird's-eye view image from the unmanned aerial vehicle 27, specifies the observation reference point 36A based on the acquired bird's-eye view image, and generates the soccer field corresponding plane 24A with the specified observation reference point 36A as one corner of the four corners. The CPU 58 generates the observation three-dimensional region information 60F based on the soccer field corresponding plane 24A. That is, the CPU 58 generates the observation three-dimensional region information 60F indicating the observation three-dimensional region 36 with the soccer field corresponding plane 24A as the bottom plane. In this way, the observation three-dimensional region 36 is a three-dimensional region defined based on the bird's-eye view image. The CPU 58 stores the generated observation three-dimensional region information 60F in the storage 60.

Figure 10:
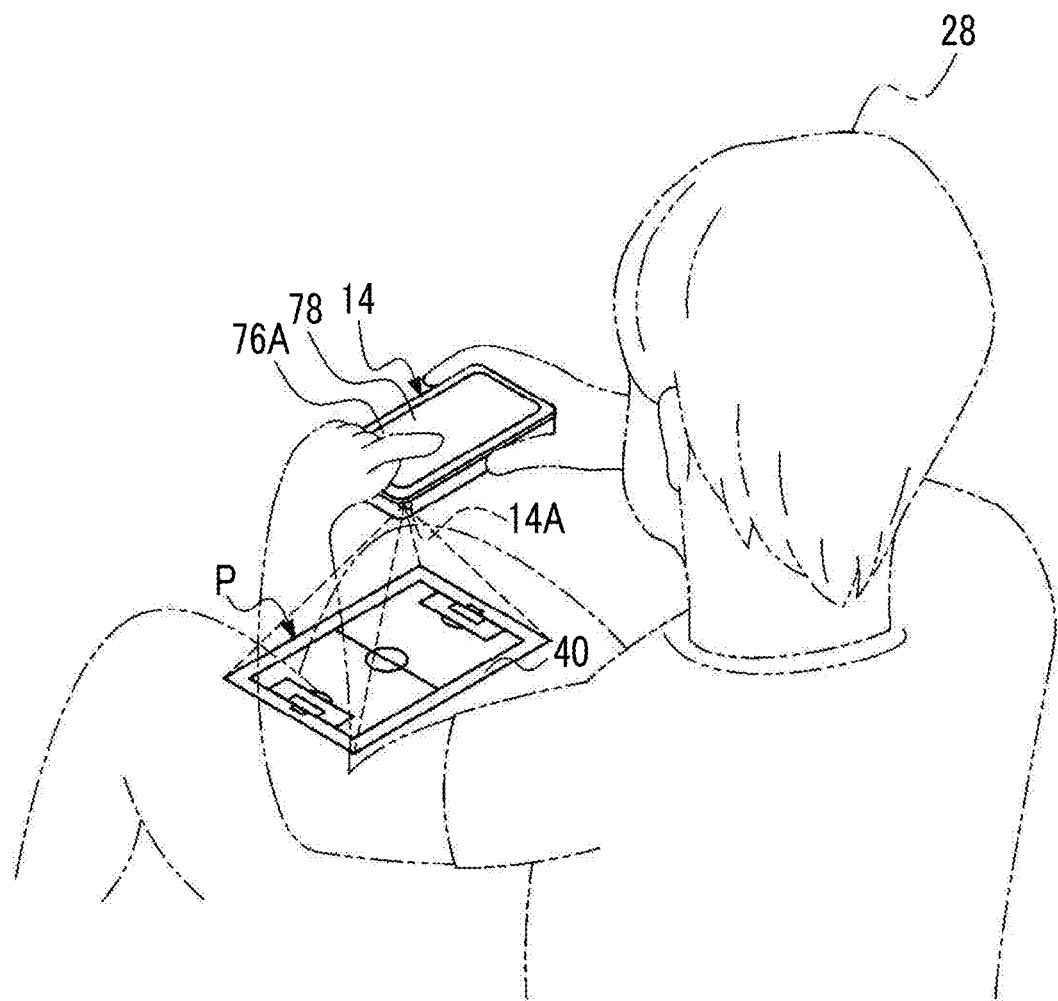
FIG. 10 is a conceptual diagram showing an example of an aspect in which a recording medium P is imaged by the smartphone according to the embodiment.

As shown in FIG. 10, for example, the spectator 28 images the reference subject 40 by operating the smartphone 14 in order to define the instruction three-dimensional region 38 (see FIG. 2). For example, in a state in which the subject side lens 14A of the smartphone 14 is oriented to the reference subject 40 from above the reference subject 40, in a case in which an instruction (hereinafter, also referred to as an "imaging start instruction") for starting imaging by the imaging apparatus 16 is received by the touch panel 76A, the reference subject 40 is imaged by the imaging apparatus 16.

Figure 11:
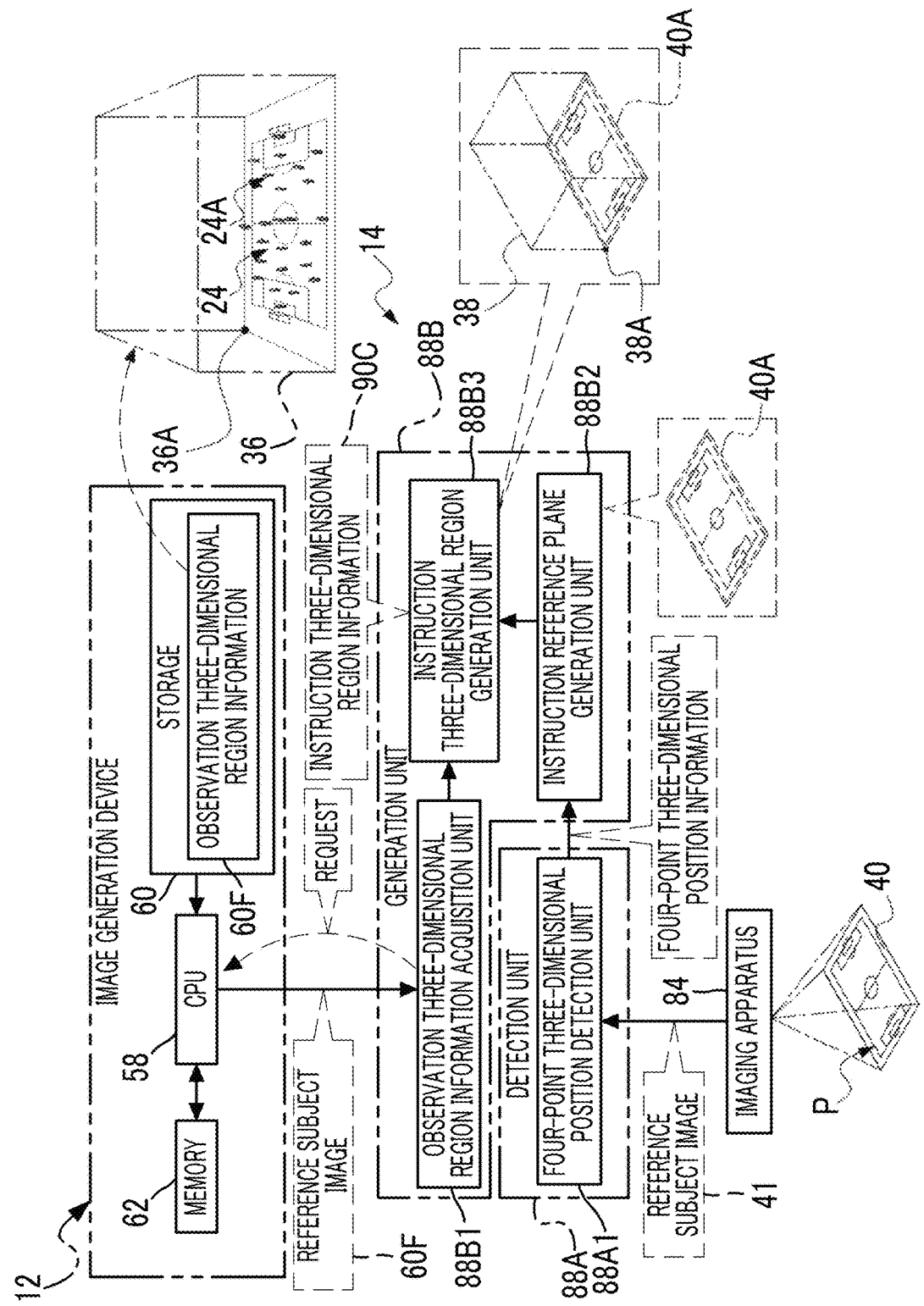
FIG. 11 is a conceptual diagram provided for describing an example of a generation method of an instruction three-dimensional region by a generation unit of the smartphone according to the embodiment.

For example, as shown in FIG. 11, in the smartphone 14, the detection unit 88A comprises a four-point three-dimensional position detection unit 88A1. The detection unit 88A detects at least three points of the three-dimensional positions in the instruction three-dimensional region 38. Here, the detection unit 88A detects four points of the three-dimensional positions in the instruction three-dimensional region 38. Specifically, the detection unit 88A detects four points of the three-dimensional positions in the instruction three-dimensional region 38 by using the four-point three-dimensional position detection unit 88A1. The four-point three-dimensional position detection unit 88A1 acquires the reference subject image 41 obtained by imaging the reference subject 40 by the imaging apparatus 84 from the imaging apparatus 84. The four-point three-dimensional position detection unit 88A1 detects the positions of the four corners of the reference subject 40 indicated by the reference subject image 41 acquired from the imaging apparatus 84 as the four points of the three-dimensional positions, and generates four-point three-dimensional position information indicating a relative positional relationship between the detected positions of four corners.

The generation unit 88B generates the instruction three-dimensional region 38 based on the instruction reference plane 40A specified by using at least three points of the three-dimensional positions detected by the detection unit 88A. Here, the instruction three-dimensional region 38 is generated based on the instruction reference plane 40A specified by using the reference subject image 41. The instruction reference plane 40A is specified by using four points of the three-dimensional positions detected from the reference subject image 41.

The generation unit 88B comprises an observation three-dimensional region information acquisition unit 88B1, an instruction reference plane generation unit 88B2, and an instruction three-dimensional region generation unit 88B3 in order to generate the instruction three-dimensional region 38.

The observation three-dimensional region information acquisition unit 88B1 requests the CPU 58 of the image generation device 12 to acquire the observation three-dimensional region information 60F from the storage 60 and transmit the observation three-dimensional region information 60F. The CPU 58 acquires the observation three-dimensional region information 60F from the storage 60 in response to the request from the observation three-dimensional region information acquisition unit 88B1, and transmits the acquired observation three-dimensional region information 60F from the observation three-dimensional region information acquisition unit 88B1. The observation three-dimensional region information acquisition unit 88B1 acquires the observation three-dimensional region information 60F by receiving the observation three-dimensional region information 60F transmitted from the CPU 58.

The instruction reference plane generation unit 88B2 acquires the four-point three-dimensional position information from the four-point three-dimensional position detection unit 88A1 and generates the instruction reference plane 40A by using the acquired four-point three-dimensional position information. The instruction reference plane 40A is a plane defined by the positions of the four corners of the reference subject 40 and corresponding to a plane in which the soccer field corresponding plane 24A is reduced by the predetermined magnification.

The instruction three-dimensional region generation unit 88B3 acquires the observation three-dimensional region information 60F from the observation three-dimensional region information acquisition unit 88B1 and acquires the instruction reference plane 40A from the instruction reference plane generation unit 88B2. The instruction three-dimensional region generation unit 88B3 refers to the observation three-dimensional region information 60F and specifies one corner corresponding to the position of the observation reference point 36A among four corners of the instruction reference plane 40A as an instruction reference point 38A. The instruction reference point 38A is the reference point applied to the instruction three-dimensional region 38.

In the information processing system 10, the reference points for the observation three-dimensional region 36 and the instruction three-dimensional region 38 are classified into the observation reference point 36A and the instruction reference point 38A, and the instruction reference point 38A is located at a different position from the observation reference point 36A and has a correspondence with the observation reference point 36A. Note that, in the following, in a case in which a distinction is not necessary, the observation reference point 36A and the instruction reference point 38A are also simply referred to as the "reference point" without reference numeral.

The instruction three-dimensional region generation unit 88B3 refers to the observation three-dimensional region information 60F, the instruction reference plane 40A, and the positional relationship between the observation reference point 36A and the instruction reference point 38A, and generates the three-dimensional region having a reduced relationship with the observation three-dimensional region 36 in which the virtual viewpoint and the virtual visual line are defined as the instruction three-dimensional region 38. Here, the "reduced relationship" refers to, for example, a relationship reduced by the predetermined magnification with respect to the observation three-dimensional region 36.

The instruction three-dimensional region 38 has the instruction reference point 38A as the origin corresponding to the observation reference point 36A, and is defined by instruction three-dimensional region information 90C as the three-dimensional region having the similarity relationship with the observation three-dimensional region 36. The instruction three-dimensional region information 90C is generated by the instruction three-dimensional region generation unit 88B3 based on the observation three-dimensional region information 60F, the instruction reference plane 40A, and the positional relationship between the observation reference point 36A and the instruction reference point 38A. The instruction three-dimensional region information 90C refers to, for example, the three-dimensional coordinate (hereinafter, also referred to as an "instruction three-dimensional region coordinate") indicating the position in the instruction three-dimensional region 38 with the instruction reference point 38A as the origin and having a correspondence with the observation three-dimensional region information 60F.

Figure 12:
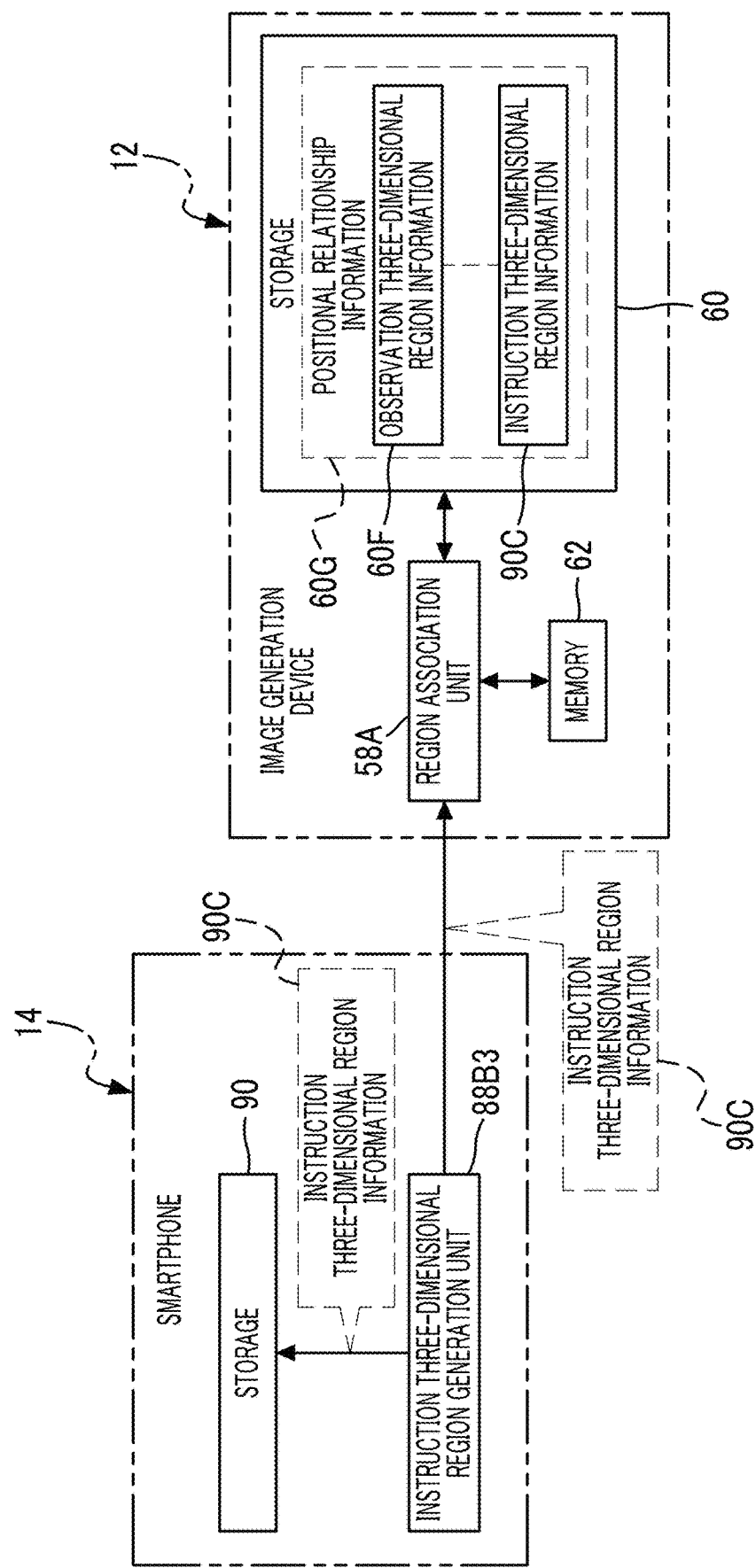
FIG. 12 is a conceptual diagram provided for describing an example of a generation method of positional relationship information by a region association unit of the image generation device according to the embodiment.

For example, as shown in FIG. 12, the instruction three-dimensional region generation unit 88B3 stores the generated instruction three-dimensional region information 90C in the storage 90, and outputs the generated instruction three-dimensional region information 90C to the region association unit 58A. The region association unit 58A generates positional relationship information 60G indicating the relative positional relationship between the observation three-dimensional region 36 and the instruction three-dimensional region 38, and stores the generated positional relationship information 60G in the storage 60.

Here, the relative positional relationship refers to the relationship (relative relationship) between a position of the observation three-dimensional region 36 with respect to the reference point and a position of the instruction three-dimensional region 38 with respect to the reference point. In addition, the positional relationship information 60G is information in which the observation three-dimensional region information 60F and the instruction three-dimensional region information 90C are associated with each other. The information in which the observation three-dimensional region information 60F and the instruction three-dimensional region information 90C are associated with each other refers to information in which the observation three-dimensional region coordinate and the instruction three-dimensional region coordinate are associated with each other on a one-to-one basis for the positions of the observation three-dimensional region 36 and the instruction three-dimensional region 38 corresponding to each other. Note that, in the positional relationship information 60G, the relative positional relationship between the observation three-dimensional region coordinate and the instruction three-dimensional region coordinate need only be associated with each other by any unit, such as a table or an arithmetic expression.

Figure 13:
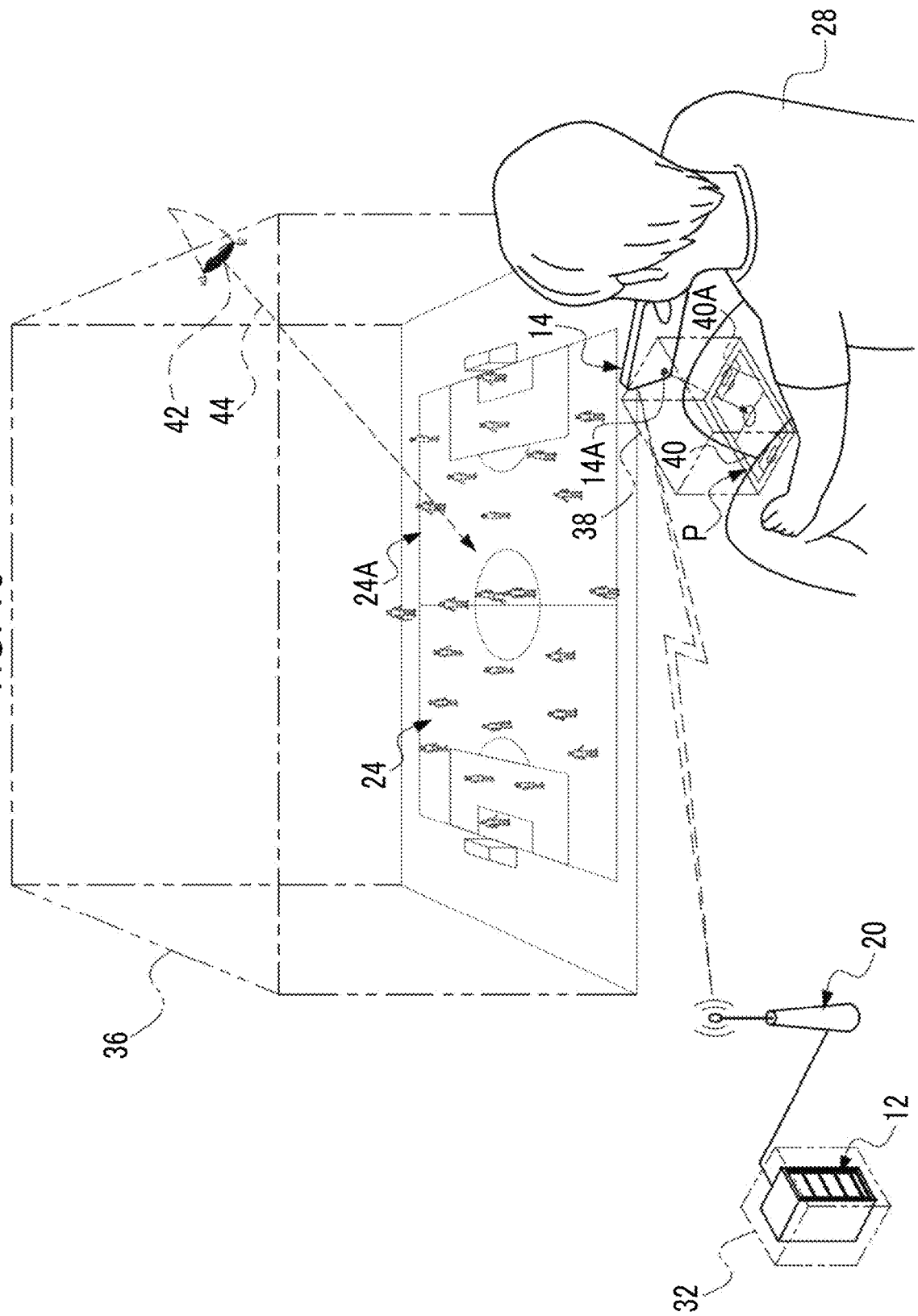
FIG. 13 is a conceptual diagram showing an example of an aspect in which the instruction three-dimensional region according to the embodiment is used.

By using the instruction three-dimensional region information 90C defined as described above, as shown in FIG. 13, for example, the position and the posture of the smartphone 14 in the instruction three-dimensional region 38 can be detected by the smartphone 14. In a case in which the position and the posture of the smartphone 14 in the instruction three-dimensional region 38 are specified by the smartphone 14, the notification of the position and the posture of the specified smartphone 14 is made to the image generation device 12 via the base station 20. Then, by using the positional relationship information 60G, the viewpoint 42 and the visual line 44 in the observation three-dimensional region 36 are designated by the image generation device 12 from the position and the posture of the smartphone 14 in the instruction three-dimensional region 38.

Figure 14:
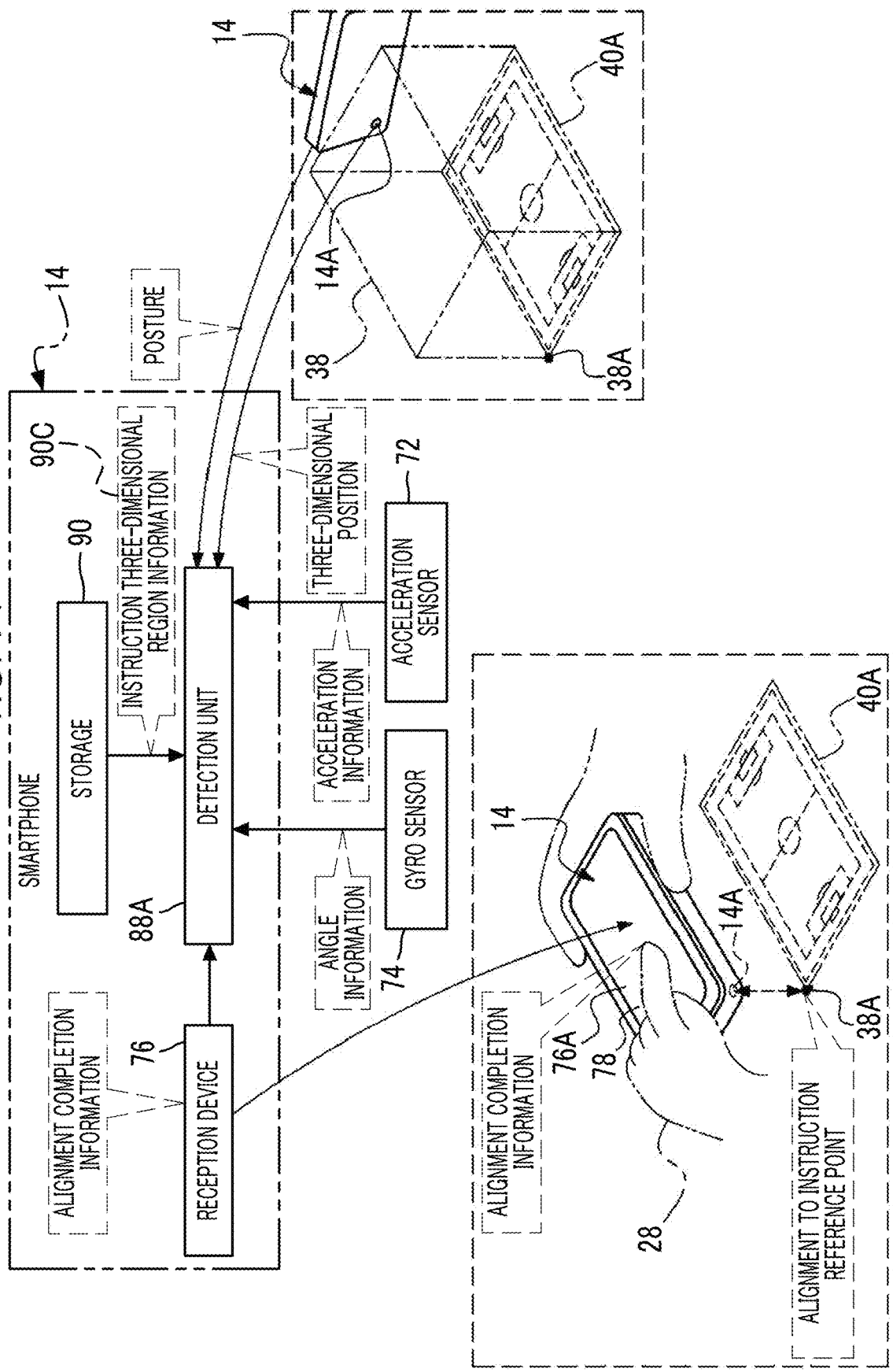
FIG. 14 is a conceptual diagram provided for describing an example of a detection method of a smartphone position and a smartphone posture in the instruction three-dimensional region according to the embodiment.

In order to enable the smartphone 14 to detect the position and the posture of the smartphone 14 in the instruction three-dimensional region 38, as shown in FIG. 14, for example, the spectator 28 performs alignment of the smartphone 14 with respect to the instruction reference point 38A. In this case, in a state in which the subject side lens 14A is aligned with respect to the instruction reference point 38A, the touch panel 76A is operated by the spectator 28, so that alignment completion information indicating that the alignment is completed is received by the touch panel 76A. As a result, the detection unit 88A detects that the alignment of the smartphone 14 with respect to the instruction reference point 38A is completed. That is, the detection unit 88A detects the position of the smartphone 14 in the instruction three-dimensional region 38 at the point in time when the alignment completion information is received by the touch panel 76A based on the acceleration information from the acceleration sensor, and decides the detected position as the instruction reference point 38A. Note that the position of the smartphone 14 in the instruction three-dimensional region 38 specifically refers to the three-dimensional position of the smartphone 14 in the instruction three-dimensional region 38.

In a case in which it is detected that the alignment of the smartphone 14 with respect to the instruction reference point 38A is completed, the detection unit 88A acquires angle information from the gyro sensor 74 at a predetermined time interval (for example, 0.05 second interval), and acquires acceleration information from the acceleration sensor. Note that the angle information and the acceleration information acquired by the detection unit 88A are examples of a "detection result of the detection unit" according to the technology of the present disclosure.

The detection unit 88A acquires the instruction three-dimensional region information 90C from the storage 90. Then, the detection unit 88A detects the three-dimensional position of the subject side lens 14A in the instruction three-dimensional region 38 as the three-dimensional position of the smartphone 14 by using the acquired instruction three-dimensional region information 90C and the acceleration information acquired continuously from the point in time when the alignment is completed. In addition, the detection unit 88A detects the posture of the smartphone 14 in the instruction three-dimensional region 38 by using the latest angle information acquired from the gyro sensor 74. Note that, in the following, the three-dimensional position of the subject side lens 14A in the instruction three-dimensional region 38 is also referred to as a "smartphone position", and the posture of the smartphone 14 in the instruction three-dimensional region 38 is also referred to as a "smartphone posture".

Figure 15:
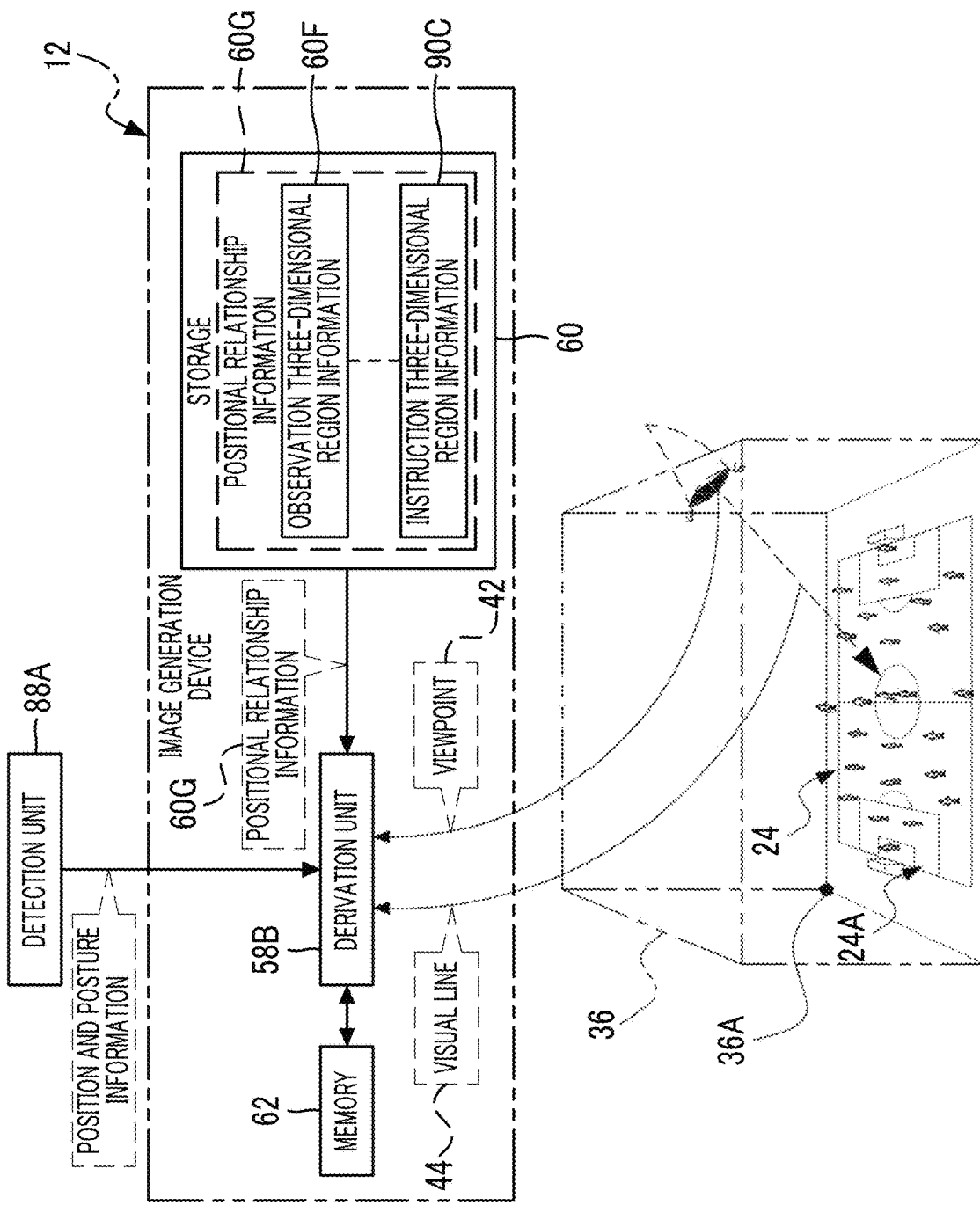
FIG. 15 is a conceptual diagram provided for describing an example of derivation methods of an observation viewpoint and an observation visual line by a derivation unit of the image generation device according to the embodiment.

For example, as shown in FIG. 15, the detection unit 88A generates position and posture information indicating the detected smartphone position and the detected smartphone posture, and outputs the generated position and posture information to the derivation unit 58B. The derivation unit 58B derives the viewpoint 42 and the visual line 44 corresponding to the detection results of the detection unit 88A depending on the positional relationship information 60G. The derivation unit 58B acquires the positional relationship information 60G from the storage 60 and acquires the position and posture information from the detection unit 88A in order to derive the viewpoint 42 and the visual line 44. Then, the derivation unit 58B derives the viewpoint 42 from the positional relationship information 60G and the position and posture information. Specifically, the derivation unit 58B derives the viewpoint 42 in the observation three-dimensional region 36 by deriving the observation three-dimensional region information 60F corresponding to the smartphone position indicated by the position and posture information from the positional relationship information 60G. Here, the derivation of the viewpoint 42 in the observation three-dimensional region 36 specifically refers to the derivation of the position of the viewpoint 42 in the observation three-dimensional region 36.

In addition, the derivation unit 58B derives the visual line 44 from the positional relationship information 60G and the position and posture information. Specifically, the derivation unit 58B derives the visual line 44 in the observation three-dimensional region 36 by deriving the observation three-dimensional region information 60F corresponding to the smartphone posture indicated by the position and posture information from the positional relationship information 60G. Here, the derivation of the visual line 44 in the observation three-dimensional region 36 specifically refers to the derivation of the direction of the visual line 44 in the observation three-dimensional region 36.

Note that, in the following, the viewpoint 42 derived by the derivation unit 58B is also simply referred to as an "observation viewpoint" without reference numeral, and the visual line 44 derived by the derivation unit 58B is simply referred to as an "observation visual line" without reference numeral.

Figure 16:
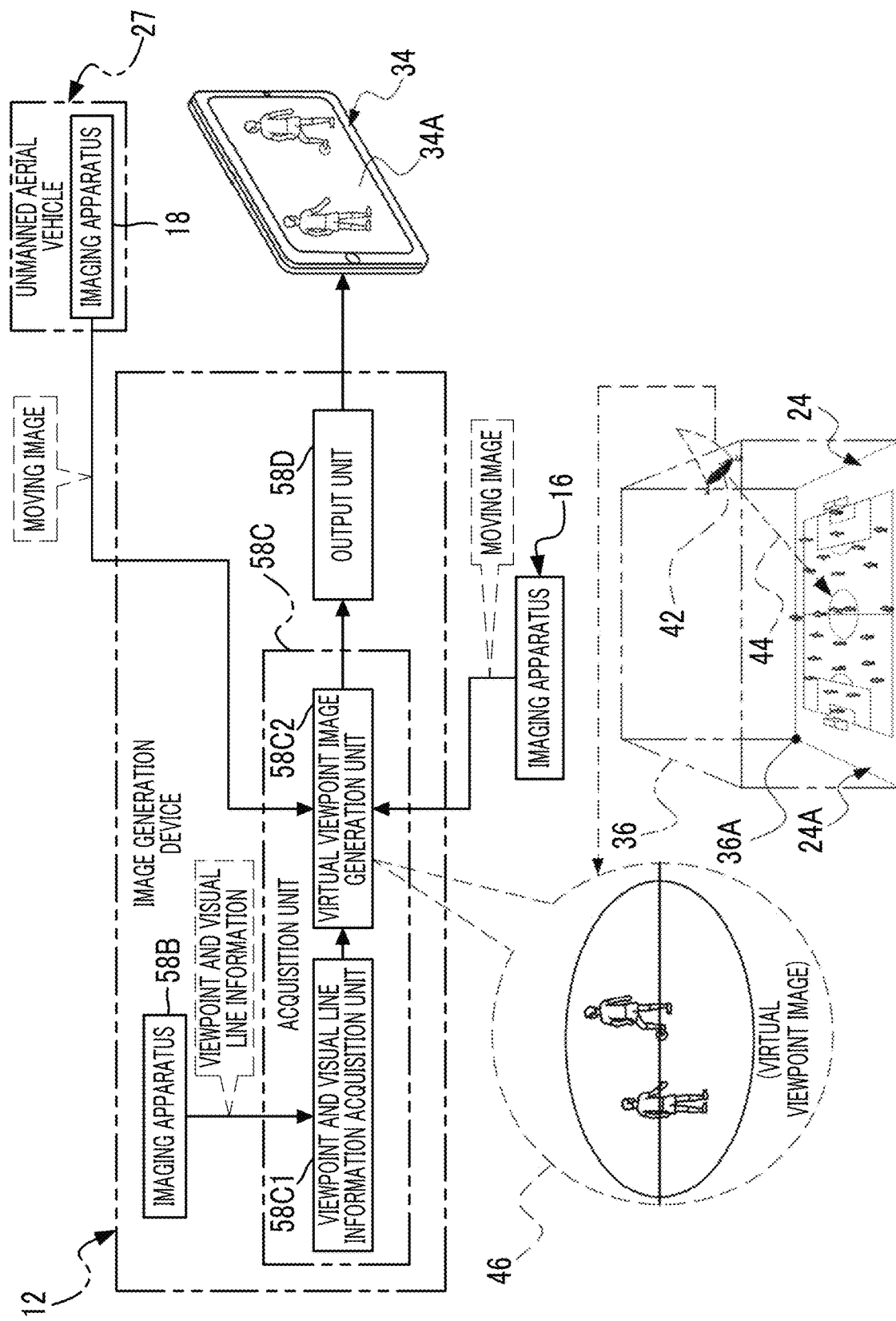
FIG. 16 is a conceptual diagram provided for describing an example of an acquisition method of a virtual viewpoint image by an acquisition unit of the image generation device according to the embodiment.

As shown in FIG. 16, for example, the derivation unit 58B generates viewpoint and visual line information indicating the derived observation viewpoint and the derived observation visual line, and outputs the generated viewpoint and visual line information to the acquisition unit 58C.

The acquisition unit 58C acquires the virtual viewpoint image 46 in a case in which the subject is observed with the observation viewpoint and the observation visual line derived by the derivation unit 58B. The acquisition unit 58C comprises a viewpoint and visual line information acquisition unit 58C1 and a virtual viewpoint image generation unit 58C2. The viewpoint and visual line information acquisition unit 58C1 acquires the viewpoint and visual line information from the derivation unit 58B.

The virtual viewpoint image generation unit 58C2 acquires the viewpoint and visual line information from the viewpoint and visual line information acquisition unit 58C1. In addition, the virtual viewpoint image generation unit 58C2 acquires the moving image from the plurality of imaging apparatuses 16, and acquires the bird's-eye view image obtained by being imaged by the imaging apparatus 18 from the unmanned aerial vehicle 27 as the moving image. Here, the moving image acquired from the plurality of imaging apparatuses 16 and the moving image acquired from the imaging apparatus 18 are examples of the "plurality of images" according to the technology of the present disclosure.

Note that although the moving image is described as an example here, the technology of the present disclosure is not limited to this, and a still image may be used. In addition, here, an aspect example is described in which the bird's-eye view image obtained by being imaged by the imaging apparatus 18 is also acquired by the virtual viewpoint image generation unit 58C2 and provided for generating the virtual viewpoint image 46, but the technology of the present disclosure is not limited to this. For example, only the plurality of images obtained by being imaged by the plurality of imaging apparatuses 16 may be acquired by the virtual viewpoint image generation unit 58C2 without using the bird's-eye view image for generating the virtual viewpoint image 46 and may be provided for generating the virtual viewpoint image 46 by the virtual viewpoint image generation unit 58C2. That is, the virtual viewpoint image may be generated only from the images obtained by being imaged by the plurality of imaging apparatuses 16 without using the image obtained by the imaging apparatus 18 (for example, a drone). In addition, in a case in which the image obtained from the imaging apparatus 18 (for example, a drone) is used, a more accurate virtual viewpoint image can be generated.

The virtual viewpoint image generation unit 58C2 generates the virtual viewpoint image 46 in a case in which the subject in the observation three-dimensional region is observed with the observation viewpoint and the observation visual line indicated by the viewpoint and visual line information based on the moving images acquired by the plurality of imaging apparatuses 16 and the moving image acquired by the imaging apparatus 18. As described above, the acquisition unit 58C acquires the virtual viewpoint image 46 by generating the virtual viewpoint image 46 by the virtual viewpoint image generation unit 58C2.

The output unit 58D outputs the virtual viewpoint image 46 acquired by the acquisition unit 58C to the tablet terminal 34. Specifically, the virtual viewpoint image 46 acquired by the acquisition unit 58C refers to the virtual viewpoint image 46 generated by the virtual viewpoint image generation unit 58C2. The tablet terminal 34 receives the virtual viewpoint image 46 output by the output unit 58D. The virtual viewpoint image 46 received by the tablet terminal 34 is displayed on the display 34A.

Note that, although an aspect example is described in which the virtual viewpoint image 46 is displayed on the display 34A here, the technology of the present disclosure is not limited to this. For example, an output destination of the virtual viewpoint image 46 by the output unit 58D may be a device other than the tablet terminal. The device other than the tablet terminal need only be a device that is connected to the image generation device 12 the communicable manner, and may be, for example, a home server or a personal computer installed at the home of the spectator 28 or may be a server or a personal computer installed in the place of a person other than the spectator 28, as well as the smartphone 14. In addition, the virtual viewpoint image 46 may be output to a host computer or the like that controls the image generation device 12. In addition, the virtual viewpoint image 46 may be output to the storage 60 of the image generation device 12, and the virtual viewpoint image 46 may be stored in the storage 60. In addition, the virtual viewpoint image 46 may be output to an external storage, such as a USB memory and an external SSD.

Figure 17:
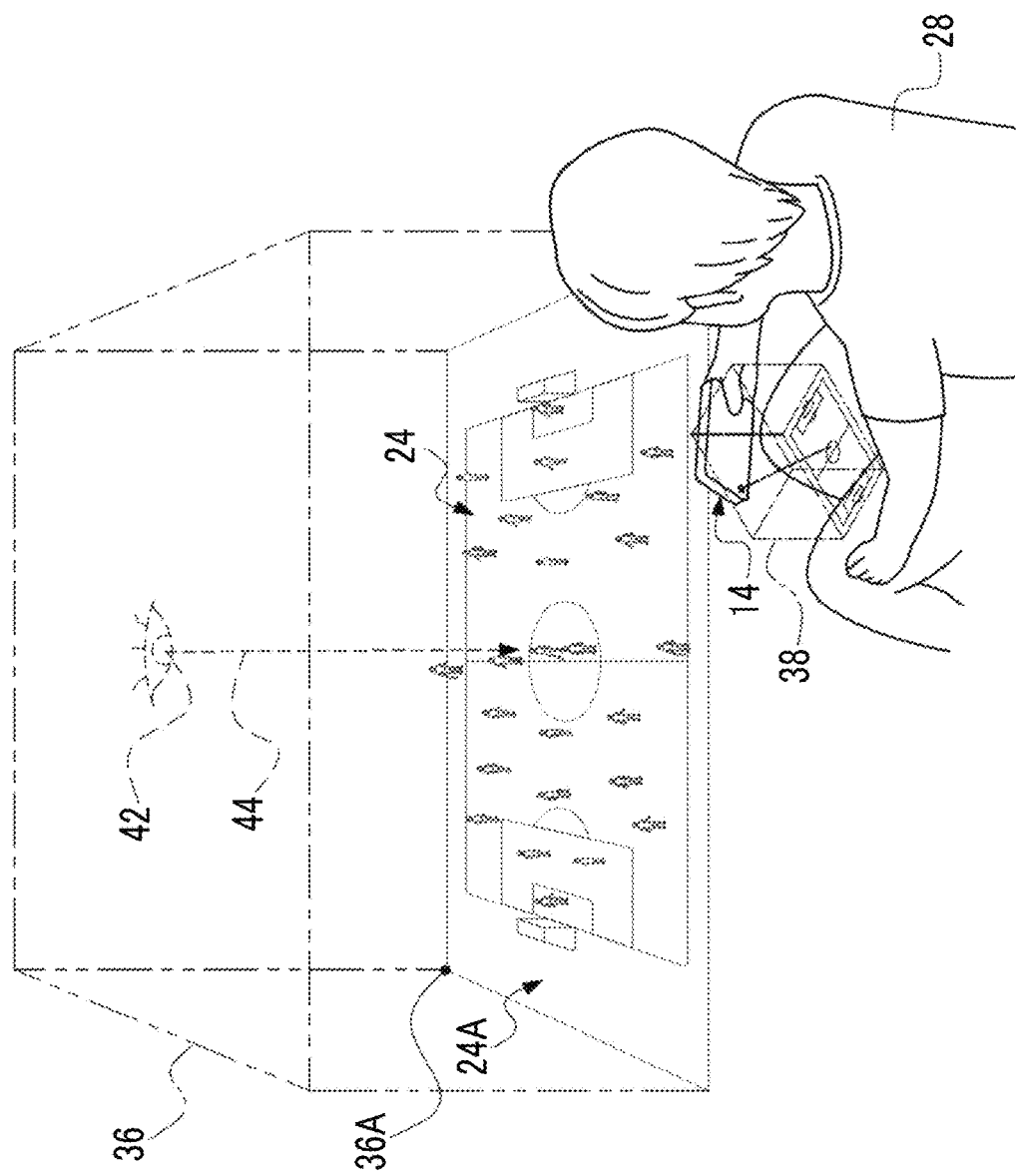
FIG. 17 is a conceptual diagram showing an example of a use aspect of the instruction three-dimensional region in a case in which the observation viewpoint and the observation visual line different from the observation viewpoint and the observation visual line shown in FIG. 15 are realized.
Figure 18:
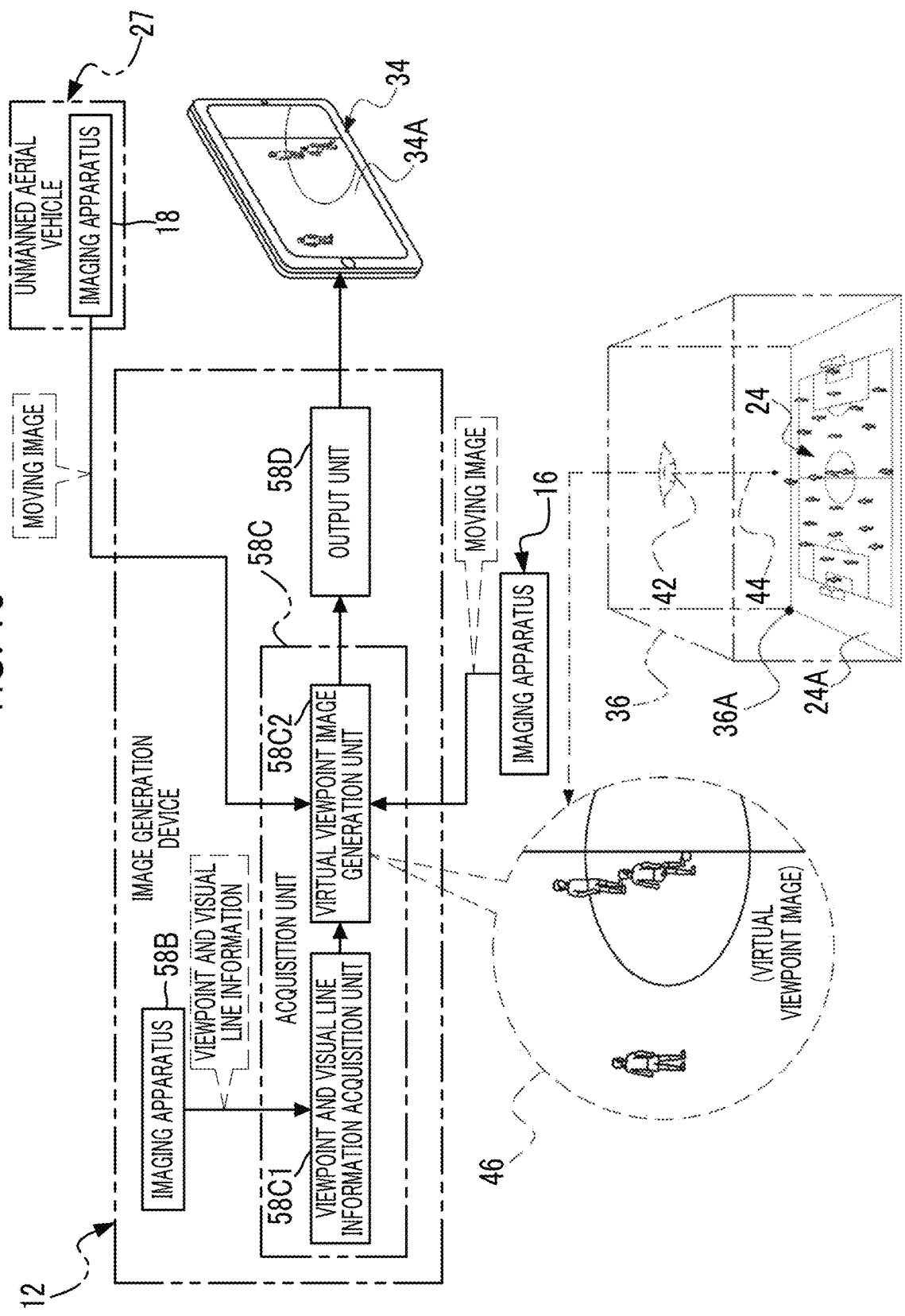
FIG. 18 is a conceptual diagram showing an example of an aspect in which the virtual viewpoint image showing a subject in a case in which the inside of the observation three-dimensional region is observed from the observation viewpoint and the observation visual line shown in FIG. 17 is generated.
Figure 19:
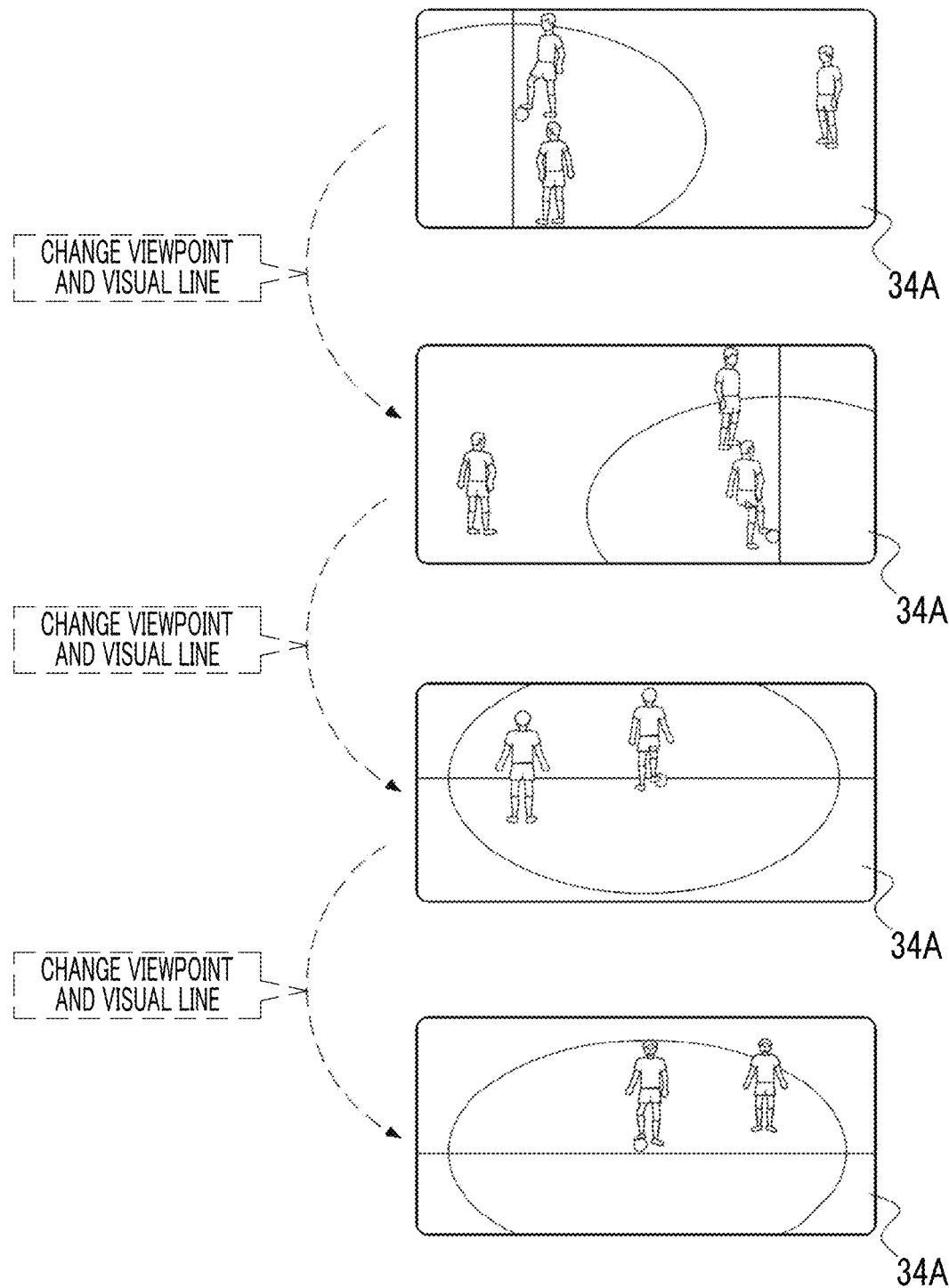
FIG. 19 is a state transition diagram showing a transition example of a display aspect of the virtual viewpoint image in a case in which the observation viewpoint and the observation visual line are changed.

For example, as shown in FIG. 17, in a case in which the smartphone position in the instruction three-dimensional region 38 is changed by the spectator 28, the observation viewpoint and the observation visual line are also changed. In this case, as shown in FIG. 18, for example, the virtual viewpoint image 46 showing the subject in a direction different from that of the virtual viewpoint image 46 shown in FIG. 16 is generated and displayed on the display 34A. In this way, since the observation viewpoint and the observation visual line are changed as the smartphone position in the instruction three-dimensional region 38 is changed, the content of the virtual viewpoint image 46 to be generated is changed for each time the observation viewpoint and the observation visual line are changed. That is, as shown in FIG. 19, for example, an aspect of the virtual viewpoint image 46 displayed on the display 34A, that is, a size and a direction of the subject shown in the virtual viewpoint image 46 are changed as the smartphone position in the instruction three-dimensional region 38 is changed.

Figure 20:
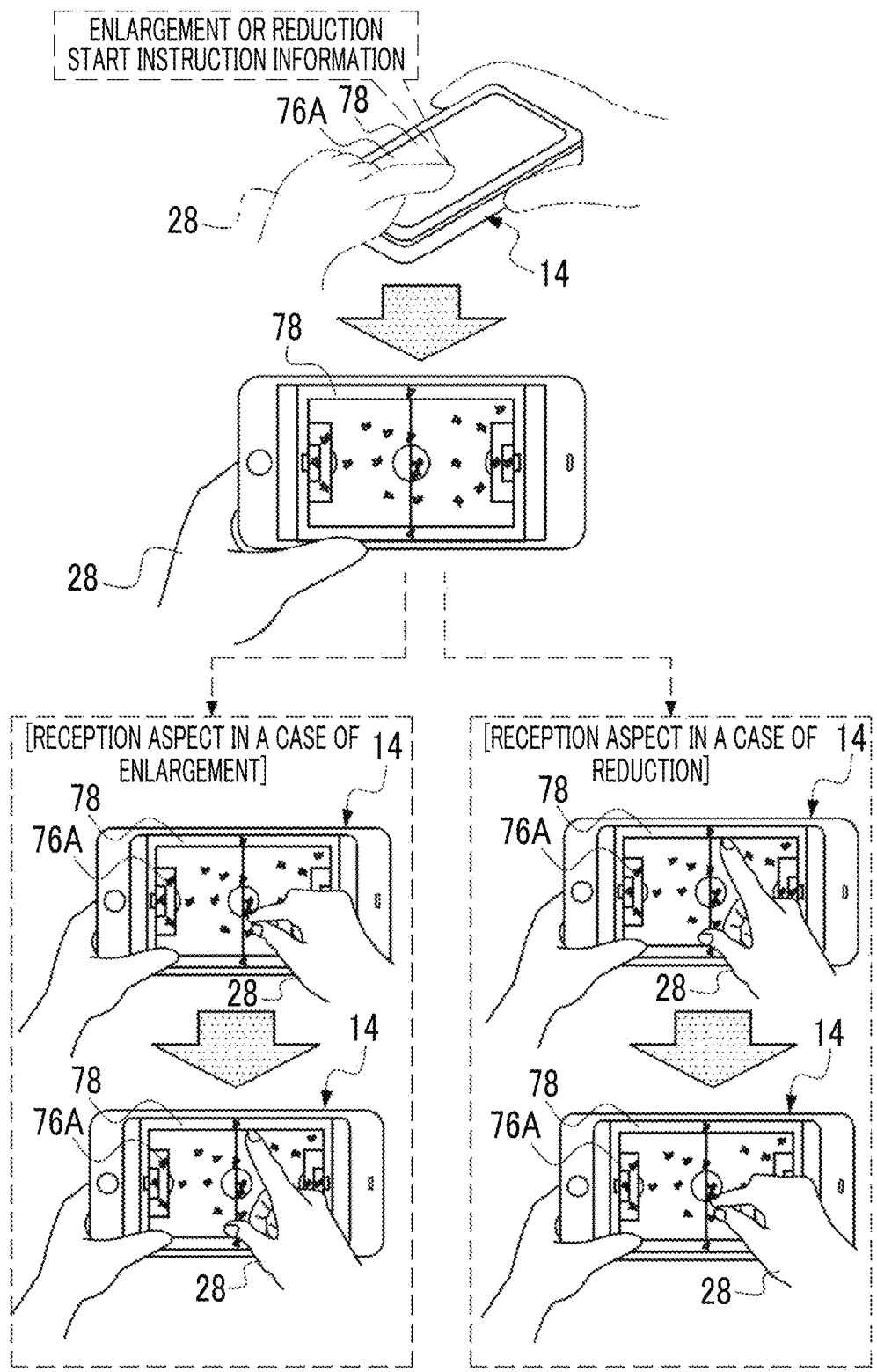
FIG. 20 is a conceptual diagram showing an example of an aspect of receiving an instruction given to a touch panel in a case in which a bird's-eye view image displayed on a display of the smartphone according to the embodiment is enlarged or reduced.

In order to realize the enlarged display or the reduced display of the bird's-eye view image, as shown in FIG. 20, the touch panel 76A of the smartphone 14 is operated by the spectator 28 or the like, and enlargement or reduction start instruction information is received by the touch panel 76A. The enlargement or reduction start instruction information is information for giving an instruction for starting the enlargement or reduction of the bird's-eye view image. In a case in which the enlargement or reduction start instruction information is received by the touch panel 76A, the smartphone 14 requests the image generation device 12 to transmit the bird's-eye view image. The image generation device 12 acquires the latest bird's-eye view image from the imaging apparatus 18 of the unmanned aerial vehicle 27 in response to the request from the smartphone 14, and transmits the acquired bird's-eye view image to the smartphone 14. The smartphone 14 receives the bird's-eye view image transmitted from the image generation device 12. The received bird's-eye view image is displayed on the display 78.

By receiving an instruction for enlargement (hereinafter, referred to as "enlargement instruction") by the touch panel 76A in a state in which the bird's-eye view image is displayed on the display 78, the bird's-eye view image displayed on the display 78 is enlarged. In addition, by receiving an instruction for reduction (hereinafter, referred to as "reduction instruction") by the touch panel 76A in a state in which the bird's-eye view image is displayed on the display 78, the bird's-eye view image displayed on the display 78 is reduced. Note that, in the following, in a case in which a distinction is not necessary, the enlargement instruction and the reduction instruction are referred to as an "enlargement or reduction instruction".

For example, as shown in FIG. 20, an example of the enlargement instruction is a pinch-out operation on the touch panel 76A, and an example of the reduction instruction is a pinch-in operation on the touch panel 76A.

Figure 21:
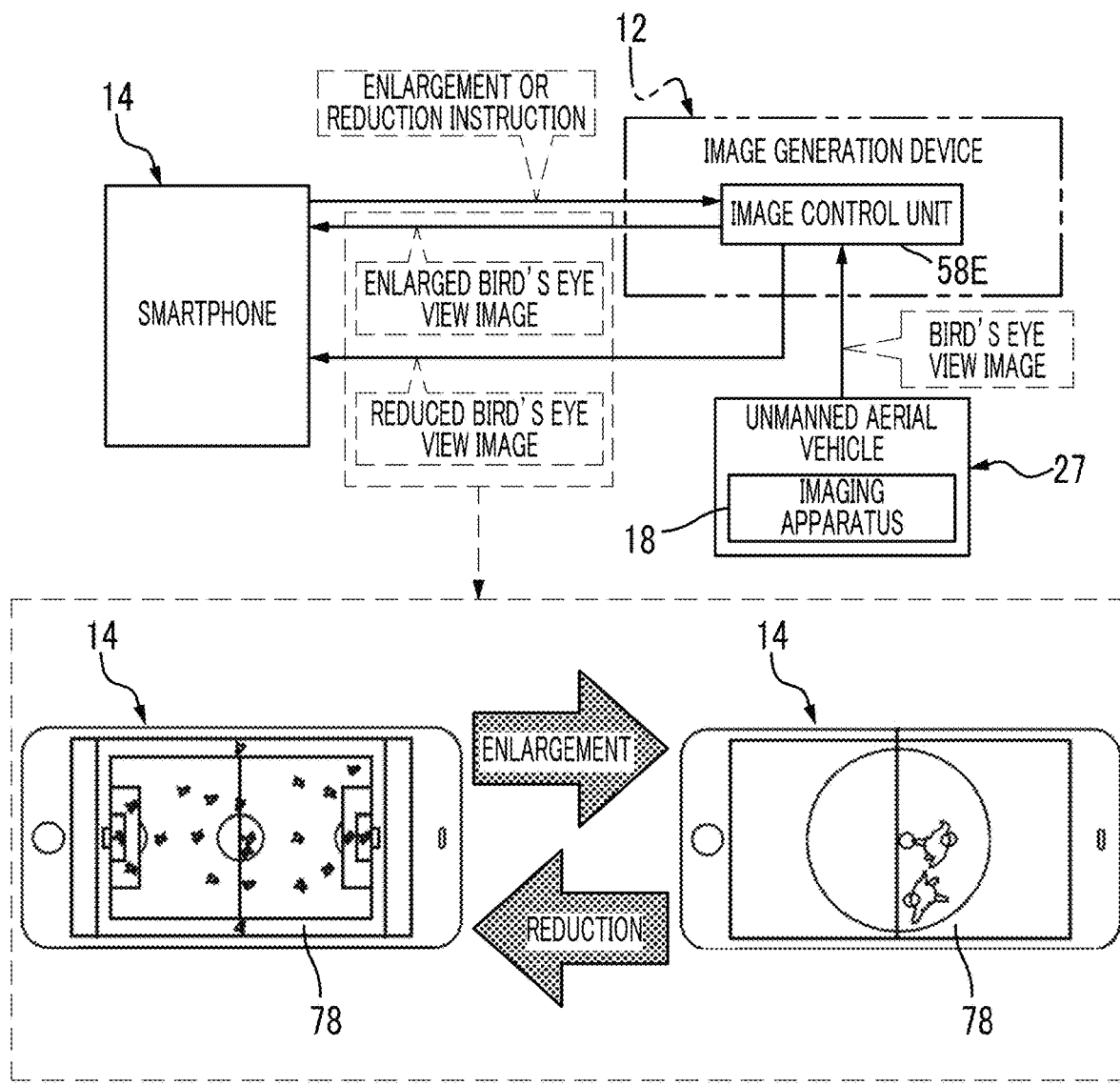
FIG. 21 is a conceptual diagram showing an example of an aspect in which the bird's-eye view image displayed on the display of the smartphone according to the embodiment is enlarged and reduced.

For example, as shown in FIG. 21, the enlargement or reduction instruction received by the touch panel 76A is transmitted by the smartphone 14 to the image control unit 58E of the image generation device 12. The image control unit 58E enlarges or reduces the bird's-eye view image in response to the given instruction.

In a case in which the enlargement or reduction instruction transmitted from the smartphone 14 is received, the image control unit 58E acquires the latest bird's-eye view image from the unmanned aerial vehicle 27. In a case in which the image control unit 58E receives the enlargement instruction transmitted from the smartphone 14, the image control unit 58E enlarges the bird's-eye view image acquired from the unmanned aerial vehicle 27, and transmits the enlarged bird's-eye view image obtained by enlarging the bird's-eye view image to the smartphone 14. In a case in which the image control unit 58E receives the reduction instruction transmitted from the smartphone 14, the image control unit 58E reduces the bird's-eye view image acquired from the unmanned aerial vehicle 27, and transmits the reduced bird's-eye view image obtained by reducing the bird's-eye view image to the smartphone 14.

The smartphone 14 receives the enlarged bird's-eye view image transmitted from the image control unit 58E, and displays the received enlarged bird's-eye view image on the display 78. In addition, the smartphone 14 receives the reduced bird's-eye view image transmitted from the image control unit 58E, and displays the received reduced bird's-eye view image on the display 78.

Figure 22:
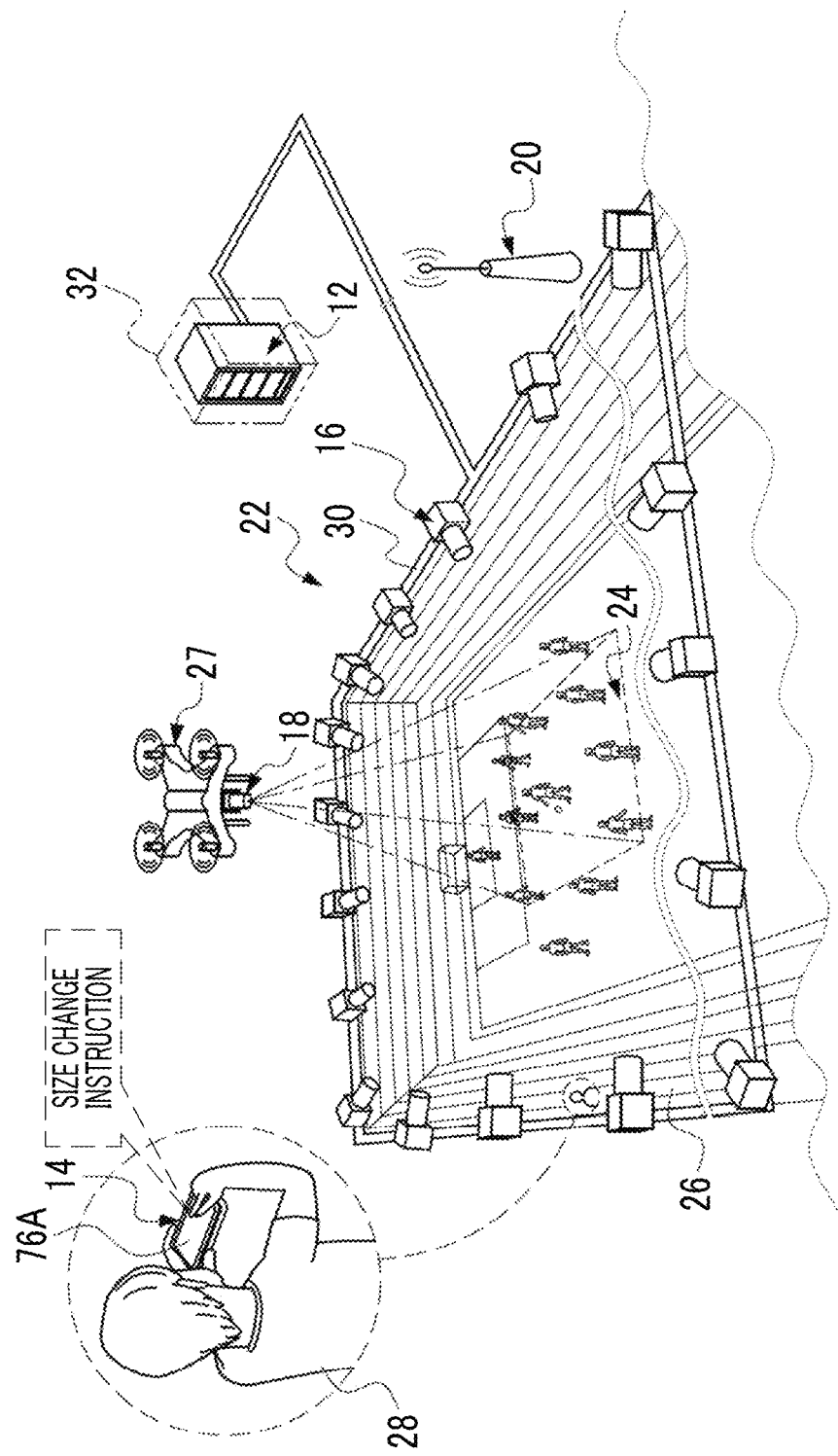
FIG. 22 is a conceptual diagram showing an aspect example in which an imaging range of an imaging apparatus of an unmanned aerial vehicle is narrowed as compared to the aspect example of the embodiment shown in FIG. 1.

For example, as shown in FIG. 22, in a case in which the spectator 28 or the like receives a size change instruction for changing a size of the imaging face on the soccer field 24 by the imaging apparatus 18 by the touch panel 76A of the smartphone 14, the size of the imaging face on the soccer field 24 by the imaging apparatus 18 is changed. Examples of the size change instruction include the pinch-out operation and the pinch-in operation, as in the example shown in FIG. 20. The pinch-out operation is an operation used in a case in which the size of the imaging face on the soccer field 24 by the imaging apparatus 18 is made smaller than the current point in time, and the pinch-in operation is an operation used to reduce the size of the imaging face on the soccer field 24 by the imaging apparatus 18 is made larger than the current point in time. In the example shown in FIG. 22, by lowering the altitude of the unmanned aerial vehicle 27 from the current point in time, the size of the imaging face on the soccer field 24 by the imaging apparatus 18 becomes smaller than the current point in time (example shown in FIG. 1).

Figure 23:
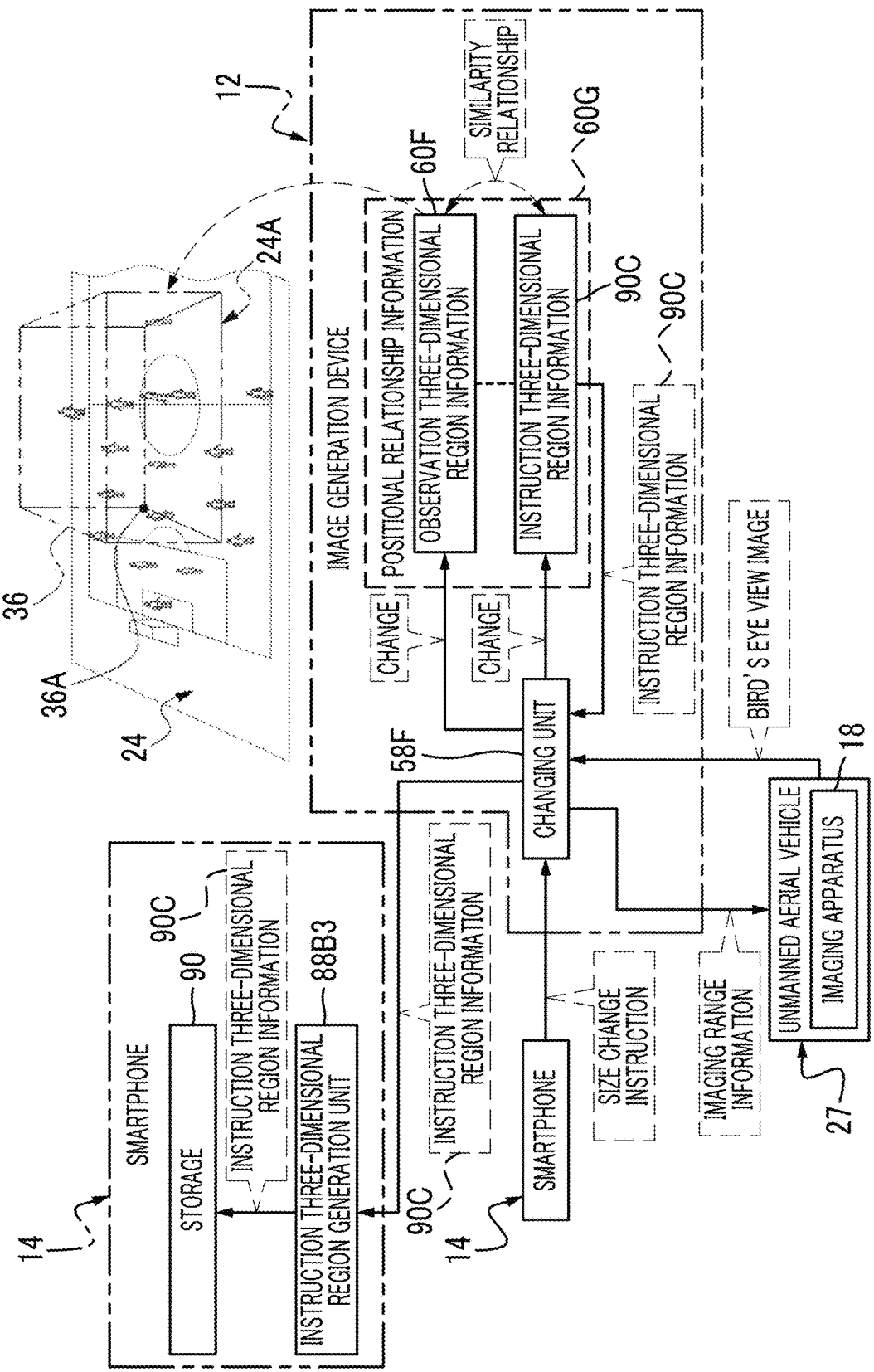
FIG. 23 is a conceptual diagram showing an example of a process content in a case in which a size of the instruction three-dimensional region is changed as a size of the observation three-dimensional region is changed by a changing unit of the image generation device according to the embodiment.

For example, as shown in FIG. 23, the size change instruction received by the touch panel 76A of the smartphone 14 is transmitted by the smartphone 14 to the changing unit 58F. The changing unit 58F receives the size change instruction from the smartphone 14. In a case in which the size change instruction is received, the changing unit 58F changes the size of the observation three-dimensional region 36 by changing the size of the imaging face on the soccer field 24 by the imaging apparatus 18 in response to the received size change instruction. Specifically, in a case in which the size change instruction from the smartphone 14 is received, the changing unit 58F derives imaging range information (for example, the size (for example, area) of the imaging face on the soccer field 24 by the imaging apparatus 18) indicating the imaging range that matches with the size of the observation three-dimensional region 36 indicated by the received size change instruction, and transmits the derived imaging range information to the unmanned aerial vehicle 27. The derivation of the imaging range information is realized, for example, by using an imaging range derivation table in which the size of the observation three-dimensional region 36 indicated by the size change instruction and the imaging range are associated with each other. Here, the size (for example, area) of the imaging face on the soccer field 24 by the imaging apparatus 18 is described as an example of the imaging range information, but the technology of the present disclosure is not limited to this, and for example, it may be a coordinate for specifying four corners of the imaging face with respect to the soccer field 24 as long as the imaging face on the soccer field 24 by the imaging apparatus 18 has a quadrangular shape or may be any information as long as it is information for specifying the size of the imaging face with respect to the soccer field 24.

Note that an imaging range derivation arithmetic expression may be used instead of the imaging range derivation table. The imaging range derivation arithmetic expression refers to an arithmetic expression using the size of the observation three-dimensional region 36 indicated by the size change instruction as an independent variable and using the imaging range as a dependent variable.

The unmanned aerial vehicle 27 receives the imaging range information from the changing unit 58F, is moved to a position at which the imaging apparatus 18 performs the imaging in the imaging range indicated by the received imaging range information, and causes the imaging apparatus 18 to perform the imaging to acquire the bird's-eye view image.

The changing unit 58F acquires the bird's-eye view image from the unmanned aerial vehicle 27. The changing unit 58F changes the size of the observation three-dimensional region 36 by changing the observation three-dimensional region information 60F based on the bird's-eye view image acquired from the unmanned aerial vehicle 27. That is, by using the bird's-eye view image acquired from the unmanned aerial vehicle 27, the changing unit 58F changes the size of the soccer field corresponding plane 24A corresponding to the imaging face on the soccer field 24 by the imaging apparatus 18 and changes the observation three-dimensional region 36 to the three-dimensional region having the soccer field corresponding plane 24A of which the size is changed as the bottom plane.

The changing unit 58F changes the size of the instruction three-dimensional region 38 in a state in which the similarity relationship with the observation three-dimensional region 36 is maintained in conjunction with the change in the size of the observation three-dimensional region 36. That is, by changing the instruction three-dimensional region information 90C so as to maintain the similarity relationship with the observation three-dimensional region 36 in conjunction with the change in the size of the observation three-dimensional region 36, the changing unit 58F changes the size of the instruction three-dimensional region 38. Note that the changing unit 58F may change the size of the observation three-dimensional region 36 by enlarging or reducing the bird's-eye view image by the image control unit 58E (see FIGS. 20 and 21). In this case, the plane of the soccer field 24 shown by the enlarged bird's-eye view image or the reduced bird's-eye view image described above is an example of a "specific reference plane" according to the technology of the present disclosure. Also in this case, by changing the instruction three-dimensional region information 90C so as to maintain the similarity relationship with the observation three-dimensional region 36 in conjunction with the change in the size of the observation three-dimensional region 36, the changing unit 58F changes the size of the instruction three-dimensional region 38.

As described above, the positional relationship information 60G is updated by changing the observation three-dimensional region information 60F and the instruction three-dimensional region information 90C by the changing unit 58F in a state in which the similarity relationship is maintained. In a case in which the positional relationship information 60G is updated, the changing unit 58F acquires the instruction three-dimensional region information 90C from the positional relationship information 60G, and transmits the acquired instruction three-dimensional region information 90C of the smartphone 14 to the instruction three-dimensional region generation unit 88B3. By receiving the instruction three-dimensional region information 90C from the changing unit 58F, overwriting and storing the received instruction three-dimensional region information 90C in the storage 90, the instruction three-dimensional region generation unit 88B3 updates the instruction three-dimensional region information 90C in the storage 90.

Figure 24:
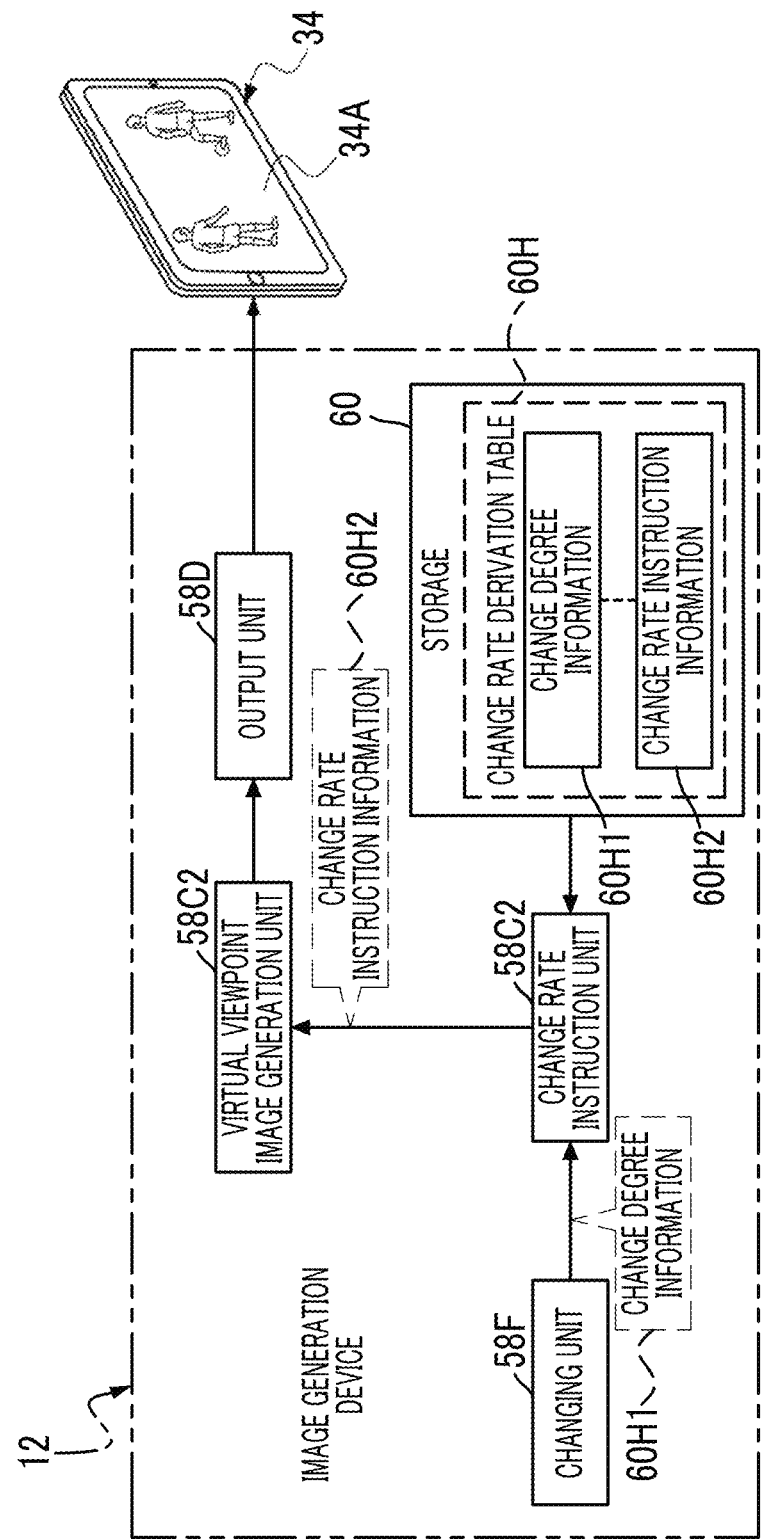
FIG. 24 is a block diagram provided for describing an example of the process content of a change rate instruction unit of the image generation device according to the embodiment.

For example, as shown in FIG. 24, in a case in which the size of the observation three-dimensional region 36 and the size of the instruction three-dimensional region 38 are changed, the changing unit 58F outputs change degree information 60H1 indicating a degree of the change in the size of the observation three-dimensional region 36 and the size of the instruction three-dimensional region 38 to the change rate instruction unit 58G.

A change rate derivation table 60H is stored in the storage 60. In the change rate derivation table 60H, the change degree information 60H1 and change rate instruction information 60H2 for giving an instruction for the rate at which the size of the virtual viewpoint image 46 is changed are associated with each other. The change degree information 60H1 and the change rate instruction information 60H2 are associated with each other with a relationship that the size of the virtual viewpoint image 46 is changed more slowly as the degree of the change in the size of the observation three-dimensional region 36 and the size of the instruction three-dimensional region 38 is larger. Stated another way, the change degree information 60H1 and the change rate instruction information 60H2 are associated with each other with a relationship that the size of the virtual viewpoint image 46 is changed faster as the degree of the change in the size of the observation three-dimensional region 36 and the size of the instruction three-dimensional region 38 is smaller.

The change rate instruction unit 58G derives the change rate instruction information 60H2 corresponding to the change degree information 60H1 input from the changing unit 58F from the change rate derivation table 60H, and outputs the derived change rate instruction information 60H2 from the virtual viewpoint image generation unit 58C2. The virtual viewpoint image generation unit 58C2 changes the size of the virtual viewpoint image 46 at the rate as instructed by the change rate instruction information 60H2 input from the change rate instruction unit 58G. The virtual viewpoint image generation unit 58C2 generates the virtual viewpoint image 46 of which the size is changed at the rate as instructed by the change rate instruction information 60H2, and outputs the generated virtual viewpoint image 46 at the rate as instructed by the change rate instruction information 60H2 to the output unit 58D. The output unit 58D outputs the virtual viewpoint image 46 to the tablet terminal 34 depending on the rate as instructed by the change rate instruction information 60H2.

Next, an operation of the information processing system 10 will be described.

First, an example of a flow of the generation process executed by the CPU 88 of the smartphone 14 according to the generation program 90A will be described with reference to FIG. 25. Note that the generation process is executed in a case in which, for example, the reception device 76 (see FIG. 4) of the smartphone 14 receives an instruction for starting the execution of the generation process. In addition, here, for convenience of description, the description will be made on the premise that the reference subject image 41 is acquired by the four-point three-dimensional position detection unit 88A1 and the four-point three-dimensional position information is already generated by the four-point three-dimensional position detection unit 88A1 based on the acquired reference subject image 41.

In the generation process shown in FIG. 25, first, in step ST10, the observation three-dimensional region information acquisition unit 88B 1 acquires the observation three-dimensional region information 60F from the image generation device 12 (see FIG. 11), and then the generation process proceeds to step ST12.

In step ST12, the instruction reference plane generation unit 88B2 acquires the four-point three-dimensional position information from the four-point three-dimensional position detection unit 88A1 (see FIG. 11), and then the generation process proceeds to step ST14.

In step ST14, the instruction reference plane generation unit 88B2 generates the instruction reference plane 40A based on the four-point three-dimensional position information acquired in step ST12 (see FIG. 11), and then the generation process proceeds to step ST16.

In step ST16, the instruction three-dimensional region generation unit 88B3 generates the instruction three-dimensional region 38 by generating the instruction three-dimensional region information 90C based on the observation three-dimensional region information 60F acquired in step ST10 and the instruction reference plane 40A generated in step ST14 (see FIG. 11), and then the generation process proceeds to step ST18.

In step ST18, the instruction three-dimensional region generation unit 88B3 stores the instruction three-dimensional region information 90C generated in step ST16 in the storage 90 (see FIG. 12), and then the generation process proceeds to step ST20.

In step ST20, the instruction three-dimensional region generation unit 88B3 outputs the instruction three-dimensional region information 90C generated in step ST16 to the region association unit 58A of the image generation device 12 (see FIG. 12), and then the generation process is terminated.

Next, an example of a flow of the detection process executed by the CPU 88 of the smartphone 14 according to the detection program 90B will be described with reference to FIG. 26. Note that the detection process is executed in a case in which, for example, the reception device 76 of the smartphone 14 receives an instruction for starting the execution of the detection process.

In the detection process shown in FIG. 26, first, in step T40, the detection unit 88A determines whether or not the alignment completion information is received by the reception device 76 (see FIG. 14). In a case in which the alignment completion information is received by the reception device 76 (see FIG. 4) in step ST40, a positive determination is made, and the generation process proceeds to step ST42. In a case in which the alignment completion information is not received by the reception device 76 in step ST40, a negative determination is made, and the determination in step ST40 is made again.

In step ST42, the detection unit 88A acquires the angle information from the gyro sensor 74 (see FIG. 14), and then the detection process proceeds to step ST44.

In step ST44, the detection unit 88A acquires the acceleration information from the acceleration sensor 72 (see FIG. 14), and then the detection process proceeds to step ST46.

In step ST46, the detection unit 88A detects the smartphone position based on the acceleration information acquired in step ST44 and detects the smartphone posture based on the angle information acquired in step ST42, and then the detection process proceeds to step ST48.

In step ST48, the detection unit 88A generates the position and posture information indicating the smartphone position and the smartphone posture detected in step ST46 and outputs the generated position and posture information to the derivation unit 58B of the image generation device 12 (see FIG. 15), and then the detection process proceeds to step ST50.

In step ST50, the detection unit 88A determines whether or not a condition for terminating the detection process (hereinafter, referred to as a "detection process termination condition") is satisfied. Examples of the detection process termination condition include a condition that the reception device 76 receives an instruction for terminating the detection process. In a case in which the detection process termination condition is not satisfied in step ST50, a negative determination is made, and the detection process proceeds to step ST42. In a case in which the detection process termination condition is satisfied in step ST50, a positive determination is made, and the detection process is terminated.

Next, an example of a flow of the region association process executed by the CPU 58 of the image generation device 12 according to the region association program 60A will be described with reference to FIG. 27. Note that the region association process is executed, for example, on the condition that the execution of the generation process shown in FIG. 25 is terminated. In addition, in the following, the description will be made on the premise that the observation three-dimensional region information 60F is already stored in the storage 60 of the image generation device 12.

Figure 27:
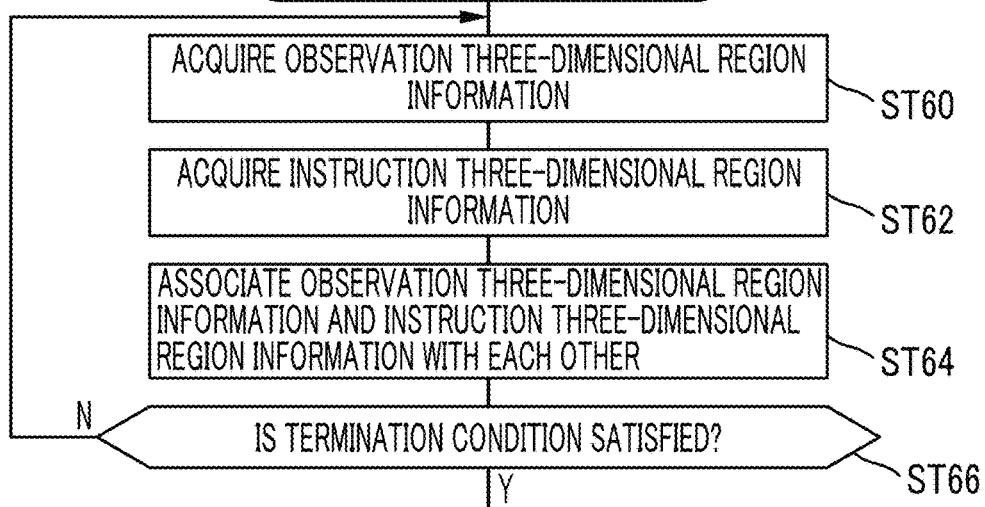
FIG. 27 is a flowchart showing an example of a flow of a region association process executed by the image generation device according to the embodiment.

In the region association process shown in FIG. 27, first, in step ST60, the region association unit 58A acquires the observation three-dimensional region information 60F from the storage 60, and then the region association process proceeds to step ST62.

In step ST62, the region association unit 58A acquires the instruction three-dimensional region information 90C from the instruction three-dimensional region generation unit 88B3 (see FIG. 12), and then the detection process proceeds to step ST64.

In step ST64, the region association unit 58A generates the positional relationship information 60G by associating the observation three-dimensional region information 60F acquired in step ST60 and the instruction three-dimensional region information 90C acquired in step ST62 with each other between the positions of the observation three-dimensional region 36 and the instruction three-dimensional region 38 corresponding to each other. Then, the region association unit 58A stores the generated positional relationship information 60G in the storage 60, and then the region association process is terminated.

Next, an example of a flow of the virtual viewpoint image generation process executed by the CPU 58 of the image generation device 12 according to the virtual viewpoint image generation program 60B will be described with reference to FIG. 28. Note that the virtual viewpoint image generation process is executed in a case in which, for example, the reception device 52 (see FIG. 3) of the image generation device 12 or the reception device 76 (see FIG. 4) of the smartphone 14 receives an instruction for starting the execution of the virtual viewpoint image generation process.

Figure 28:
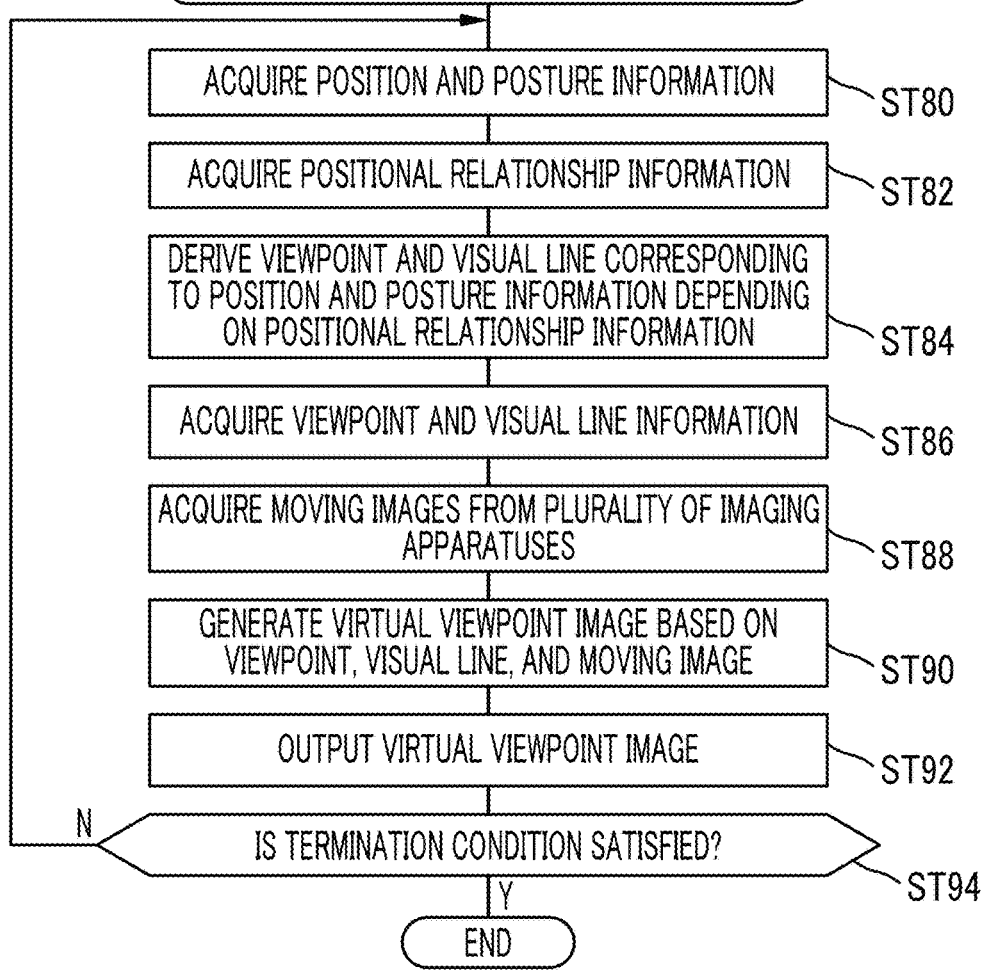
FIG. 28 is a flowchart showing an example of a flow of a virtual viewpoint image generation process executed by the image generation device according to the embodiment.

In the virtual viewpoint image generation process shown in FIG. 28, first, in step ST80, the derivation unit 58B acquires the position and posture information from the detection unit 88A (see FIG. 15), and then the virtual viewpoint image generation process proceeds to step ST82.

In step ST82, the derivation unit 58B acquires the positional relationship information 60G from the storage 60 (see FIG. 15), and then the virtual viewpoint image generation process proceeds to step ST84.

In step ST84, depending on the positional relationship information 60G acquired in step ST82, the derivation unit 58B derives the observation viewpoint and the observation visual line corresponding to the position and posture information acquired in step ST80 and generates the viewpoint and visual line information based on the derived observation viewpoint and the derived observation visual line, and then the virtual viewpoint image generation process proceeds to step ST86.

In step ST86, the viewpoint and visual line information acquisition unit 58C1 acquires the viewpoint and visual line information from the derivation unit 58B (see FIG. 16), and then the virtual viewpoint image generation process proceeds to step ST88.

In step ST88, the virtual viewpoint image generation unit 58C2 acquires the moving image from each of the imaging apparatus 18 and the plurality of imaging apparatuses 16, and then the virtual viewpoint image generation process proceeds to step ST90.

In step ST90, the virtual viewpoint image generation unit 58C2 generates the virtual viewpoint image 46 (see FIG. 16) based on the observation viewpoint indicated by the viewpoint and visual line information acquired in step ST86, the observation visual line indicated by the viewpoint and visual line information acquired in step ST86, and the moving image acquired in step ST88, and then the virtual viewpoint image generation process proceeds to step ST92.

In step ST92, the output unit 58D acquires the virtual viewpoint image 46 generated by the virtual viewpoint image generation unit 58C2 and outputs the acquired virtual viewpoint image 46 to the tablet terminal 34, and then the virtual viewpoint image generation process proceeds to step ST94.

In step ST94, the CPU 58 determines whether or not a condition for terminating the virtual viewpoint image generation process (hereinafter, referred to as a "virtual viewpoint image generation process termination condition") is satisfied. Examples of the virtual viewpoint image generation process termination condition include a condition that the reception device 76 of the smartphone 14 or the reception device 52 of the image generation device 12 receives an instruction for terminating the virtual viewpoint image generation process. In a case in which the virtual viewpoint image generation process termination condition is not satisfied in step ST94, a negative determination is made, and the virtual viewpoint image generation process proceeds to step ST80. In a case in which the virtual viewpoint image generation process termination condition is satisfied in step ST94, a positive determination is made, and the virtual viewpoint image generation process is terminated.

Next, an example of a flow of the image control process executed by the CPU 58 of the image generation device 12 according to the image control program 60C will be described with reference to FIG. 29. Note that the image control process is executed in a case in which, for example, the reception device 76 of the smartphone 14 or the reception device 52 of the image generation device 12 receives an instruction for starting the execution of the image control process. In the following, the description will be made on the premise that the image control unit 58E already acquires the bird's-eye view image from the unmanned aerial vehicle 27.

In the image control process shown in FIG. 29, first, in step ST100, the image control unit 58E determines whether or not the enlargement or reduction instruction transmitted from the smartphone 14 is received. In a case in which the enlargement or reduction instruction transmitted from the smartphone 14 is not received in step ST100, a negative determination is made, and the image control process proceeds to step ST104. In a case in which the enlargement or reduction instruction transmitted from the smartphone 14 is received in step ST100, a positive determination is made, and the image control process proceeds to step ST102.

In step ST102, the image control unit 58E enlarges or reduces the bird's-eye view image in response to the enlargement or reduction instruction received in step ST100, and then the image control process proceeds to step ST104. That is, in step ST102, in a case in which the image control unit 58E receives the enlargement instruction, the bird's-eye view image is enlarged to generate the enlarged bird's-eye view image, and in a case in which the image control unit 58E receives the reduction instruction, the bird's-eye view image is reduced to generate the reduced bird's-eye view image. The enlarged bird's-eye view image or the reduced bird's-eye view image generated as described above is displayed on the display 78 of the smartphone 14 (see FIG. 21).

In step ST104, the CPU 58 determines whether or not a condition for terminating the image control process (hereinafter, referred to as an "image control process termination condition") is satisfied. Examples of the image control process termination condition include a condition that the reception device 76 of the smartphone 14 or the reception device 52 of the image generation device 12 receives an instruction for terminating the image control process. In a case in which the image control process termination condition is not satisfied in step ST104, a negative determination is made, and the image control process proceeds to step ST100. In a case in which the image control process termination condition is satisfied in step ST104, a positive determination is made, and the image control process is terminated.

Next, an example of a flow of the change process executed by the CPU 58 of the image generation device 12 according to the change program 60D will be described with reference to FIG. 30. Note that the change process is executed in a case in which, for example, the reception device 76 of the smartphone 14 or the reception device 52 of the image generation device 12 receives an instruction for starting the execution of the change process.

In the change process shown in FIG. 30, first, in step ST120, the changing unit 58F acquires the bird's-eye view image from the unmanned aerial vehicle 27, and then the change process proceeds to step ST122.

In step ST122, the changing unit 58F changes the size of the soccer field corresponding plane 24A corresponding to the imaging face on the soccer field 24 by the imaging apparatus 18 based on the bird's-eye view image acquired in step ST120. Then, the changing unit 58F changes the size of the observation three-dimensional region 36 by changing the observation three-dimensional region information 60F based on the soccer field corresponding plane 24A of which the size is changed, and then change process proceeds to step ST124.

In step ST124, the changing unit 58F changes the instruction three-dimensional region information 90C based on the observation three-dimensional region information 60F changed in step ST122 such that the similarity relationship between the observation three-dimensional region 36 and the instruction three-dimensional region 38 is maintained, and then the change process proceeds to step ST126.

In step ST126, the changing unit 58F outputs the instruction three-dimensional region information 90C obtained by being changed in step ST124 to the instruction three-dimensional region generation unit 88B3 of the smartphone 14 (see FIG. 23), and then the change process is terminated.

Next, an example of a flow of the change rate instruction process executed by the CPU 58 of the image generation device 12 according to the change rate instruction program 60E will be described with reference to FIG. 31. Note that, the change rate instruction process is executed in a case in which, for example, the reception device 76 of the smartphone 14 or the reception device 52 of the image generation device 12 receives an instruction for starting the execution of the change rate instruction process and the changing unit 58F changes the size of the observation three-dimensional region 36.

Figure 31:
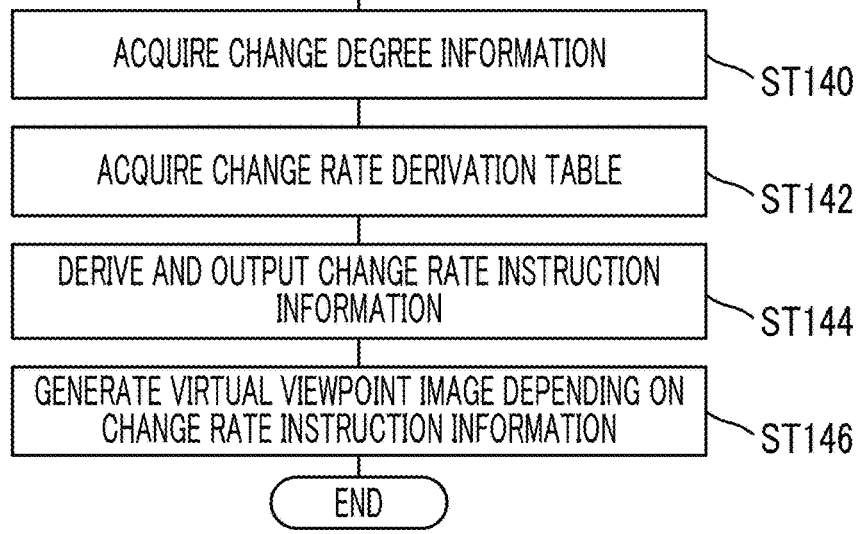
FIG. 31 is a flowchart showing an example of a flow of a change rate instruction process executed by the image generation device according to the embodiment.

In the change rate instruction process shown in FIG. 31, first, in step ST140, the change rate instruction unit 58G acquires the change degree information 60H1 from the changing unit 58F, and then the change rate instruction process proceeds to step ST142.

In step ST142, the change rate instruction unit 58G acquires the change rate derivation table 60H from the storage 60, and then the change rate instruction process proceeds to step ST144.

In step ST144, the change rate instruction unit 58G derives the change rate instruction information 60H2 corresponding to the change degree information 60H1 acquired in step ST140 from the change rate derivation table 60H acquired in step ST142. Then, the change rate instruction unit 58G outputs the derived change rate instruction information 60H2 to the virtual viewpoint image generation unit 58C2, and then the change rate instruction process proceeds to step ST146.

In step ST146, the virtual viewpoint image generation unit 58C2 changes the size of the virtual viewpoint image 46 at the rate as instructed by the change rate instruction information 60H2 input from the change rate instruction unit 58G, and then the change rate instruction process is terminated.

As described above, in the information processing system 10, the detection unit 88A detects the smartphone position and the smartphone posture in the instruction three-dimensional region having the reduced relationship with the observation three-dimensional region 36. In addition, the derivation unit 58B derives the observation viewpoint and the observation visual line corresponding to the detection results of the detection unit 88A depending on the positional relationship information 60G. Then, the virtual viewpoint image 46 is acquired by the acquisition unit 58C as the image showing the subject in a case in which the subject is observed with the observation viewpoint and the observation visual line derived by the derivation unit 58B. Therefore, as compared to a case in which the virtual viewpoint image showing the subject is acquired in a case in which the subject is observed from the actual observation position, it is possible to obtain the virtual viewpoint image (in the example shown in the embodiment described above, the virtual viewpoint image 46) showing the subject in a case in which the subject is observed from the position different from the actual observation position.

In addition, in the information processing system 10, the relative positional relationship indicated by the positional relationship information 60G is the relationship between the position of the observation three-dimensional region with respect to the reference point and the position of the instruction three-dimensional region 38 with respect to the reference point. Therefore, the relationship between the position of the observation three-dimensional region 36 and the position of the instruction three-dimensional region 38 can be easily specified as compared to a case in which the reference point is not present.

In addition, in the information processing system 10, the positional relationship information 60G is information in which the coordinate indicating the position in the observation three-dimensional region 36 with the reference point as the origin and the coordinate indicating the position in the instruction three-dimensional region 38 with the reference point as the origin are associated with each other. Therefore, as compared to a case in which the coordinate indicating the position in the observation three-dimensional region 36 with the reference point as the origin and the coordinate indicating the position in the instruction three-dimensional region 38 with the reference point as the origin are not associated with each other, it is possible to easily specify the correspondence between the coordinate indicating the position in the observation three-dimensional region 36 and the coordinate indicating the position in the instruction three-dimensional region.

In addition, in the information processing system 10, the reference points are classified into the observation reference point 36A and the instruction reference point 38A, and the instruction reference point 38A is located at a different position from the observation reference point 36A and has the correspondence with the observation reference point 36A. Therefore, as compared to a case in which a common reference point is applied to the observation three-dimensional region 36 and the instruction three-dimensional region 38, it is possible to specify the relationship between the position in the observation three-dimensional region 36 and the position in the instruction three-dimensional region 38 with high accuracy.

In addition, in the information processing system 10, the instruction reference point 38A is decided by detecting the smartphone position in the instruction three-dimensional region 38 by the detection unit 88A. Therefore, the instruction reference point 38A can be positioned at a position intended by a user, such as the spectator 28 (hereinafter, simply referred to as the "user").

In addition, in the information processing system 10, the four-point three-dimensional position detection unit 88A1 detects four points of the three-dimensional positions in the instruction three-dimensional region 38. Then, the instruction three-dimensional region 38 is generated by the generation unit 88B based on the instruction reference plane 40A specified by using the four points of the three-dimensional positions detected by the four-point three-dimensional position detection unit 88A1. Therefore, it is possible to generate the instruction three-dimensional region 38 in which the position and the size intended by the user are reflected.

In addition, in the information processing system 10, the instruction three-dimensional region 38 is generated by the generation unit 88B based on the instruction reference plane 40A specified by using the reference subject image 41 obtained by imaging the reference subject 40. Therefore, it is possible to generate the instruction three-dimensional region 38 in which the relationship with the reference subject 40 can be grasped.

In addition, in the information processing system 10, the image control unit 58E enlarges or reduces the bird's-eye view image in response to the enlargement or reduction instruction. Therefore, the user can visually recognize the bird's-eye view image having the size intended by the user.

In addition, in the information processing system 10, the instruction reference plane 40A is one outer plane of the instruction three-dimensional region 38. Therefore, the instruction three-dimensional region 38 can be generated more quickly as compared to in a case in which one plane selected by the user from among a plurality of planes different from the instruction reference plane 40A is adopted as one outer plane of the instruction three-dimensional region 38.

In addition, in the information processing system 10, the observation three-dimensional region 36 is the three-dimensional region defined based on the bird's-eye view image obtained by imaging the region including the soccer field 24 by the imaging apparatus 18 of the unmanned aerial vehicle 27 and has the similarity relationship with the instruction three-dimensional region 38. Then, in response to the size change instruction received by the reception device 76 of the smartphone 14, the changing unit 58F changes the size of the imaging face on the soccer field 24 by the imaging apparatus 18, so that the size of the observation three-dimensional region 36 is changed. The changing unit 58F changes the size of the instruction three-dimensional region 38 in a state in which the instruction for the similarity relationship is given in conjunction with the change in the size of the observation three-dimensional region 36. Therefore, it is possible to reflect the change in the size of the observation three-dimensional region 36 in the instruction three-dimensional region 38.

Further, in the information processing system 10, the virtual viewpoint image 46 acquired by the acquisition unit 58C is output by the output unit 58D to the tablet terminal 34. Therefore, it is possible to provide the virtual viewpoint image 46 acquired by the acquisition unit 58C to the user.

Note that, in the embodiment described above, an aspect example has been described in which a width of the imaging range is changed by changing the altitude of the unmanned aerial vehicle 27, but the technology of the present disclosure is not limited to this. For example, the changing unit 58F may change the width of the imaging range on the soccer field 24 (see FIGS. 2, 24, and 25) by enlarging or reducing the bird's-eye view image in response to the size change instruction. As a result, it is possible to obtain the observation three-dimensional region 36 having the size corresponding to the imaging range intended by the user. Note that the enlargement or reduction of the bird's-eye view image may be realized by, for example, activating the digital zoom function or the optical zoom function of the imaging apparatus 18 of the unmanned aerial vehicle 27.

In addition, in the embodiment described above, the image obtained by imaging the observation three-dimensional region 36 by the imaging apparatus 18 of the unmanned aerial vehicle 27 has been used as the bird's-eye view image, but the technology of the present disclosure is not limited to this. For example, the virtual viewpoint image obtained by imaging the region including the soccer field 24, that is, the observation three-dimensional region 36 by a virtual camera may be used as the bird's-eye view image. Here, the "virtual viewpoint image obtained by being imaged by the virtual camera" refers to, for example, the virtual viewpoint image showing the region including the soccer field 24 in a case in which the soccer field 24 is observed from the sky. The virtual viewpoint image obtained by being imaged by the virtual camera is generated based on, for example, the plurality of images obtained by imaging the region including the soccer field 24 by the imaging apparatus 18 and the plurality of imaging apparatuses 16 (see FIG. 1). Here, the "virtual camera" is an example of a "first virtual imaging apparatus" and a "second virtual imaging apparatus" according to the technology of the present disclosure.

In addition, in the embodiment described above, an aspect example has been described in which the observation three-dimensional region 36 is imaged by the imaging apparatus 18 of the unmanned aerial vehicle 27 from the sky above the soccer field 24, but the technology of the present disclosure is not limited to this. For example, the reception device 52 of the image generation device 12 or the reception device 76 of the smartphone 14 may receive an imaging direction change instruction for changing the imaging direction by the imaging apparatus 18, and the changing unit 58F may change the imaging direction of the imaging apparatus 18 in response to the received imaging direction change instruction. In addition, the imaging direction of the virtual camera may be changed by the changing unit 58F in response to the received imaging direction change instruction. In addition, in a case in which the imaging direction change instruction is received by the reception device 52 of the image generation device 12 or the reception device 76 of the smartphone 14, the imaging direction may be changed by using the imaging apparatus 16 corresponding to the imaging direction indicated by the imaging direction change instruction among the plurality of imaging apparatuses 16 instead of the imaging apparatus 18. By changing the imaging direction as described above, it is possible to obtain the observation three-dimensional region 36 as viewed from the direction intended by the user.

Figure 32:
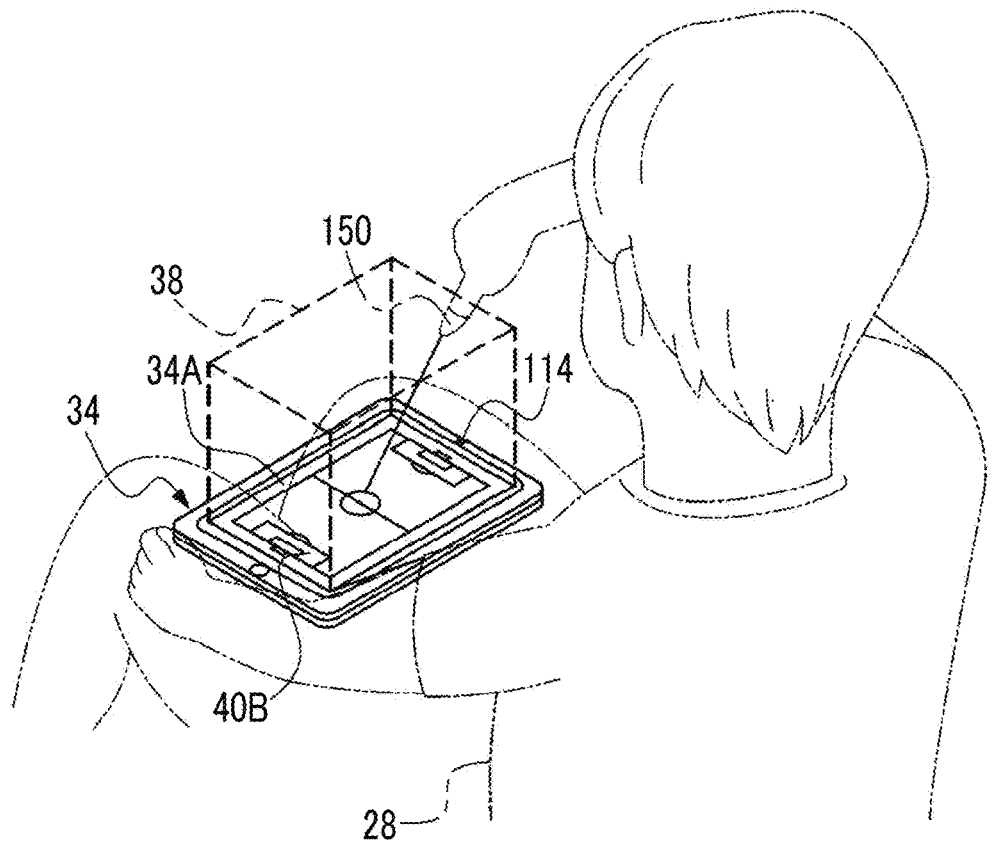
FIG. 32 is a conceptual diagram showing an aspect example in a case in which the instruction three-dimensional region is generated based on the bird's-eye view image displayed on the tablet terminal according to the embodiment.

In addition, in the embodiment described above, an aspect example has been described in which the instruction three-dimensional region 38 is formed on the recording medium P in which the soccer field image is formed on the surface, but the technology of the present disclosure is not limited to this. For example, the instruction three-dimensional region 38 may be formed on the display 34A of the tablet terminal 34 instead of the recording medium P, as shown in FIG. 32.

In this case, the display surface of the display 34A in a state in which the bird's-eye view image obtained by imaging the observation three-dimensional region 36 by the imaging apparatus 18 is displayed on the display 34A is used as an instruction reference plane 40B. Then, the instruction three-dimensional region 38 is generated by the CPU 118 of the tablet terminal 34 based on the instruction reference plane 40B. The CPU 118 is an example of a "generation unit" according to the technology of the present disclosure. Here, the bird's-eye view image obtained by imaging the observation three-dimensional region 36 by the imaging apparatus 18 has been described as an example, but the present disclosure is not limited to this, and the virtual viewpoint image obtained by imaging the observation three-dimensional region 36 by the virtual camera described above may be used as the bird's-eye view image.

In the example shown in FIG. 32, a finger cot 150 is mounted on a finger of the spectator 28, and the finger to which the finger cot 150 is mounted (hereinafter, simply referred to as the "finger") is imaged by the imaging apparatus 114 in the instruction three-dimensional region 38. Then, the observation viewpoint and the observation visual line are decided by the CPU 118 based on the image obtained by imaging the finger by the imaging apparatus 114. That is, the three-dimensional position of the finger in the instruction three-dimensional region 38 is recognized by the CPU 118 as the position corresponding to the position of the observation viewpoint, and the direction pointed by the finger in the instruction three-dimensional region 38 is recognized by the CPU 118 as the direction corresponding to the observation visual line.

Here, the finger to which the finger cot 150 is mounted is described as an example, but the technology of the present disclosure is not limited to this, and a finger to which the finger cot 150 is not mounted may be used. The finger is an example of an "object" according to the technology of the present disclosure. Note that, here, the "object" can be paraphrased as an "indicator". Here, the finger is described as an example of the "object" according to the technology of the present disclosure, but the technology of the present disclosure is not limited to this, and the object other than the finger, such as a stylus pen, a ballpoint pen, a mechanical pencil, or a straw, may be used.

In addition, in the embodiment described above, an aspect example has been described in which the size of the instruction three-dimensional region 38 is also changed in conjunction with the change in the size of the observation three-dimensional region 36, but the technology of the present disclosure is not limited to this, the size of the instruction three-dimensional region 38 may not be changed regardless of the change in the size of the observation three-dimensional region 36. In the example shown in FIG. 32, the size of the observation three-dimensional region 36 and the size of the instruction three-dimensional region 38 may not be changed even in a case in which the bird's-eye view image is enlarged or reduced and displayed on the display 34A of the tablet terminal 34. Note that, here, the display 34A is an example of a "first display device" and a "second display device" according to the technology of the present disclosure.

In addition, in the tablet terminal 34, in a state in which a specific reference plane image 40B1 (see FIG. 33) showing the imaging face on the soccer field 24 by the imaging apparatus 18 is displayed on the display 34A, an instruction for enlarging or reducing the specific reference plane image 40B1 (hereinafter, referred to as an "image size change instruction") is received by the touch panel 106A (an example of a "reception unit (reception device)" according to the technology of the present disclosure). In a case in which the specific reference plane image 40B1 is enlarged or reduced in response to the image size change instruction received by the touch panel 106A, in response to the above, a three-dimensional region 36B in the real space corresponding to the specific reference plane image is generated by the changing unit 58F. In the example shown in FIG. 33, in a state in which the specific reference plane image 40B1 is displayed on the display 34A, the touch panel 106A receives the instruction for enlarging the specific reference plane image 40B1 as the image size change instruction, so that the three-dimensional region 36B in a case in which the specific reference plane image 40B1 is enlarged is shown. In the example shown in FIG. 33, the three-dimensional region 36B is positioned at the center portion of the observation three-dimensional region 36. Examples of the instruction for enlarging the specific reference plane image 40B1 include the pinch-out operation on the touch panel 106A. In the example shown in FIG. 34, in a state in which the specific reference plane image 40B1 is displayed on the display 34A, the touch panel 106A receives the instruction for reducing the specific reference plane image 40B1 as the image size change instruction, so that the three-dimensional region 36B in a case in which the specific reference plane image 40B1 is reduced is shown. In the example shown in FIG. 34, the three-dimensional region 36B is positioned outside the observation three-dimensional region 36 (the side surrounding the observation three-dimensional region 36). Examples of the instruction for reducing the specific reference plane image 40B1 include the pinch-in operation on the touch panel 106A. Here, the pinch-out operation and the pinch-in operation are described as an example of the image size change instruction, but the technology of the present disclosure is not limited to this, for example, the image size change instruction may be an operation of a specific soft key and/or a specific hard key, and it need only be an operation determined as the image size change instruction.

In a case in which the size of the specific reference plane image 40B1 is changed in response to the image size change instruction, the positional relationship information 60G (see FIG. 12) is updated by the changing unit 58F. The positional relationship information 60G includes information indicating the relative positional relationship between the three-dimensional region 36B in the real space corresponding to the specific reference plane image 40B1 enlarged or reduced in response to the image size change instruction received by the touch panel 106A and the instruction three-dimensional region 38. In a case in which the image size change instruction is received by the touch panel 106A, the positional relationship information 60G is changed by the changing unit 58F in response to the received image size change instruction. The observation viewpoint and the observation visual line are changed in the three-dimensional region 36B in response to the instruction given by the spectator 28 to the instruction three-dimensional region 38.

That is, the similarity relationship between the observation three-dimensional region 36 and the instruction three-dimensional region 38 is maintained, but the instruction given by the spectator 28 to the instruction three-dimensional region 38 is reflected to the three-dimensional region 36B (the observation viewpoint and the observation visual line are set in the three-dimensional region 36B). Note that, here, although an aspect example has been described in which the observation three-dimensional region 36 and the three-dimensional region 36B are separately present, the technology of the present disclosure is not limited to this, and the observation three-dimensional region 36 may be reset as the three-dimensional region 36B.

Figure 33:
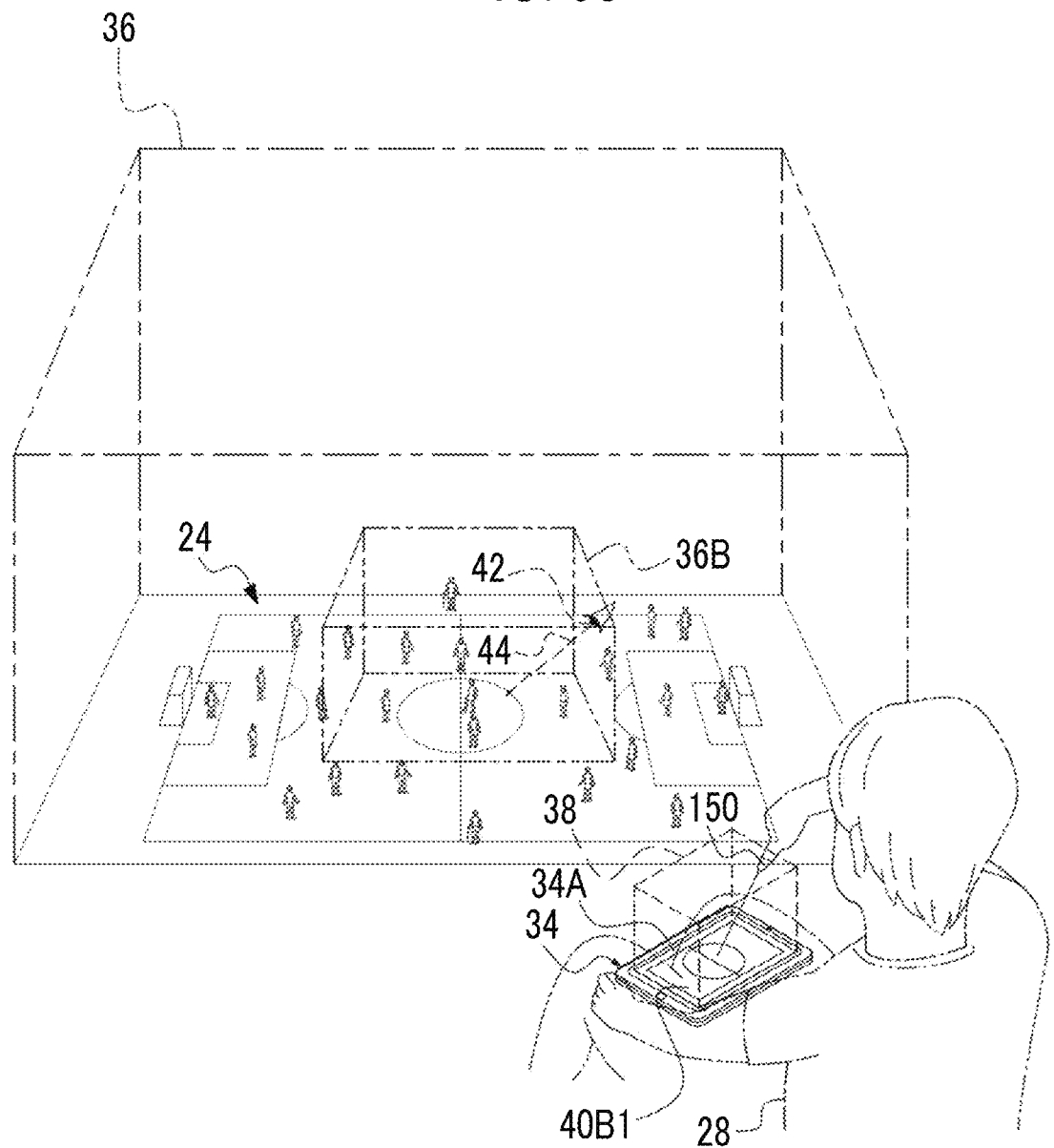
FIG. 33 is a conceptual diagram showing an example of a correspondence between the instruction three-dimensional region in a case in which a specific reference plane image displayed on the display is enlarged and the three-dimensional region in the observation three-dimensional region.
Figure 34:
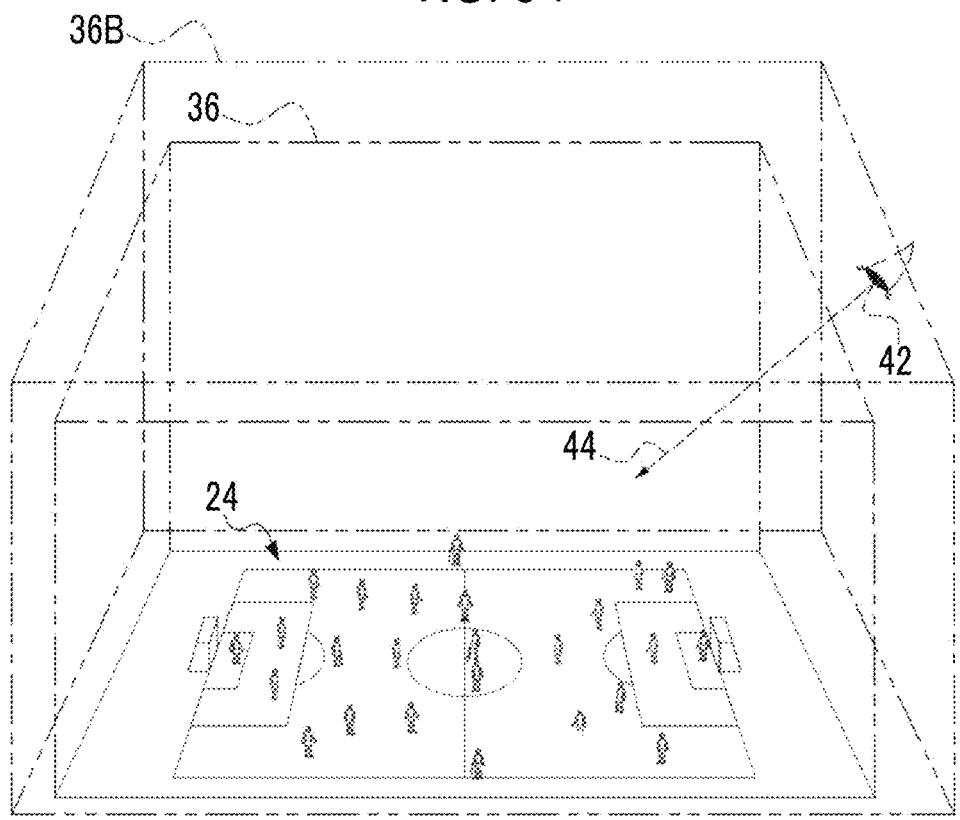
FIG. 34 is a conceptual diagram showing an example of a correspondence between the instruction three-dimensional region in a case in which a specific reference plane image displayed on the display is reduced and the three-dimensional region in the observation three-dimensional region.

Note that, in the example shown in FIG. 33, a part of the three-dimensional region in the observation three-dimensional region 36 is set as the three-dimensional region 36B corresponding to the instruction three-dimensional region 38 defined on the display 34A, and in the example shown in FIG. 34, the three-dimensional region outside the observation three-dimensional region 36 is set as the three-dimensional region 36B corresponding to the instruction three-dimensional region 38 defined on the display 34A. However, the technology of the present disclosure is not limited to these. For example, regardless of the enlargement or reduction of the specific reference plane image displayed on the display 34A, as in the embodiment described above, in response to the instruction given by the spectator 28 to the instruction three-dimensional region 38, the observation viewpoint and the observation visual line may be set in the observation three-dimensional region 36.

Figure 35:
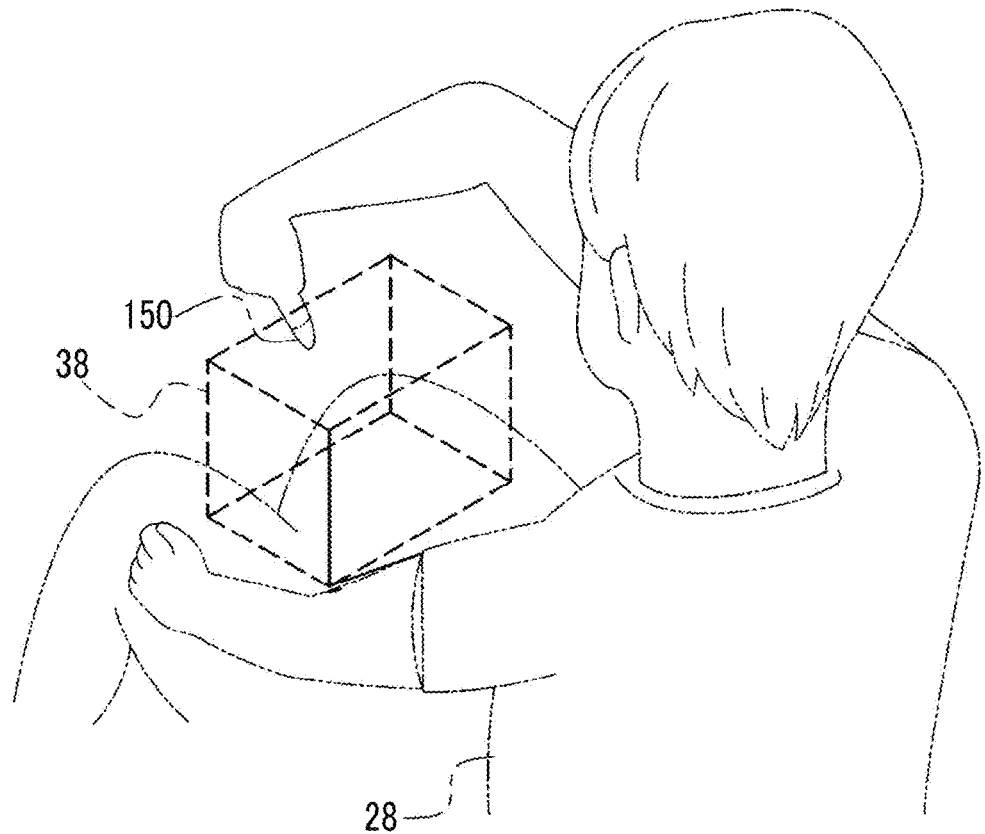
FIG. 35 is a conceptual diagram showing an example of a positional relationship between the instruction three-dimensional region and a finger in a case in which instructions for the observation viewpoint and the observation visual line different from the example shown in FIG. 32 are made.

In addition, as shown in FIG. 35, for example, by changing the position and the direction of the finger in the instruction three-dimensional region 38, the observation viewpoint and the observation visual line are changed as in the embodiment described above.

In this way, the CPU 118 generates the instruction three-dimensional region 38 based on the instruction reference plane 40B by using the display surface of the display 34A in a state in which the bird's-eye view image is displayed on the display 34A as the instruction reference plane 40B, so that it is possible to generate the instruction three-dimensional region 38 in which the relationship with the observation three-dimensional region 36 can be grasped. In addition, since the bird's-eye view image is displayed on the display 34A, it is possible to generate the instruction three-dimensional region 38 in which the relationship with the observation three-dimensional region 36 in the bird's-eye view can be grasped.

Figure 36:
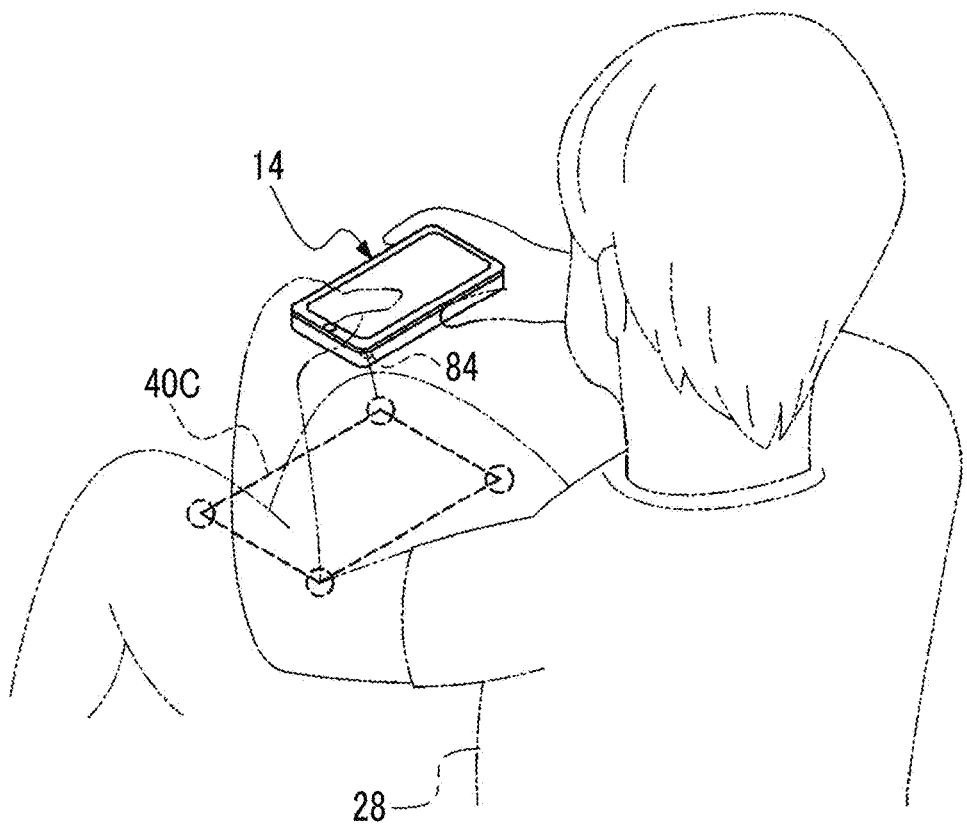
FIG. 36 is a conceptual diagram provided for describing a first modification example of a generation method of an instruction reference plane.
Figure 37:
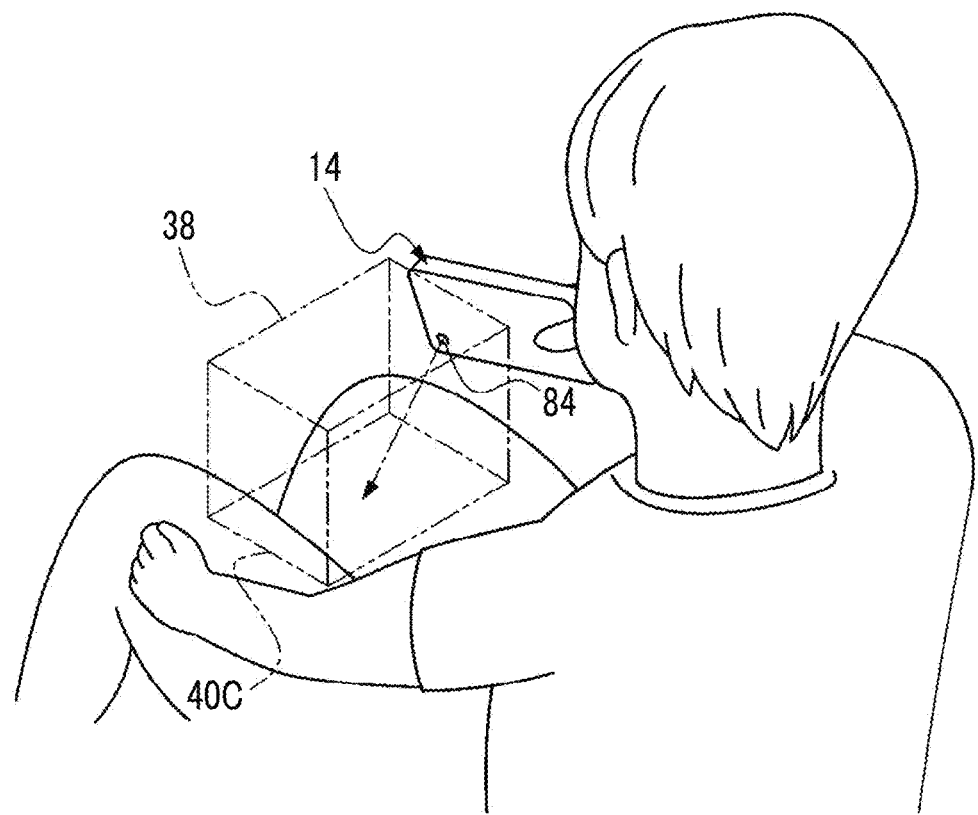
FIG. 37 is a conceptual diagram showing an example of an aspect in which the instruction three-dimensional region generated based on the instruction reference plane shown in FIG. 36 is used.

In addition, in the embodiment described above, an aspect example has been described in which the instruction reference plane 40A is generated based on the reference subject image 41 obtained by imaging the recording medium P by the imaging apparatus 84 of the smartphone 14, but the technology of the present disclosure is not limited to this. For example, as shown in FIG. 36, an instruction reference plane 40C may be generated based on the image obtained by imaging any region (in the example shown in FIG. 36, the thigh of the spectator 28) by the imaging apparatus 84 of the smartphone 14. In addition, the smartphones 14 may be sequentially disposed at four places, and the reception device 76 may receive a positioning instruction at each place to decide four points for generating the instruction reference plane 40C. By using the acceleration information obtained from the acceleration sensor 72, the positional relationship between four points is specified, and the instruction reference plane 40C is uniquely determined from the specified positional relationship. In a case in which the instruction reference plane 40C is determined as described above, as shown in FIG. 37, for example, the generation unit 88B generates the instruction three-dimensional region 38 based on the instruction reference plane 40C.

Note that, in the above, an aspect example has been described in which four points are specified in determining each of the instruction reference planes 40A, 40B, and 40C. However, the technology of the present disclosure is not limited to this, the instruction reference planes 40A, 40B, and/or 40C may be determined by three points, and it need only be a plurality of points of three points or more capable of defining the plane. In the following, in a case in which a distinction is not necessary, the instruction reference planes 40A, 40B, and 40C are referred to as the "instruction reference plane" without reference numeral.

Figure 38:
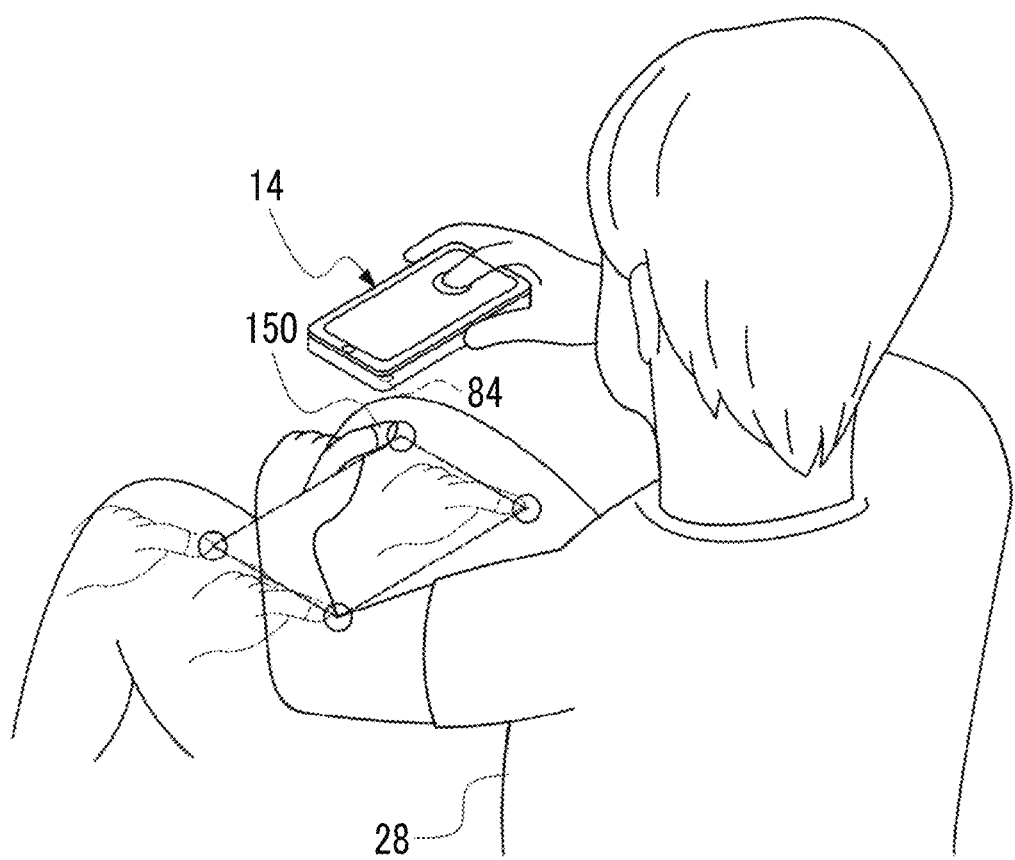
FIG. 38 is a conceptual diagram provided for describing a second modification example of the generation method of the instruction reference plane.

In a case in which the plurality of points of at least three points or more required to generate the instruction reference plane are specified, for example, as shown in FIG. 38, the finger is sequentially placed at any four places, and the plurality of points may be specified from the image obtained by imaging the finger by the imaging apparatus 84 of the smartphone 14 at each place.

Figure 39:
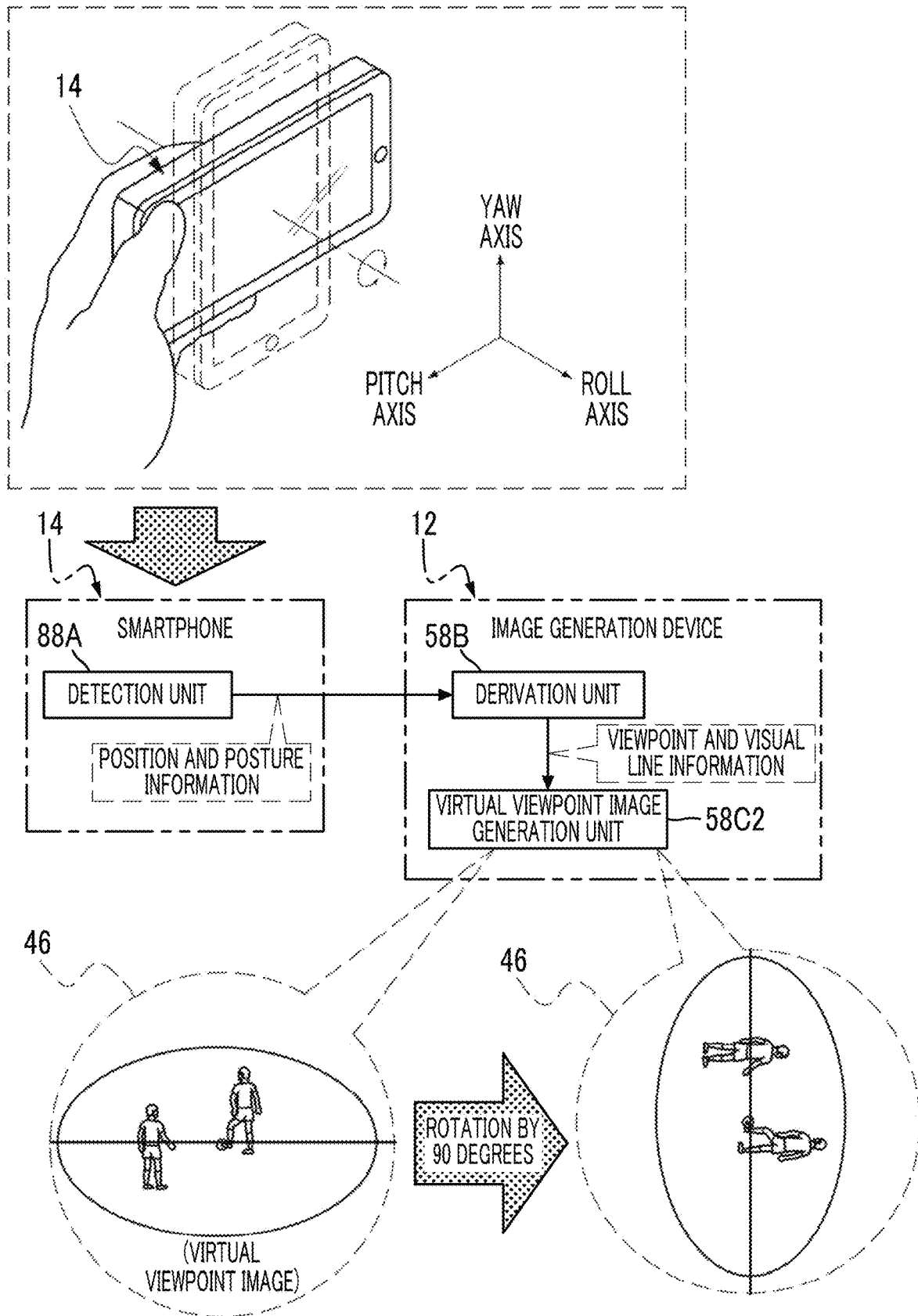
FIG. 39 is a conceptual diagram showing an example of the virtual viewpoint image generated before and after the smartphone according to the embodiment is rotated around the roll axis.

In addition, as shown in FIG. 39, for example, by rotating the smartphone 14 around the roll axis, the virtual viewpoint image 46 in the direction corresponding to the smartphone posture detected by measuring the roll angle by the detection unit 88A may be generated by the virtual viewpoint image generation unit 58C2. As a result, it is possible to easily obtain the virtual viewpoint image 46 in the direction corresponding to the roll angle as compared to a case in which the roll angle is not measured. Note that, in the example shown in FIG. 39, an aspect is shown in which in a case in which the smartphone 14 is rotated by 90 degrees around the roll axis, the virtual viewpoint image 46 is also generated by being rotated by 90 degrees by the virtual viewpoint image generation unit 58C2.

In addition, in the embodiment described above, the positional relationship information 60G has been described as an example in which the observation three-dimensional region information 60F and the instruction three-dimensional region information 90C are associated with each other in a table manner, but the technology of the present disclosure is not limited to this. For example, the positional relationship information 60G may be information including the degree of difference between the distance between the position in the observation three-dimensional region 36 and the observation reference point 36A and the distance between the position in the instruction three-dimensional region 38 and the instruction reference point 38A. As a result, as compared to a case in which the degree of difference between a distance between the position in the observation three-dimensional region 36 and a point unrelated to the observation reference point 36A and a distance between the position in the instruction three-dimensional region 38 and a point unrelated to the instruction reference point 38A is used as the positional relationship information, it is possible to easily specify the relationship between the position in the observation three-dimensional region 36 and the position in the instruction three-dimensional region 38.

Note that examples of the degree of difference include a ratio between the distance between the position in the observation three-dimensional region 36 and the observation reference point 36A and the distance between the position in the instruction three-dimensional region 38 and the instruction reference point 38A, that is, a magnification. Instead of the magnification, a difference may be adopted as the degree of difference. Examples of the information including the degree of difference include information indicating the direction of the position in the observation three-dimensional region 36 with respect to the observation reference point 36A and information indicating the direction of the position in the instruction three-dimensional region 38 with respect to the instruction reference point 38A.

In addition, in the embodiment described above, the observation reference point 36A and the instruction reference point 38A are described as examples, but the technology of the present disclosure is not limited to this, and a single reference point common to the observation three-dimensional region 36 and the instruction three-dimensional region 38 (hereinafter, also referred to as a "common reference point") may be adopted. For example, a center of a center circle of the soccer field 24 or one of the four corners of the soccer field 24 may be used as the common reference point. In this case, the ratio between the distance between the position in the observation three-dimensional region 36 and the common reference point and the distance between the position in the instruction three-dimensional region 38 and the common reference point, that is, the information including the magnification may be adopted as the positional relationship information 60G.

In addition, in the embodiment described above, an aspect example has been described in which the instruction reference plane 40A is one outer plane of the instruction three-dimensional region 38, but the technology of the present disclosure is not limited to this. The instruction reference plane 40A may be a plane for defining one outer plane of the instruction reference plane 40A (for example, a plane encompassed in one outer plane of the instruction reference plane 40A), or an inner plane of the instruction three-dimensional region 38.

In addition, in the embodiment described above, an aspect example has been described in which the acquisition unit 58C is provided in the image generation device 12, but the technology of the present disclosure is not limited to this, and the acquisition unit 58C may be provided in an external device of the image generation device 12. Here, examples of the external device include the smartphone 14 and the tablet terminal 34. In addition to the above, the acquisition unit 58C may be provided in a server or a personal computer. In this case, the viewpoint and visual line information derived by the derivation unit 58B is transmitted from the image generation device 12 to the acquisition unit 58C of the external device, and the viewpoint and visual line information is acquired by the viewpoint and visual line information acquisition unit 58C1 of the acquisition unit 58C. The external device may acquire the viewpoint and visual line information and generate the virtual viewpoint image based on the acquired viewpoint and visual line information, and the image generation device 12 may acquire the virtual viewpoint image generated by the external device.

In addition, in the embodiment described above, the instruction three-dimensional region 38 is the three-dimensional region obtained by reducing the observation three-dimensional region 36, but the technology of the present disclosure is not limited to this. For example, the instruction three-dimensional region 38 may be the three-dimensional region obtained by enlarging the observation three-dimensional region 36. In this case, an application example in a medical field is conceivable, for example, the observation three-dimensional region 36 is applied to a surgical field for surgery in various surgeries, such as ophthalmology and/or neurosurgery, and the instruction three-dimensional region 38 is applied to an operator's visual field. In addition to the medical field, in a scene of observing a minute object, such as a cell, the observation three-dimensional region 36 may be applied to an observation object, and the instruction three-dimensional region 38 is applied to an observer's field of view.

In addition, in the embodiment described above, an aspect example has been described in which the region association process (see FIG. 27), the virtual viewpoint image generation process (see FIG. 28), the image control process (see FIG. 29), the change process (see FIG. 30), and the change rate instruction process (see FIG. 31) are executed by the CPU 58 of the image generation device 12, but the technology of the present disclosure is not limited thereto. For example, at least one of the region association processes, the virtual viewpoint image generation process, the image control process, the change process, and the change rate instruction process may be executed by the CPU 88 of the smartphone 14.

Figure 40:
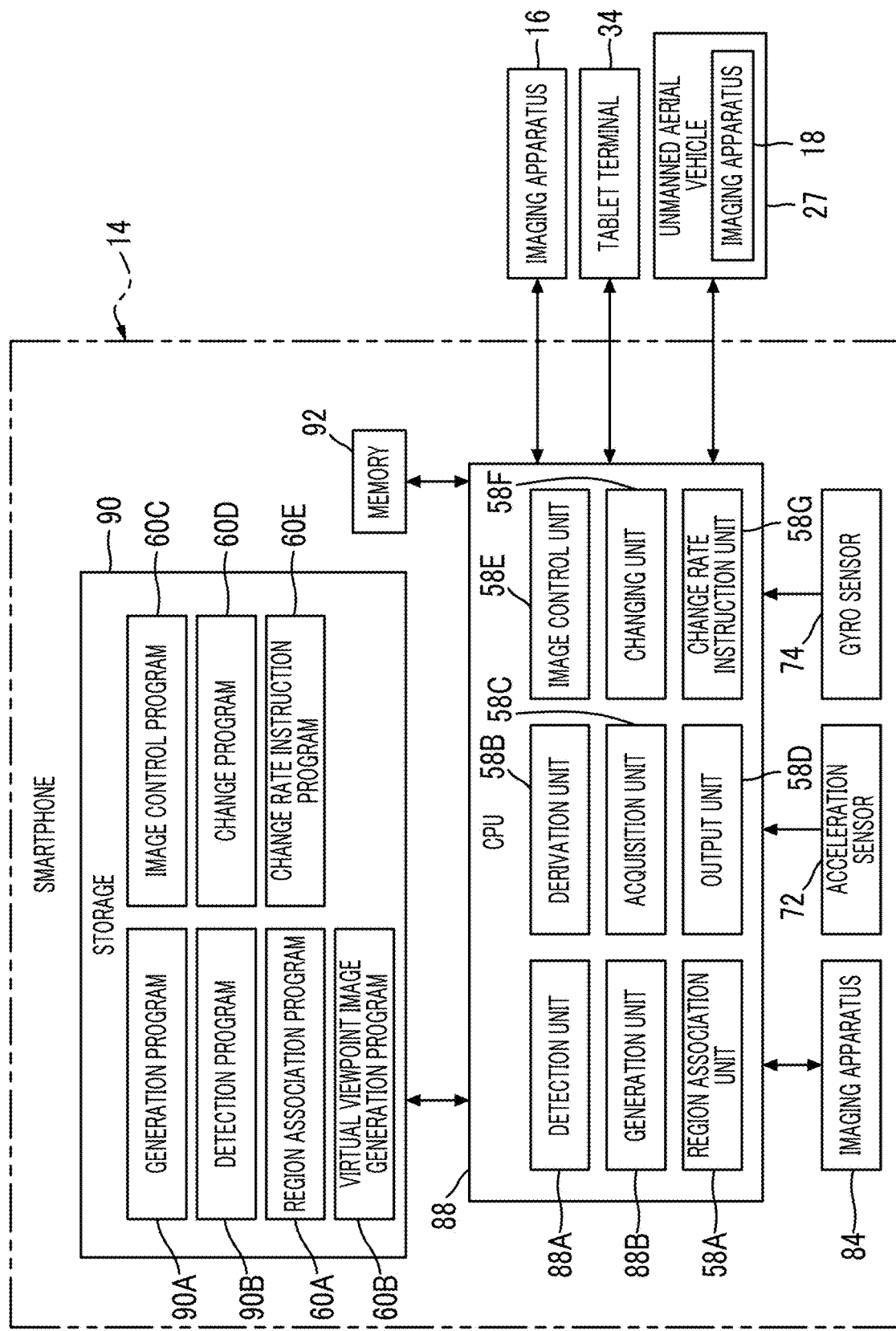
FIG. 40 is a block diagram showing a modification example of the configuration of the information processing system according to the embodiment.

FIG. 40 shows a configuration example of the smartphone 14 in a case in which the region association process, the virtual viewpoint image generation process, the image control process, the change process, and the change rate instruction process are executed by the CPU 88 of the smartphone 14. For example, as shown in FIG. 40, in addition to the generation program 90A and the detection program 90B, the storage 90 stores the region association program 60A, the virtual viewpoint image generation program 60B, the image control program 60C, the change program 60D, and the change rate instruction program 60E. In addition to being operated as the detection units 88A and 88B, the CPU 88 is also operated as the region association unit 58A, the derivation unit 58B, the acquisition unit 58C, the output unit 58D, the image control unit 58E, the changing unit 58F, and the change rate instruction unit 58G. That is, according to the image generation device side program stored in the storage 90, the CPU 88 executes the region association process, the virtual viewpoint image generation process, the image control process, the change process, and the change rate instruction process by being operated as the region association unit 58A, the derivation unit 58B, the acquisition unit 58C, the output unit 58D, the image control unit 58E, the changing unit 58F, and the change rate instruction unit 58G.

In the example shown in FIG. 40, the smartphone 14 is an example of an "information processing apparatus" according to the technology of the present disclosure. Note that, in the example shown in FIG. 40, the smartphone 14 has been described as an example of the "information processing apparatus" according to the technology of the present disclosure, but instead of the smartphone 14, the tablet terminal 34 can be adopted as the "information processing apparatus" according to the technology of the present disclosure. In addition, various devices equipped with an arithmetic device, such as a personal computer and/or a wearable terminal, can also be adopted as the "information processing apparatus" according to the technology of the present disclosure.

In addition, in the embodiment described above, the soccer stadium 22 has been described as an example, but it is merely an example, and any place may be adopted as long as the plurality of imaging apparatuses can be installed and the equipment that can generate the virtual viewpoint image is provided, such as a baseball field, a curling field, and a swimming pool.

In addition, in the embodiment described above, the wireless communication method using the base station 20 has been described as an example, but it is merely an example, and the technology of the present disclosure is established even in the wired communication method using the cable.

In addition, in the embodiment described above, the unmanned aerial vehicle 27 has been described as an example, but the technology of the present disclosure is not limited to this, and the observation three-dimensional region 36 may be imaged by the imaging apparatus 18 suspended by a wire (for example, a self-propelled imaging apparatus that can move along the wire).

In addition, in the embodiment described above, an aspect example has been described in which the spectator 28 (the operator of the device, such as the smartphone 14) spectates soccer at the actual soccer stadium 22, but the technology of the present disclosure is not limited to this. Even in a case in which the spectator 28 is not present in the soccer stadium 22 and spectates soccer on a television or the like, the technology of the present disclosure is established.

In addition, in the embodiment described above, an aspect example has been described in which the imaging apparatus 18 is used, but the technology of the present disclosure is not limited to this. For example, in a case in which the relative positional relationship between the observation three-dimensional region 36 and the instruction three-dimensional region 38 is associated and the bird's-eye view image is not displayed, the technology of the present disclosure is established without the imaging apparatus 18.

In addition, in the embodiment described above, the computers 50, 70, and 100 have been described, but the technology of the present disclosure is not limited to theses. For example, instead of the computers 50, 70, and/or 100, a device including an ASIC, an FPGA, and/or a PLD may be applied. In addition, instead of the computers 50, 70, and/or 100, a combination of a hardware configuration and a software configuration may be used.

Figure 41:
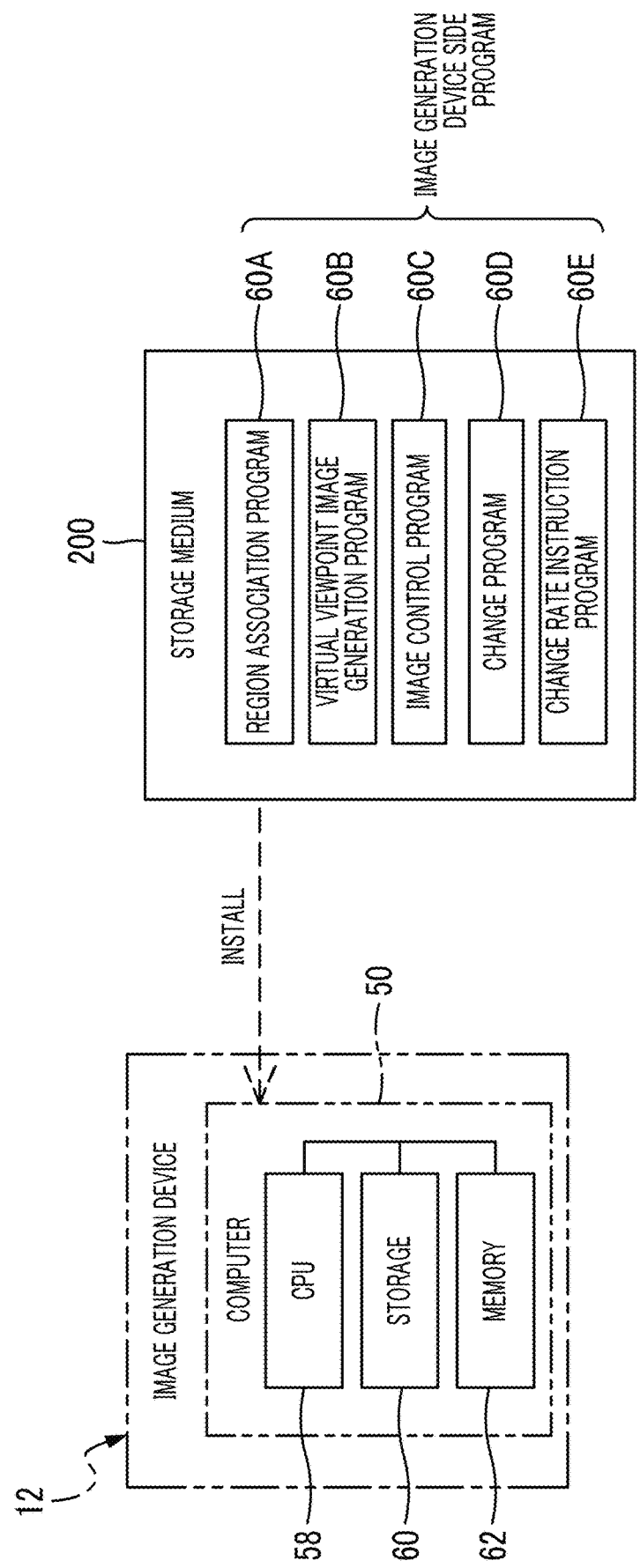
FIG. 41 is a block diagram showing an example of an aspect in which an image generation device side program is installed in a computer of the image generation device from the storage medium in which the image generation device side program according to the embodiment is stored.

In addition, in the embodiment described above, the image generation device side program is stored in the storage 60, but the technology of the present disclosure is not limited to this, and as shown in FIG. 41, for example, the image generation device side program may be stored in any portable storage medium 200, such as an SSD or a USB memory, which is a non-transitory storage medium. In this case, the image generation device side program stored in the storage medium 200 is installed in the computer 50, and the CPU 58 executes the region association process, the virtual viewpoint image generation process, the image control process, the change process, and the change rate instruction process according to the image generation device side program.

In addition, the image generation device side program may be stored in a storage unit of another computer or a server device connected to the computer 50 via a communication network (not shown), and the image generation device side program may be downloaded to the image generation device 12 in response to the request of the image generation device 12. In this case, the region association process, the virtual viewpoint image generation process, the image control process, the change process, and the change rate instruction process based on the downloaded image generation device side program are executed by the CPU 58 of the computer 50.

In addition, in the embodiment described above, the CPU 58 has been described as an example, but the technology of the present disclosure is not limited to this, and a GPU may be adopted. In addition, a plurality of CPUs may be adopted instead of the CPU 58. That is, the region association process, the virtual viewpoint image generation process, the image control process, the change process, and the change rate instruction process may be executed by one processor or a plurality of physically separated processors.

Figure 42:
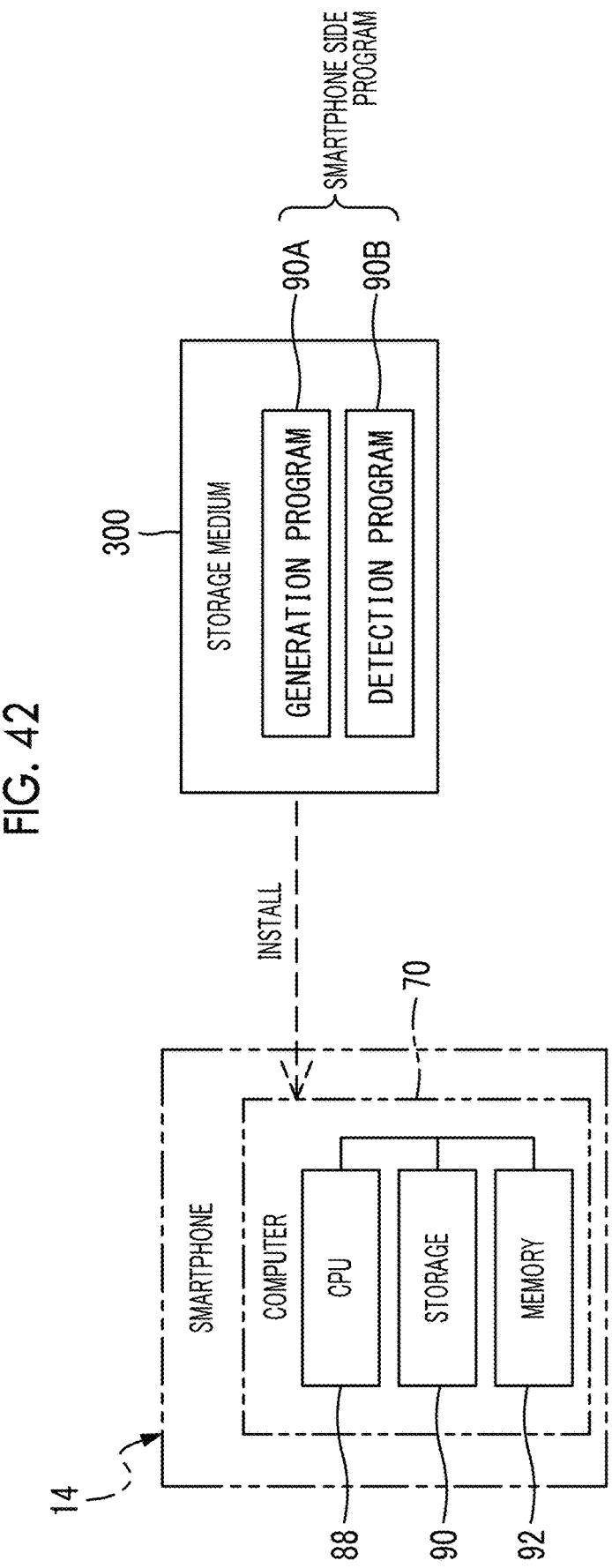
FIG. 42 is a block diagram showing an example of an aspect in which a smartphone side program is installed on a computer of the smartphone from the storage medium in which the smartphone side program according to the embodiment is stored.

In addition, in the embodiment described above, the smartphone side program is stored in the storage 90, but the technology of the present disclosure is not limited to this, and as shown in FIG. 42, for example, the smartphone side program may be stored in any portable storage medium 300, such as an SSD or a USB memory. In this case, the smartphone side program stored in the storage medium 300 is installed in the computer 70, and the CPU 88 executes the detection process (see FIG. 26) and the generation process (see FIG. 25) according to the smartphone side program.

In addition, the smartphone side program is stored in the storage unit of another computer or a server device connected to the computer 70 via a communication network (not shown), and the smartphone side program may be downloaded to the smartphone 14 in response to the request of the smartphone 14. In this case, the detection process and the generation process based on the downloaded smartphone side program are executed by the CPU 88 of the computer 70.

In addition, in the embodiment described above, the CPU 88 has been described as an example, but the technology of the present disclosure is not limited to this, and a GPU may be adopted. In addition, a plurality of CPUs may be adopted instead of the CPU 88. That is, the detection process and the generation process may be executed by one processor or a plurality of physically separated processors. Note that, in the following, in a case in which a distinction is not necessary, the region association process, the virtual viewpoint image generation process, the image control process, the change process, the change rate instruction process, the detection process, and the generation process are referred to as "various processes" for convenience of description.

The following various processors can be used as a hardware resource for executing various processes. Examples of the processor include a CPU, which is a general-purpose processor that functions as software, that is, the hardware resource for executing various processes according to the program, as described above. In addition, another example of the processor includes a dedicated electric circuit which is a processor having a circuit configuration specially designed for executing a specific process, such as an FPGA, a PLD, or an ASIC. A memory is also built in or connected to each processor, and each processor executes various processes by using the memory.

The hardware resource for executing various processes may be configured by one of the various processors, or may be a combination of two or more processors of the same type or different types (for example, a combination of a plurality of FPGAs or a combination of a CPU and an FPGA). In addition, the hardware resource for executing various processes may be one processor.

As an example of configuring the hardware resource with one processor, first, as represented by a computer such as a client computer or a server, there is a form in which one processor is configured by a combination of one or more CPUs and software, and the processor functions as the hardware resource for executing various processes. Secondly, as represented by SoC, there is an aspect in which a processor that realizes the functions of the whole system including a plurality of the hardware resources for executing various processes with one IC chip is used. In this way, various processes are realized by using one or more of the various processors described above as the hardware resource.

Further, as the hardware structure of these various processors, more specifically, an electric circuit in which circuit elements such as semiconductor elements are combined can be used.

In addition, various processes described above are merely examples. Therefore, it is needless to say that unnecessary steps may be deleted, new steps may be added, or the process order may be changed within a range that does not deviate from the gist.

The contents described and shown above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the contents described and shown above, the description of common technological knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All of the documents, the patent applications, and the technical standards described in the present specification are incorporated in the present specification by referring to the same extent as a case in which individual document, patent application, and technical standard are specifically and individually noted to be incorporated by reference.

Regarding the embodiment described above, the following supplementary note will be further disclosed.

(Supplementary Note 1)

An information processing apparatus including a processor, and a memory built in or connected to the processor, in which the processor detects a three-dimensional position and a posture of an object in an instruction three-dimensional region having an enlarged or reduced relationship with an observation three-dimensional region in which a virtual viewpoint and a virtual visual line are defined, derives the viewpoint and the visual line corresponding to detection results depending on positional relationship information indicating a relative positional relationship between the observation three-dimensional region and the instruction three-dimensional region, and acquires a virtual viewpoint image showing a subject in a case in which the subject is observed with the derived viewpoint and the derived visual line, the virtual viewpoint image being based on a plurality of images obtained by imaging an imaging region included in the observation three-dimensional region by a plurality of imaging apparatuses.

(Supplementary Note 2)

An information processing apparatus including a detection unit that detects a three-dimensional position and a posture of an object in an instruction three-dimensional region having an enlarged or reduced relationship with an observation three-dimensional region in which a virtual viewpoint and a virtual visual line are defined, a derivation unit that derives the viewpoint and the visual line corresponding to detection results of the detection unit depending on positional relationship information indicating a relative positional relationship between the observation three-dimensional region and the instruction three-dimensional region, and an acquisition unit that acquires a virtual viewpoint image showing a subject in a case in which the subject is observed with the viewpoint and the visual line derived by the derivation unit, the virtual viewpoint image being based on a plurality of images obtained by imaging an imaging region included in the observation three-dimensional region by a plurality of imaging apparatuses.

(Supplementary Note 3)

The information processing apparatus according to Supplementary Note 2, further including a generation unit that generates the instruction three-dimensional region based on an instruction reference plane specified by using an image obtained by imaging a reference subject, in which the reference subject is a recording medium on which an image showing a specific subject (in the example shown in FIG. 1, the soccer field 24) in the observation three-dimensional region is formed.

With the information processing apparatus according to Supplementary Note 3, it is possible to generate the instruction three-dimensional region in which the relationship with the specific subject in the observation three-dimensional region can be grasped.

(Supplementary Note 4)

The information processing apparatus according to Supplementary Note 2 or Supplementary Note 3, in which the observation three-dimensional region is a three-dimensional region defined based on a second observation three-dimensional region image, which is obtained by imaging a region including a specific reference plane by a second imaging apparatus or obtained by imaging the observation three-dimensional region by a second virtual imaging apparatus, and has a similarity relationship with the instruction three-dimensional region, the information processing apparatus includes a reception unit that receives a size change instruction for changing a size of the observation three-dimensional region, and a changing unit that changes the size of the observation three-dimensional region by changing a width of a imaging range on the specific reference plane by the second imaging apparatus or the second virtual imaging apparatus in response to the size change instruction received by the reception unit, and changes the size of the instruction three-dimensional region in a state in which the similarity relationship is maintained in conjunction with the change in the size of the observation three-dimensional region.

With the information processing apparatus according to Supplementary Note 4, the change in the size of the observation three-dimensional region can be reflected in the instruction three-dimensional region.

(Supplementary Note 5)

The information processing apparatus according to Supplementary Note 4, in which the reception unit receives an image size change instruction for enlarging or reducing a specific reference plane image showing a specific reference plane in a state in which an image including the specific reference plane image is displayed by a second display device, and the positional relationship information is information including information indicating a relative positional relationship between a three-dimensional region in real space corresponding to the specific reference plane image enlarged or reduced in response to the image size change instruction received by the reception unit, and the instruction three-dimensional region.

With the information processing apparatus according to Supplementary Note 5, the position of the viewpoint can be decided without being limited by the observation three-dimensional region.

(Supplementary Note 6)

The information processing apparatus according to Supplementary Note 4 or Supplementary Note 5, in which the size of the virtual viewpoint image acquired by the acquisition unit is changed at a rate determined depending on the degree of the change in the sizes of the observation three-dimensional region and the instruction three-dimensional region.

With the information processing apparatus according to Supplementary Note 6, as compared to a case in which the size of the virtual viewpoint image is changed without considering the degree of the change in the sizes of the observation three-dimensional region and the instruction three-dimensional region, it is possible to reduce a visual discomfort in a case in which the size of the virtual viewpoint image is changed.

What is claimed is:

1. An information processing apparatus comprising:
a processor; and
a memory built in or connected to the processor,
wherein the processor
detects a three-dimensional position and a posture of an object in an instruction three-dimensional region having an enlarged or reduced relationship with an observation three-dimensional region in which a virtual viewpoint and a virtual visual line are defined,
derives the viewpoint and the visual line corresponding to detection results of the three-dimensional position and the posture of the object depending on positional relationship information indicating a relative positional relationship between the observation three-dimensional region and the instruction three-dimensional region, and
acquires, from among virtual viewpoint images based on a plurality of images obtained by imaging an imaging region included in the observation three-dimensional region by a plurality of imaging apparatuses, a virtual viewpoint image showing a subject present in the imaging region in a case in which the imaging region is observed with the derived viewpoint and the derived visual line.

2. The information processing apparatus according to claim 1,
wherein the relative positional relationship is a relationship between a position of the observation three-dimensional region with respect to a reference point and a position of the instruction three-dimensional region with respect to the reference point.

3. The information processing apparatus according to claim 2,
wherein the positional relationship information is information in which a coordinate indicating a position in the observation three-dimensional region with the reference point as an origin and a coordinate indicating a position in the instruction three-dimensional region with the reference point as an origin are associated with each other.

4. The information processing apparatus according to claim 2, wherein the positional relationship information is information including a degree of difference between a distance between a position in the observation three-dimensional region and the reference point and a distance between a position in the instruction three-dimensional region and the reference point.

5. The information processing apparatus according to claim 2,
wherein the reference point is classified into an observation reference point applied to the observation three-dimensional region and an instruction reference point applied to the instruction three-dimensional region, and
the instruction reference point is located at a position different from the observation reference point and has a correspondence with the observation reference point.

6. The information processing apparatus according to claim 5,
wherein the instruction reference point is decided by detecting the three-dimensional position by the processor.

7. The information processing apparatus according to claim 1,
wherein the processor
detects at least three points of the three-dimensional positions, and
generates the instruction three-dimensional region based on an instruction reference plane specified by using the detected at least three points of the three-dimensional positions.

8. The information processing apparatus according to claim 1,
wherein the processor generates the instruction three-dimensional region based on an instruction reference plane specified by using an image obtained by imaging a reference subject.

9. The information processing apparatus according to claim 1,
wherein, in a case in which a display surface of a first observation three-dimensional region image in a state in which the first observation three-dimensional region image is displayed by a first display apparatus is defined as an instruction reference plane, the first observation three-dimensional region image being obtained by imaging the observation three-dimensional region by a first imaging apparatus or obtained by imaging the observation three-dimensional region by a first virtual imaging apparatus, the processor generates the instruction three-dimensional region based on the instruction reference plane.

10. The information processing apparatus according to claim 9,
wherein the first observation three-dimensional region image is an image showing the observation three-dimensional region in a bird's-eye view.

11. The information processing apparatus according to claim 9,
wherein the processor enlarges or reduces the first observation three-dimensional region image in response to a given instruction.

12. The information processing apparatus according to claim 7,
wherein the instruction reference plane is a plane for defining one outer plane of the instruction three-dimensional region, one outer plane of the instruction three-dimensional region, or an inner plane of the instruction three-dimensional region.

13. The information processing apparatus according to claim 1,
wherein the processor
detects the posture by measuring a pitch angle, a yaw angle, and a roll angle of the object, and
acquires the virtual viewpoint image in a direction corresponding to the posture detected by measuring the roll angle.

14. The information processing apparatus according to claim 1,
wherein the observation three-dimensional region is a three-dimensional region defined based on a second observation three-dimensional region image, which is obtained by imaging a specific reference plane by a second imaging apparatus or obtained by imaging the specific reference plane by a second virtual imaging apparatus, and has a similarity relationship with the instruction three-dimensional region,
the processor is configured to:
acquire a size change instruction for changing a size of the specific reference plane, and
change the size of the observation three-dimensional region by changing the size of the specific reference plane in response to the acquired size change instruction, and
the similarity relationship is maintained regardless of a change in the size of the observation three-dimensional region.

15. The information processing apparatus according to claim 1, wherein:
the processor is configured to acquire an image size change instruction for enlarging or reducing a specific reference plane image showing a specific reference plane in a state in which an image including the specific reference plane image is displayed by a second display device, and
the positional relationship information is information including information indicating a relative positional relationship between a three-dimensional region in real space corresponding to the specific reference plane image enlarged or reduced in response to the acquired image size change instruction, and the instruction three-dimensional region.

16. The information processing apparatus according to claim 14,
wherein the processor changes the size of the observation three-dimensional region by enlarging or reducing the second observation three-dimensional region image in response to the size change instruction.

17. The information processing apparatus according to claim 14,
wherein the processor further acquires an imaging direction change instruction for changing an imaging direction of the second imaging apparatus or the second virtual imaging apparatus, and
changes the imaging direction in response to the acquired imaging direction change instruction.

18. The information processing apparatus according to claim 1,
wherein the processor outputs the acquired virtual viewpoint image.

19. An information processing method comprising:
detecting a three-dimensional position and a posture of an object in an instruction three-dimensional region having an enlarged or reduced relationship with an observation three-dimensional region in which a virtual viewpoint and a virtual visual line are defined;

deriving the viewpoint and the visual line corresponding to detection results of the three-dimensional position and the posture of the object depending on positional relationship information indicating a relative positional relationship between the observation three-dimensional region and the instruction three-dimensional region; and acquiring, from among virtual viewpoint images based on a plurality of images obtained by imaging an imaging region included in the observation three-dimensional region by a plurality of imaging apparatuses, a virtual viewpoint image showing a subject present in the imaging region in a case in which the imaging region is observed with the derived viewpoint and the derived visual line.

20. A non-transitory computer-readable storage medium storing a program for causing a computer to execute a process comprising:

detecting a three-dimensional position and a posture of an object in an instruction three-dimensional region having an enlarged or reduced relationship with an observation three-dimensional region in which a virtual viewpoint and a virtual visual line are defined;

deriving the viewpoint and the visual line corresponding to detection results of the three-dimensional position and the posture of the object depending on positional relationship information indicating a relative positional relationship between the observation three-dimensional region and the instruction three-dimensional region; and acquiring, from among virtual viewpoint images based on a plurality of images obtained by imaging an imaging region included in the observation three-dimensional region by a plurality of imaging apparatuses, a virtual viewpoint image showing a subject present in the imaging region in a case in which the imaging region is observed with the derived viewpoint and the derived visual line.

21. The information processing apparatus according to claim 1, wherein the visual line is a visual line of a user in a case in which the user observes the imaging region in the observation three-dimensional region.

* * * * *